(12) United States Patent
Klughart

(10) Patent No.: US 8,914,549 B2
(45) Date of Patent: Dec. 16, 2014

(54) DATA STORAGE ARCHITECTURE EXTENSION SYSTEM AND METHOD

(71) Applicant: Kevin Mark Klughart, Denton, TX (US)

(72) Inventor: Kevin Mark Klughart, Denton, TX (US)

(*) Notice: Subject to any disclaimer, the term of this patent is extended or adjusted under 35 U.S.C. 154(b) by 0 days.

(21) Appl. No.: 14/314,143

(22) Filed: Jun. 25, 2014

(65) Prior Publication Data

US 2014/0310459 A1  Oct. 16, 2014

Related U.S. Application Data

(63) Continuation of application No. 13/200,242, filed on Sep. 21, 2011, now Pat. No. 8,799,523.

(51) Int. Cl.
*G06F 3/00* (2006.01)
*G06F 3/06* (2006.01)
*G06F 13/42* (2006.01)

(52) U.S. Cl.
CPC ............ *G06F 3/0689* (2013.01); *G06F 3/0619* (2013.01); *G06F 3/0665* (2013.01); *G06F 13/4247* (2013.01)
USPC .................................. 710/5; 710/2; 711/114

(58) Field of Classification Search
CPC ............................ G06F 13/4247; G06F 3/0689
USPC .......................................... 710/2, 5; 711/114
See application file for complete search history.

(56) References Cited

U.S. PATENT DOCUMENTS

| | | | |
|---|---|---|---|
| 7,373,443 B2* | 5/2008 | Seto ............................... | 710/100 |
| 8,074,105 B2* | 12/2011 | Kalwitz et al. ............... | 714/6.22 |
| 8,095,760 B2* | 1/2012 | Mizuno et al. ................ | 711/165 |
| 2005/0207253 A1* | 9/2005 | Takase et al. ................. | 365/222 |
| 2009/0222623 A1* | 9/2009 | Nakamura et al. ............ | 711/114 |
| 2011/0145452 A1* | 6/2011 | Schilling et al. ................ | 710/74 |
| 2012/0266027 A1* | 10/2012 | Itoyama et al. ................. | 714/42 |
| 2012/0278552 A1* | 11/2012 | Singh et al. ................... | 711/114 |
| 2012/0311256 A1* | 12/2012 | Nakajima et al. ............. | 711/114 |
| 2013/0254429 A1* | 9/2013 | Mimata et al. .................... | 710/2 |

* cited by examiner

*Primary Examiner* — Ernest Unelus
(74) *Attorney, Agent, or Firm* — Carstens & Cahoon, LLP; Kevin M. Klughart; David W. Carstens

(57) ABSTRACT

A data storage architecture extension (DAX) system and method that permits multiple disk drive storage elements to be logically daisy-chained to allow a single host bus adapter (HBA) to view the storage elements as one logical disk drive is disclosed. The system/method may be broadly described as comprising a pass-thru disk drive controller (PTDDC) further comprising a HBA port, a disk drive interface port, pass-thru input port, and a pass-thru output port. The PTDDC intercepts and translates the HBA port input to the requirements of an individual disk drive connected to the drive interface port. Each PTDDC may be daisy-chained to other PTDDCs to permit a plethora of disk drives to be associated with a given HBA, with the first PTDDC providing a presentation interface to the HBA integrating all disk drive storage connected to the PTDDCs. The system/method also permits RAID configuration of disk drives using one or more PTDDCs.

20 Claims, 32 Drawing Sheets

*Prior Art*

*Prior Art*

0300

*Prior Art*

*Prior Art*

*Prior Art*

*Prior Art*

*Prior Art*

*Prior Art*

*Prior Art*

*Prior Art*

US 8,914,549 B2

DATA STORAGE ARCHITECTURE EXTENSION SYSTEM AND METHOD

CROSS REFERENCE TO RELATED APPLICATIONS

This application is a Continuation Patent Application (CPA) of and incorporates by reference United States Utility Patent Application for DATA STORAGE ARCHITECTURE EXTENSION SYSTEM AND METHOD by inventor Kevin Mark Klughart, filed with the USPTO on Sep. 21, 2011, with Ser. No. 13/200,242, confirmation number 8668, docket AZKMK.0103, and issued as U.S. Pat. No. 8,799,523 on Aug. 5, 2014.

This application claims benefit under 35 U.S.C. §120 and incorporates by reference United States Utility Patent Application for DATA STORAGE ARCHITECTURE EXTENSION SYSTEM AND METHOD by inventor Kevin Mark Klughart, filed with the USPTO on Sep. 21, 2011, with Ser. No. 13/200,242, confirmation number 8668, docket AZKMK.0103, and issued as U.S. Pat. No. 8,799,523 on Aug. 5, 2014.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems/methods associated with computer data storage, and specifically to systems/methods used to store data on disk drives, and in some preferred embodiments, storage of data on disk drives connected to computer systems running under a variety of operating system environments. Some preferred exemplary embodiments of the present invention also implement data storage architecture extension utilizing Redundant Array of Independent Disk (RAID) storage methodologies.

PRIOR ART AND BACKGROUND OF THE INVENTION

Conventional Comouter Storage Architecture (0100)

As generally illustrated in FIG. 1 (0100), conventional computer storage architectures utilize a computer system (0110) (often running under control of an operating system (0112)) that further comprises a system bus (0111) that communicates with one or more disk drive interfaces (0120, 0130) that then communicate via a host bus adapter (HBA) physical interface to the particular disk drives (0121, 0122, 0131, 0132). Generally speaking the disk drive interface controllers (0120, 0130) are limited to 1-4 disk drives per controller in most personal computer (PC) environments.

PATA/PATAPI (0200, 0300)

Many conventional computer storage architectures utilize a parallel ATA (PATA) interface as generally illustrated in FIG. 2 (0200). Here the disk drive controller (0211) communicates via a parallel ribbon cable (0212) to the disk drives (0214, 0215). Note, however, that this HBA interface is limited to two disk drives per controller. Additional disk drives may be added, but this requires additional disk drive controllers (0211) for each pair of disk drives added.

A view of the physical interface associated with the PATA interface is generally illustrated in FIG. 3 (0300). It should be noted that cable management in PATA configurations is often an issue, as the disk drives must each have a separate ribbon cable connection to the disk drive controller, or in some situations two disk drives may share a single host controller ribbon cable.

SATA/SATAPI (0400, 0500)

Many late-model computer storage architectures utilize a serial ATA (SATA) interface as generally illustrated in FIG. 4 (0400). Here the disk drive controller (0411) communicates via a serial cable (0412, 0413) to each disk drive (0414, 0415). Note, however, that this HBA interface is generally limited to 1-4 disk drives per controller. Additional disk drives may be added, but this requires additional disk drive controllers (0411) for each group of disk drives added.

A view of the physical interface associated with the SATA interface is generally illustrated in FIG. 5 (0500). The connector (0500) generally incorporates a signal connector (0501) and a power connector (0502) with corresponding drive signal receptacle (0503) and drive power receptacle (0504). While cable management in SATA configurations is often less of an issue than in PATA configurations, this architecture still requires one serial cable for each disk drive connected to the disk drive controller.

Port Multiplier/Port Selector (0600)

Computer storage architectures utilizing a serial ATA (SATA) interface as generally illustrated in FIG. 4 (0400) and FIG. 5 (0500) may incorporate a "port multiplier" and/or "port selector" as generally illustrated in FIG. 6 (0600) that permits a computer system (0610) (typically running under an operating system (0611)) with a HBA interface (0620) to communicate to the port multiplier (0630) and subsequently transfer data/commands to multiple disk drives (0631, 0632, 0633, 0634) or operate multiple HBA interfaces (0640, 0650) to permit access via a port selector (0660) to a single disk drive (0661). The SATA specification permits port multipliers (0630) to communicate with up to 15 disk drives.

It should be noted that these port multipliers have several restrictions:

- Port multipliers cannot be nested or cascaded (per the SATA specification, "A Port Multiplier shall not be connected to another Port Multiplier (i.e. no cascading)".
- Port multipliers are limited to 15 connected disk drives.
- Since port multipliers cannot be cascaded, they must provide for the maximum number of anticipated disk drive attachments, and cannot be incrementally extended to support additional disk drives. Once the extension capability of a particular port multiplier is exceeded, it must be replaced with a port multiplier of higher expansion capacity.

Port multipliers connect the disk drives to the HBA as SEPARATE disk drives. It is the responsibility of the host operating system (0611) to coordinate data storage on the individual disk drives (0631, 0632, 0633, 0634). There is no mechanism to concatenate the storage attached to a port multiplier.

Port multipliers do not provide for any form of hardware assisted RAID capability. If RAID is implemented within disk drives connected to one or more port multipliers, it must be accomplished using host operating system (0612) software.

These limitations mean that port multipliers cannot be utilized to extend the logical size of a given disk drive volume. Rather, the port multiplier concept permits the limited extension of a given HBA to permit interfacing with a finite number (<16) of disk drives attached to the specific port multiplier.

NAS/Beyond RAID Topologies (0700, 0800)

While a variety of network attached storage (NAS) solutions are currently on the market, these systems generally utilize a network interface adapter (typically Ethernet) to provide an HBA to the storage array. This system architecture essentially requires that another computer system (typically running LINUX or some other high level operating system) be utilized to provide both the network interface to the host computer system as well as implementing file system support on the storage elements.

Many of these NAS architectures implement some form of RAID to provide for data protection in the event of drive failures and/or data redundancy for increased data availability. Recent improvements to these architectures have included DROBO® brand NAS BeyondRAID® brand storage systems manufactured by Data Robotics, Inc. and described in U.S. Pat. No. 7,873,782 for FILESYSTEM-AWARE BLOCK STORAGE SYSTEM, APPARATUS, AND METHOD issued on Jan. 18, 2011 and other associated U.S. patents assigned to Data Robotics, Inc. The present invention incorporates by reference U.S. Pat. Nos. 7,814,272; 7,814,273; 7,818,531; and 7,873,782 to clarify the scope and character of these storage systems. An example of the system complexity incorporated in such systems is generally illustrated by the prior art block diagram of FIG. 7 (0700).

These storage implementations suffer from a requirement that to properly manage the data storage in the enhanced storage array requires that the drive controller be aware of the file system activity occurring on the disk drive array. This essentially requires that a software "drive emulator" be incorporated into the system to properly manage drive storage allocation/deallocation. The numerous "abstraction layers" present in this type of storage architecture limit the speed of the overall system and drastically increase the overall system complexity. This abstraction requirement not only limits the logical drive size to 16 TB in many configurations, it severely limits the overall system performance of the storage array.

One concept utilized by the prior art is that of logical volumes sparsely backed by physical disk drive volumes. The prior art generally teaches that to achieve this structure within the context of a file system created under control of an operating system, there must be some form of abstraction layer to control the logical-to-physical mapping of allocated storage elements to prohibit situations in which a disk read/write request is targeted towards a logical block that currently has no physical disk drive block association. This concept is generally illustrated in FIG. 8 (0800) and represents the current state-of-the-art in storage allocation systems that permit extensions to their physical storage capacity. This extension capability is generally achieved by "tricking" the operating system into thinking the storage element has more storage than is physically attached, and then remapping logical block requests made to the logical storage array to sparsely populated physical disk drive elements associated with the array. This remapping process is generally clumbersome, time consuming, and a potential point of failure in large storage array systems. Methodologies to achieve redundancy in these situations can solve the point-of-failure problems, but only at the expense of significantly increased system overhead and reduced system performance.

Prior Art Cost Structure

Enterprise Cost Structure

One of the issues associated with storage arrays within the context of the prior art is overall disk drive storage cost. Paraphrasing several commentaries on the subject, There is a general disconnect between what hard drives cost in the consumer market and what the disk based enterprise storage systems cost per GB . . . . While the cost of disk drives in terms of cost/GB is becoming lower, the disks are not getting cheaper—they are just getting bigger. Enterprise disks are very expensive once you include the costs of the storage controller, switching, and maintenance. Excerpted from "The Real Price of Enterprise Storage" by Jamon Bowen.

This year 2011 information goes on to state that while the cost/GB for disk drive storage is steadily declining, the total average cost per enterprise disk drive remains steady at around USD$2500/drive.

Current Disk Drive Price Trends

The above enterprise disk drive cost structure is very surprising given the following current price trends in retail disk drive storage:

| Drive Capacity | Drive Cost (USD$) | Cost/TB (USD$/TB) |
|---|---|---|
| 500 GB | 40 | 80 |
| 1 TB | 60 | 60 |
| 2 TB | 80 | 40 |
| 3 TB | 180 | 60 |

From this year 2011 data, it is clear that the individual disk drive costs are not a significant part of the overall cost of implementing the disk drive in an enterprise environment. As stated above, the costs associated with the storage controller, switching, and maintenance dominate the overall data storage costs in this context.

Additionally, note that the price per terabyte of a given drive is not uniform across the market. In this example, smaller drives will generally have a higher cost/TB than larger disk drives, but at the extreme end of the capacity curve the largest drives will generally command a price premium. In this example note that 4 TB of storage (using two 2-TB drives) can be had for less than the cost of a single 3-TB drive. This cost/TB disparity has as yet not been leveraged by the prior art attached storage market because as seen below the overhead associated with attaching a given drive to a computer system vastly exceeds any price differential in the individual disk drives.

NAS Storage Price Trends

As stated previously, a variety of NAS and other technologies have become available that permit an array of disk drives to be attached to a computer system for the purposes of aggregating the storage capacity of the disk drives in a manner suitable for access by the computer system as one or more logical disk drives. Within this context, the use of RAID and other fault-tolerant architectures have been implemented within hardware and software to act as a "bridge" between the storage array and the host computer system.

Attachment for these systems may include a variety of technologies, including eSATA, gigabit Ethernet, and other interfaces. All of these approaches rely on the storage array being housed in a separate enclosure with separate power supply and generally a disk drive controller motherboard that includes a computer processor capable of accessing all the attached (often racked) disk drives and providing a logical disk drive interface to the attached disk drives to the host computer system.

All of this hardware overhead, especially the requirement of a separate disk drive controller motherboard, dramatically increases the overall cost of the attached storage. As an example, the following table illustrates several NAS systems available and their cost structure using this architecture:

| NAS System | Size (TB) | Cost | Cost/TB |
|---|---|---|---|
| BUFFALO ®TS-X8.0TL/R5 (standalone) | 8 | 1030 | 129 |
| BUFFALO ® TS-RIX8.0TL/R5 (rackmount) | 8 | 2200 | 275 |
| BUFFALO ® TERASTATION ® Pro 6 WSS NAS server | 12 | 2040 | 170 |
| BUFFALO ® TERASTATION ® Duo TS-WX1.0TL/R1 - NAS server | 1 | 340 | 340 |
| BUFFALO ® TERASTATION ® III 2-TB Network Attached Storage | 4 | 680 | 340 |
| BUFFALO ® TERASTATION ® Pro 8 NAS server | 16 | 2716 | 170 |
| DROBO ® B800FS 16 TB bundle | 16 | 5183 | 323 |
| DROBO ® B800FS 24 TB bundle | 24 | 15000 | 625 |

What is significant to observe from this data is the price disparity in the cost/TB of a given disk drive versus the cost of attaching that disk drive to a computer system using a conventional NAS or other prior art attachment architecture. Generally speaking, the cost of attaching an individual disk drive to a computer using a NAS or other similar architecture increases the cost of the attached disk drive by approximately a factor of 4 to 10. Additionally, this factor increases as the overall disk drive array size is increased, making the larger arrays MORE expensive to implement than their smaller counterparts.

Deficiencies in the Prior Art

The prior art as detailed above suffers from the following deficiencies:

- The ratio of permissible disk drives to drive controllers is generally never more than eight (8), but may be as low as two (2). This low ratio means that to extend total storage capacity in a data storage system requires the addition of both disk drives and host controllers, or alternatively replacement of current disk drives with units of larger capacity (if possible).
- The HBA interfaces generally must utilize additional software (or in some cases firmware) to implement RAID functionality within storage elements attached to a given computer system. This generally makes it impossible to implement RAID functionality within a given computer system in a retrofit application.
- It is impossible to incrementally increase the storage capacity of a given storage system using conventional storage architectures.
- Existing NAS and related RAID architectures increase overall system costs by requiring additional host controller interfaces and/or system infrastructure.
- Existing NAS and related RAID architectures may limit the type of file system supported by the data storage system. Such configurations may not be fully compatible with the host operating system from which the storage array is accessed. As an example, many NAS systems utilize XFS file system architectures, which are not fully compatible with the NTFS file structures that are used on many MICROSOFT® WINDOWS® brand operating systems.
- The hardware cost overhead of adding NAS and other related disk drive array technologies to existing computer systems creates an significant increase in the cost/TB of a given storage array. Specifically, the cost associated with interfacing the storage array to a computer system dwarf the costs associated with the disk drive storage elements, making the overall system implementation very inefficient.
- The incremental cost of adding a given disk drive to a computer system using NAS and other related architectures increases the per-drive incremental disk drive cost by a factor of 5-10, vastly increasing the cost of additional disk drive storage on a computer system.

While some of the prior art may teach some solutions to several of these problems, the core issue of inexpensively extending data storage systems within existing computer systems that have limited HBA interface capabilities has not been addressed by the prior art.

OBJECTIVES OF THE INVENTION

Accordingly, the objectives of the present invention are (among others) to circumvent the deficiencies in the prior art and affect the following objectives:

(1) Provide for a data storage architecture extension system and method that permits incremental increases in overall storage capacity.

(2) Provide for a data storage architecture extension system and method that permits additional disk drives to be added to a storage array without the need for additional HBA interfaces.

(3) Provide for a data storage architecture extension system and method that permits additional disk drives to be added to a storage array without the need for software modifications of the operating system or changes to the partition structure of the storage device.

(4) Provide for a data storage architecture extension system and method that permits RAID functionality to be added to a given computer system without the need for hardware and/or software modifications of the system software.

(5) Provide for a data storage architecture extension system and method that permits a plethora of disk drives to be attached to a single HBA interface.

(6) Provide for a data storage architecture extension system and method that permits transparent replacement of failing disk drives in a storage array.

(7) Provide for a data storage architecture extension system and method that permits host operating system file system structures to be created on the storage array.

(8) Provide for a data storage architecture extension system and method that permits addition of storage array elements to a computer system while minimizing the cost overhead associated with attaching the individual disk drives.

(9) Provide for a data storage architecture extension system and method that permits addition of storage array elements to a computer system at a cost substantially lower than that achievable with NAS and related technologies.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION (0900)

A brief summary of the general architecture of the present invention is illustrated in FIG. 9 (0900), which contrasts the disk drive architecture extension system/method taught by the present invention as compared to the prior art configuration generally illustrated in FIG. 1 (0100). Here we see that the system application architecture illustrated in FIG. 9 (0900) includes a computer system (0910) (typically running under control of an operating system (0912)) further comprising a system bus (0911) with one or more host bus adapters (HBAs) that service two exemplary disk drive interfaces: a PATA disk drive interface (0920) and a SATA disk drive interface (0930). As with the conventional prior art configuration of FIG. 1 (0100), these disk drive interfaces are generally limited to 2-4 disk drives per controller.

The present invention introduces the concept of a pass-thru disk drive controller (PTDDC) (0941, 0942, 0943, 0944, 0951, 0952, 0953, 0954) within this conventional framework as a direct interface between the host bus adapter (HBA) disk drive interface and the corresponding disk drives serviced (0921, 0922, 0923, 0924, 0931, 0932, 0933, 0934). However, note in this architecture that the PTDDCs (0941, 0942, 0943, 0944, 0951, 0952, 0953, 0954), while servicing a single disk drive (0921, 0922, 0923, 0924, 0931, 0932, 0933, 0934), may be daisy-chained. This sequential daisy-chaining of PTDDCs (0941, 0943), (0942, 0944), (0951, 0953), (0952, 0954) permits a plethora of disk drives to be electrically attached to a single HBA interface.

The function of the PTDDC (0941, 0942, 0943, 0944, 0951, 0952, 0953, 0954) is to receive data/control information from a HBA interface port and translate this information to a logical block address (LBA) associated with one or more of the disk drives attached to the PTDDC interfaces. This LBA mapping occurs transparently to the function of the HBA interface such that as far as the computer system (0910) (and more importantly any operating system (0912) running on the computer system (0910)) is concerned the chain of PTDDCs appears as one physical disk drive with a logical capacity comprising (at a minimum) the sum of the maximum number of logical blocks within the PTDDC disk drive daisy-chain. In contrast to the prior art approaches to the addition of expansion data storage, the present invention does not require a "file system aware" approach to data storage on the PTDDC daisy-chain storage array. Rather, the translation of LBA addresses occurs seamlessly and rapidly through each PTDDC (as necessary) to effect proper placement and recovery of data on a given disk drive within the PTDDC daisy-chain string.

While the exemplary embodiment illustrated in FIG. 9 (0900) utilizes PATA/SATA disk drives, the present invention is not limited to any specific disk drive or any specific disk drive HBA or interface bus. Rather, the invention is sufficiently generalized to work with any data storage element. Additionally, with the use of proper volume formatting the daisy-chained PTDDC disk drive string can be incrementally increased in size after initial formatting/initialization by the operating system (0912). Additional embodiments anticipate the incorporation of RAID technologies within the PTDDC that is totally transparent to the operation of the computer system (0910) and/or operating system (0912) running thereon. Thus, using the PTDDC daisy-chained architecture it is possible to implement RAID storage arrays (of indeterminate size) without the need for a separate RAID controller or specialized software. This permits retrofitting existing systems for RAID support and/or incorporating RAID support in cost-sensitive data storage applications.

An important benefit to this architecture is the fact that from the computer system (0910) and operating system (0912) point of view, the PTDDC daisy-chains appear as one large physical drive, indistinguishable from a single disk drive with appropriately sized LBA characteristics. Thus, no software modifications are necessary to utilize the daisy-chained PTDDC system.

Furthermore, in computer systems with limited HBA interfaces, the effective storage capacity of the HBA interface can be expanded to include a plethora of disk drives without the requirement of additional hardware (which might not be possible in some hardware environments). This permits essentially unlimited expansion of the data storage capability of a given HBA interface, irrespective of the available capacity of disk drive storage elements.

Finally, the present invention while having many preferred embodiments, may include preferred exemplary embodiments wherein the PTDDC comprises an application specific integrated circuit (ASIC) mounted on a printed circuit board (PCB) that is configured to plug into the back of a conventional disk drive interface port, permitting these PCB modules to be connected in disk drive stacks, thus allowing reduced cable management and minimal cost overhead for implementation of the chained. Based on an estimated cost of USD$1.00 per square inch of populated printed circuit board, the present invention cost estimate is less than USD$4.00 (and asymptotically approaching USD$1.00 in quantity), making the use of the PTDDC concept a very cost effective alternative to data storage architectures costing hundreds of times more.

BRIEF DESCRIPTION OF THE DRAWINGS

For a fuller understanding of the advantages provided by the invention, reference should be made to the following detailed description together with the accompanying drawings wherein.

DESCRIPTION OF THE PRESENTLY PREFERRED EXEMPLARY EMBODIMENTS

Figure 1:
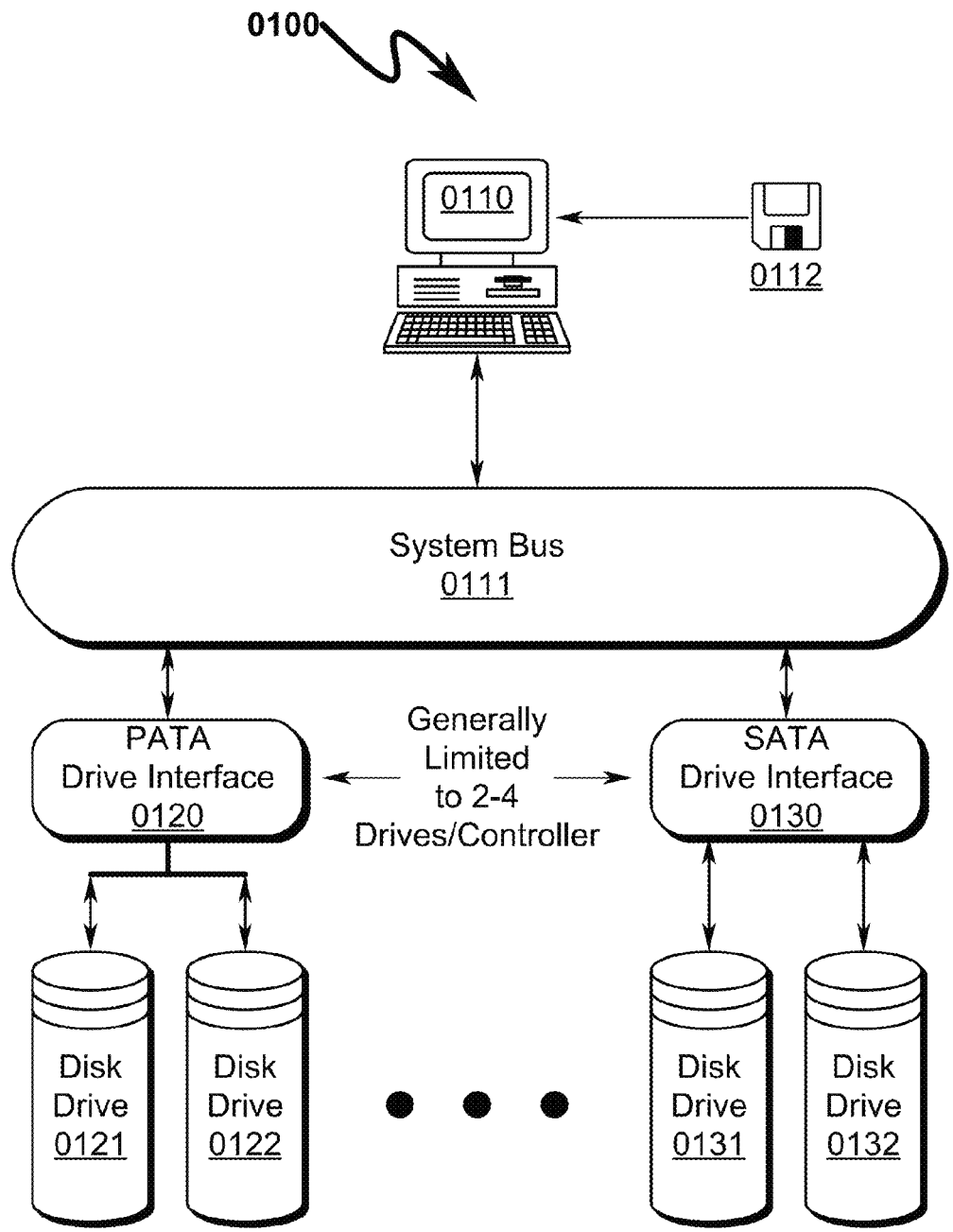
FIG. 1 illustrates a prior art conventional data storage architecture.
Figure 2:
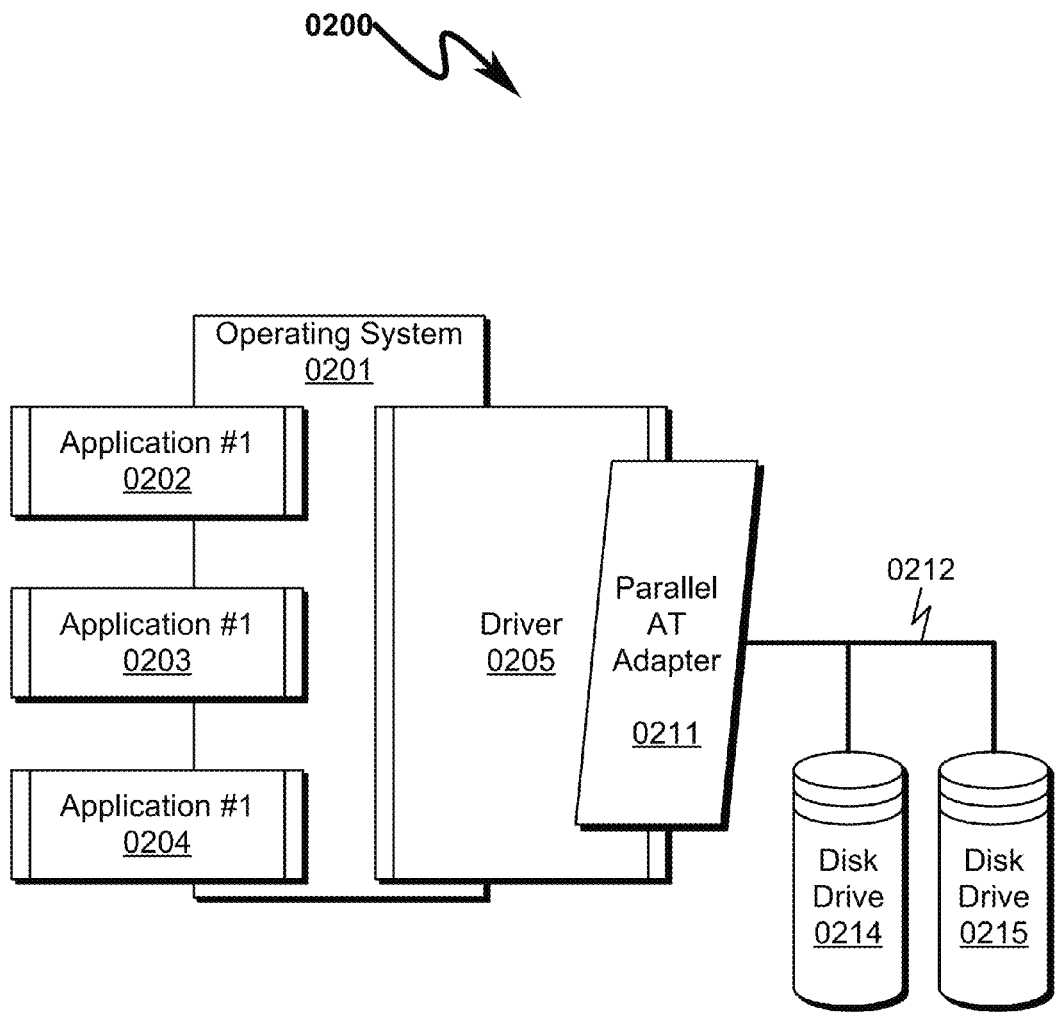
FIG. 2 illustrates a prior art parallel ATA (PATA) data storage architecture.
Figure 3:
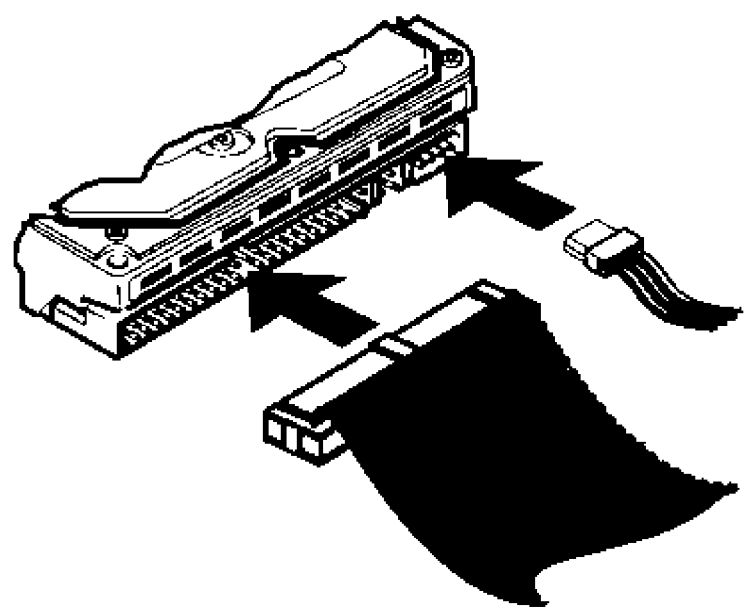
FIG. 3 illustrates a prior art parallel ATA (PATA) data storage architecture physical interface.
Figure 4:
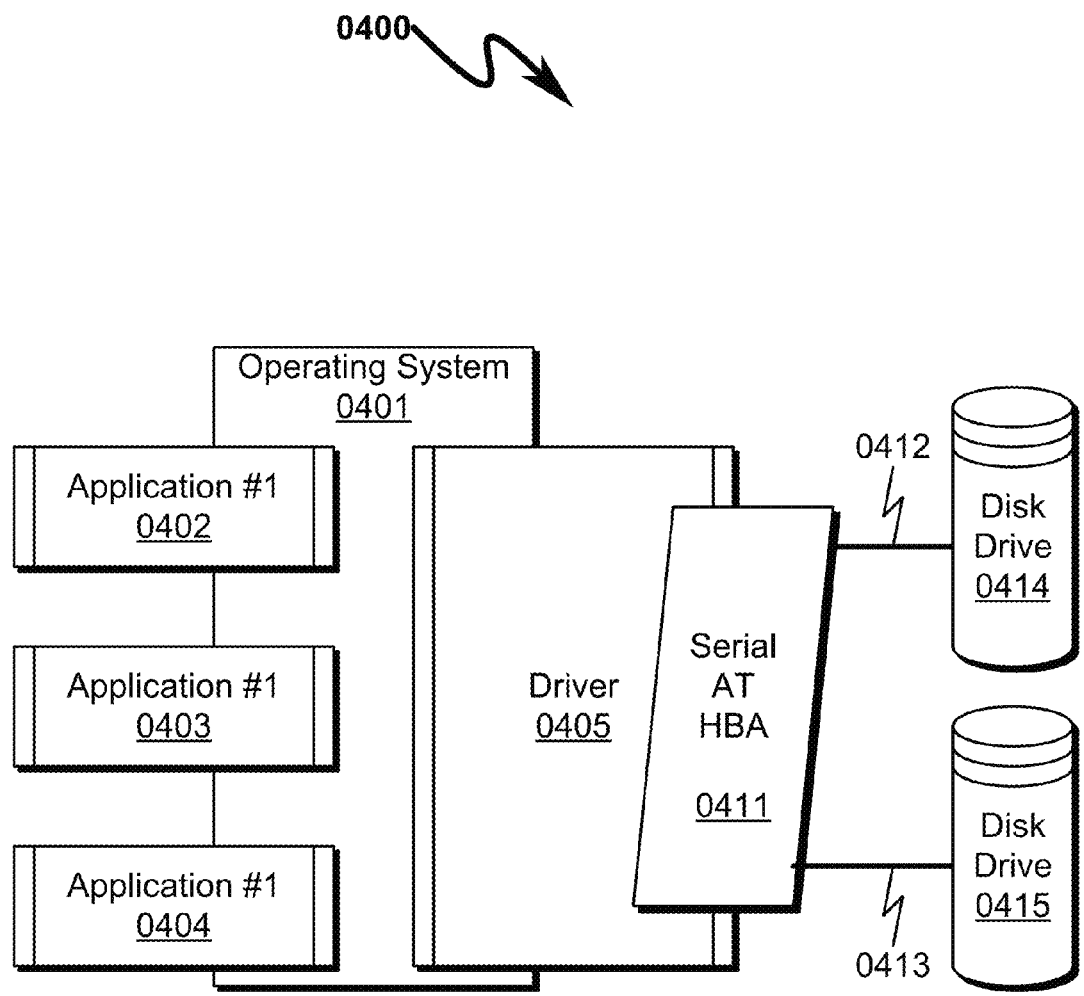
FIG. 4 illustrates a prior art serial ATA (SATA) data storage architecture.
Figure 5:
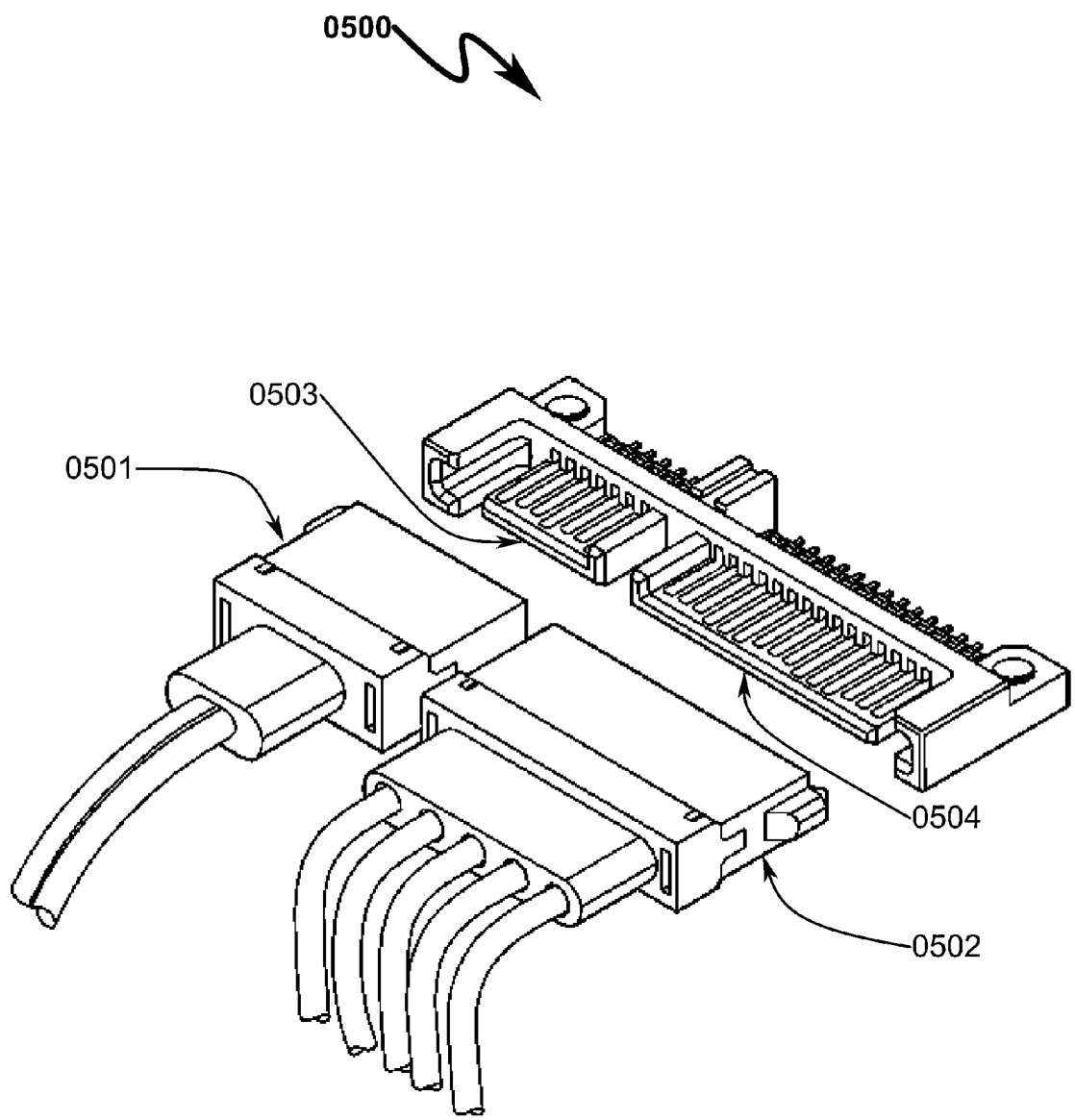
FIG. 5 illustrates a prior art serial ATA (SATA) data storage architecture physical interface.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a DATA STORAGE ARCHITECTURE EXTENSION SYSTEM AND METHOD. However, it should be understood that this embodiment is only one example of the many advantageous uses of the innovative teachings herein. In general, statements made in the specification of the present application do not necessarily limit any of the various claimed inventions.

Moreover, some statements may apply to some inventive features but not to others.

HBA/DDI Port Not Limitive

The present invention may be applied to a wide variety of disk drive storage systems incorporating a wide variety of host bus adapter (HBA) and disk drive interface (DDI) physical hardware interfaces. While many preferred embodiments may be configured wherein the HBA and DDI are of the same type of physical hardware interface, the present invention is not limited to this configuration, and the HBA and DDI may be of any disparate type of hardware interface.

PTI/PTO Port Not Limitive

The present invention may be advantageously configured in some situations where the pass-thru input (PTI) port and pass-thru output (PTO) port are of the same hardware configuration as the HBA interface, but the present invention does not require this conformity.

Host Bus Adapter (HBA) Not Limitive

The present invention may be applied to a wide variety of disk drive storage systems incorporating a wide variety of host bus adapter (HBA) interfaces. Generally speaking, the HBA interface may vary widely among current disk drive subsystems as well as enhancements and/or replacements to these interfaces that may occur in the future. The present invention, while suitable for many current and future HBA interfaces, is particularly suitable for implementation using parallel ATA (PATA/PATAPI) (also identified as IDE/EIDE), serial ATA (SATA/SATAPI/eSATA/microSATA), Fibre Channel, Serial Storage Architecture (SSA), and universal serial bus (USB) interfaces. Thus, the present invention, while not limiting the scope of the HBA used with the system, may be implemented in some preferred exemplary embodiments using one or more of the HBA interfaces listed.

Many preferred exemplary embodiments utilize the serial ATA (SATA) disk drive interface standard. This standard, available from the Serial ATA International Organization (www.sata-io.org), is hereby incorporated by reference in this document.

File System Not Limitive

Many preferred exemplary embodiments of the present invention may incorporate an on-disk file system that is compatible with a particular operating system running on the host computer system to which the HBA port of the PTDDC is connected. While the present invention makes no limitation on the on-disk file system which may be implemented on a logical storage system comprising a daisy-chained series of PTDDC controllers (and their associated attached disk drives), the present invention does specifically anticipate that many preferred exemplary embodiments may implement an on-disk file structure selected from a group consisting of EXT2, EXT3, EXT4, FAT12, FAT16, FAT32, Files-11 (ODS), HFS, HFS Plus (HFS+), NTFS, and XFS.

Within this context, the present invention prefers several file systems, the table below specifying those known to be preferred at this time:

| FILE SYSTEM | MAXIMUM FILE SIZE | MAXIMUM VOLUME SIZE |
| --- | --- | --- |
| exFAT | 127 PiB | 64 ZiB, 512 TiB |
| NTFS | 16 EiB | 16 EiB |
| HFS Plus | 8 EiB | 8 EiB |
| FFS | 8 ZiB | 8 ZiB |
| UFS1 | 226 TiB | 226 TiB |
| UFS2 | 32 PiB | 1 YiB |
| ext2 | 2 TiB | 32 TiB |
| ext3 | 2 TiB | 32 TiB |
| ext4 | 16 TiB | 1 EiB |
| Lustre | 320 TiB (on ext4) | 1 YiB-10 PB |
| GPFS | 512 YiB | 512 YiB (4 PiB tested) |
| GFS | 8 EiB | 8 EiB |
| ReiserFS | 2 GB-8 TiB | 16 TiB |
| NILFS | 8 EiB | 8 EiB |
| Reiser4 | 8 TiB on x86 | Unknown |
| XFS | 8 EiB | 8 EiB |
| JFS1 | 8 EiB | 4 PiB |
| JFS | 4 PiB | 32 PiB |
| QFS | 16 EiB | 4 PiB |
| BFS | 260 GiB | 2 EiB |
| VxFS | 256 TiB | 256 TiB |
| UDF | 16 EiB | Unknown |
| ZFS | 16 EiB | 16 EiB |
| VMFS2 | 4 TiB | 64 TiB |
| VMFS3 | 2 TiB | 64 TiB |
| HAMMER | Unknown | 1 EiB |
| Btrfs | 16 EiB | 16 EiB |
| LEAN | 8 EiB | 8 EiB |

Format/Initialization not Limitive

Within the context of on-disk file system implementations on a variety of computer operating systems, there is generally some ambiguity with respect to the terminology used to describe various activities associated with creating a logical file structure in these contexts. Specifically, the term "format" may mean anything from a low-level surface format of the disk drive media as well as in some cases including the incorporation of a file system after this low-level surface format is complete. Similarly, disk drive "initialization" while typically referring only to the incorporation of an on-disk logical structure, can in some instances incorporate "partitioning" of the disk drive into various logical drive structures. Within the context of this document, the term "format" will generally be used to incorporate the broader of these meanings, incorporating low-level surface formatting, partitioning, and/or on-disk logical file structure initialization. Within the application context of the claimed invention, the scope of application of this term will necessarily be application specific based on the operating system and hardware context.

Logical Partitioning Not Limitive

The present invention makes no limitation on the underlying file system that may be present on the logical volume comprising one or more disks connected in a PTDDC sequential chain as described herein. Within the scope of this anticipation are situations in which the logical PTDDC volume is partitioned using one or more disk drive file system partitioning techniques to produce logically partitioned sub-drives within the logical PTDDC volume. This partitioning capability is well known in the data storage and file system arts, and will not be detailed here.

System Overview (1000)

Figure 10:
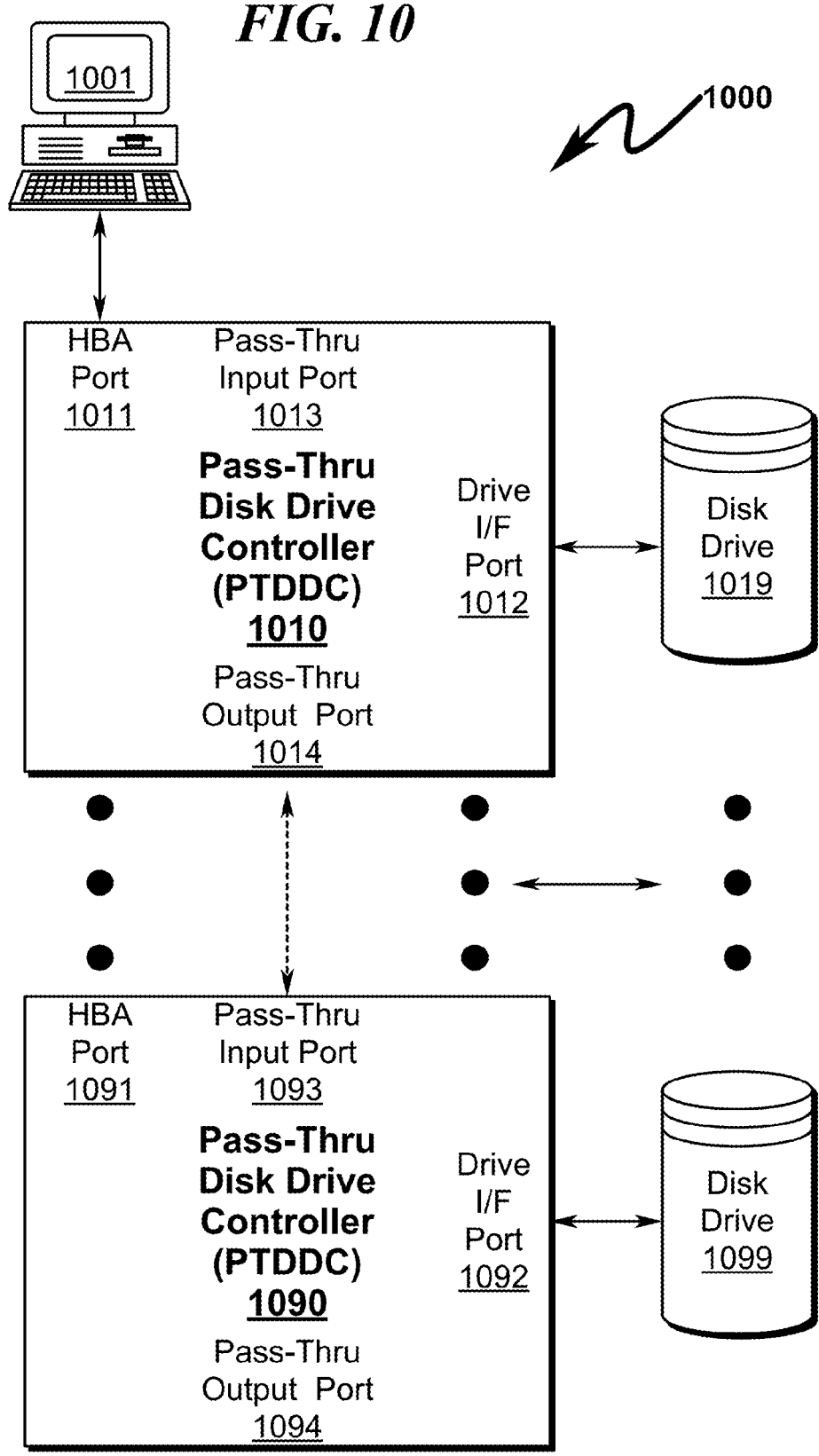
FIG. 10 illustrates a general system block diagram illustrating a preferred exemplary embodiment of the present invention.

The present invention and typical system application as applied to a data storage architecture extension system is generally illustrated in FIG. 10 (1000). The system herein generally described is targeted in this exemplary embodiment to adapt a conventional computer-based data storage architecture to incorporate additional extended storage capabilities. The system context as generally illustrated in FIG. 10 (1000) utilizes a computer system (1001) with conventional HBA interface(s) to communicate with a pass-thru-disk drive controller (PTDDC) (1010) that is the heart of the disclosed invention.

The PTDDC (1010) incorporates three or four interface ports. The first port is designated the host bus adapter (HBA) port (1011) and acts as the electrical connection to the HBA interface on the host computer (1001). The second port is the disk drive I/F port (1012) that acts as an emulated HBA port interface to the disk drive (1019) being serviced. The pass-thru input (PTI) port (1013) and pass-thru output (PTO) port (1014) permit multiple PTDDC entities (1010, 1090) to be daisy-chained together, with each PTDDC controlling one disk drive (1019, 1099) in the storage array. As the PTDDC units (1010, 1090) may be daisy-chained together to any desired level of nesting, there is no explicit limit on the number of disk drives (1019, 1099) that may be serviced by this architecture from a single HBA port (1011) connected to a single computer (1001) HBA interface.

The functionality of the PTDDC (1010, 1090) is as follows. Commands and/or data that originate from the computer (1001) via the HBA interface are presented to the HBA port (1011) and interpreted by the PTDDC (1010) to determine if the requested data transfer should be applied to a particular disk drive (1019) attached to the PTDDC (1010). This transfer request generally involves a logical block address (LBA) identifying the starting block to be transferred to/from the disk drive (1019). If the requested LBA is serviced by the attached disk drive (1019), then the request is passed on to the current disk drive attached to the PTDDC (1010). If not, the requested transfer is optionally translated by reducing the LBA request by the size of the attached disk drive (1019) and/or passed on to subsequent PTDDC (1090) units for processing, depending on the particular embodiment of the invention. Once the data transfer is attached to or associated with a particular disk drive (1019, 1099), the data is read from or written to the particular disk drive (1019, 1099) that has been activated by the attached PTDDC (1010, 1090).

While the present invention anticipates that some embodiments may integrate the HBA port (1011) and pass-thru input (PTI) port (1013) functionality into a single interface connection, many preferred embodiments may utilize two separate ports for these connections to enable a simplification of cabling between PTDDC printed circuit board (PCB) connections that support stacked arrays of disk drives (1019, 1099) in a given storage array.

Method Overview

Sequential Incremental Mapping Method (1100)

Figure 11:
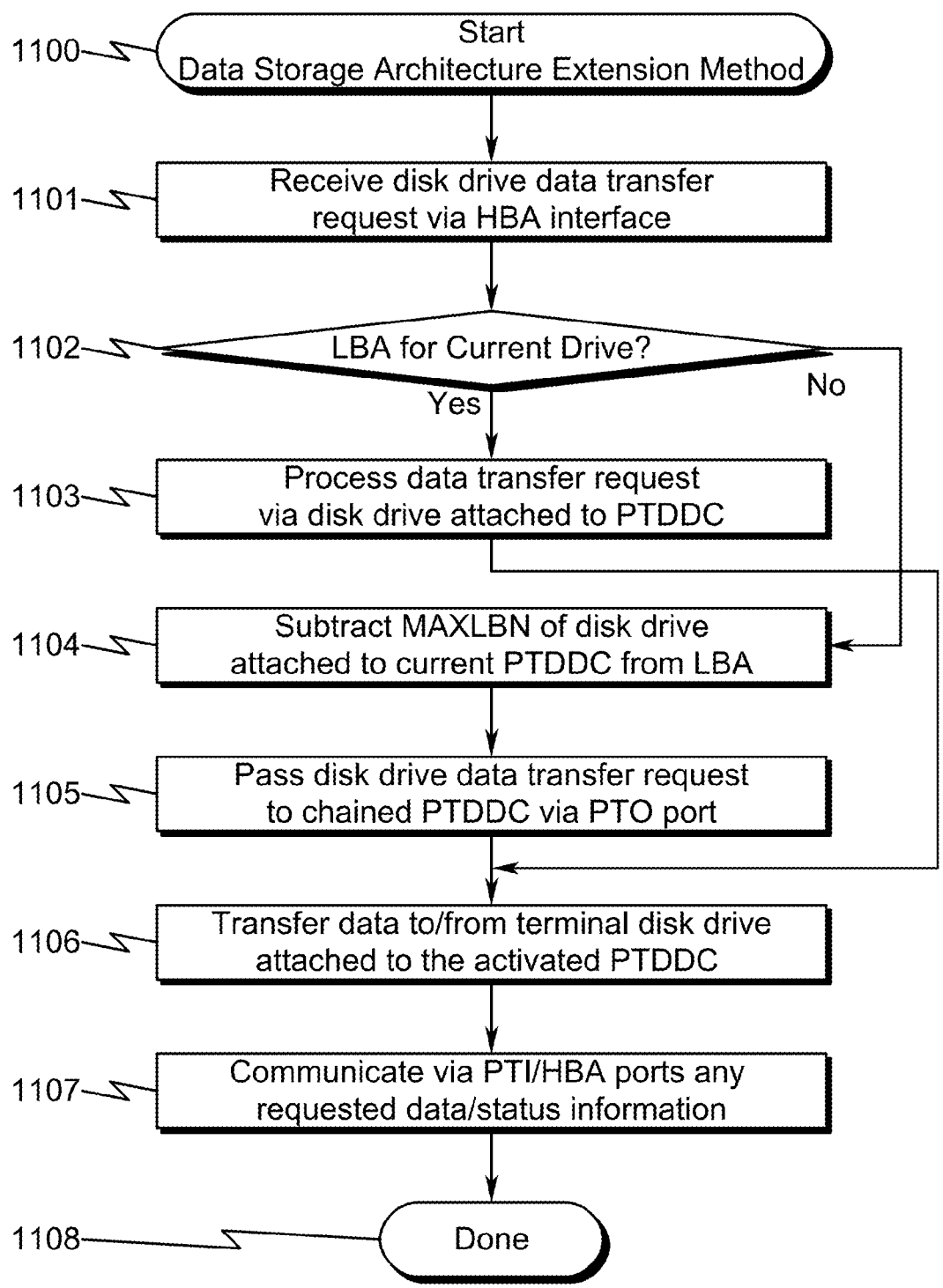
FIG. 11 illustrates a general method flowchart illustrating a preferred exemplary embodiment of the present invention.

The present invention method can be generally illustrated by the preferred exemplary embodiment illustrated in FIG. 11 (1100). The general steps of this method comprise the following:

Receiving a disk drive transfer request via the HBA input port (1101);
Determining if the LBA associated with the disk drive data transfer request is mapped to the disk drive attached to the current PTDDC, and if not, proceeding to step (4) (1102);
Processing the disk drive data transfer request via the disk drive attached to the current PTDDC, and then proceeding to step (6) (1103);
Subtracting the MAXLBN of the current disk drive attached to the current PTDDC from the disk drive data transfer LBA (1104);
Passing the disk drive data transfer request to the chained PTDDC via the PTO port (1105)
Completing the disk drive data transfer request by transferring data to/from the terminal disk drive attached to the activated PTDDC (1106);
Communicating via the PTI and HBA ports any data/status information requested by the disk drive data transfer request (1107).

This general method as illustrated in FIG. 11 (1100) may be modified heavily depending on a number of factors, with rearrangement and/or addition/deletion of steps anticipated by the scope of the present invention.

Integration of this and other preferred exemplary embodiment methods in conjunction with a variety of preferred exemplary embodiment systems described herein is anticipated by the overall scope of the present invention.

Direct Mapping Method (200)

It should be noted that the method illustrated in FIG. 11 (1100) assumes that the PTDDC actually modifies the data transfer request before passing it on to subsequent PTDDC/disk drive pairs. Another equivalent method merely passes on ALL disk drive data transfer requests, with only the PTDDC associated with the mapped LBA initiating the data transfer to/from the attached disk drive. This present invention method embodiment direct mapping variation can be generally illustrated by the preferred exemplary embodiment illustrated in FIG. 12 (1200). The general steps of this method comprise the following:

Receiving a disk drive transfer request via the HBA input port (1201);
Passing the disk drive data transfer request to the chained PTDDC via the PTO port (1202);
Determining if the disk drive data transfer request LBA is mapped to the disk drive connected to the current PTDDC, and if not, proceeding to step (6) (1203);
Subtracting the base LBN of the current PTDDC from the disk drive data transfer request LBA (1204);
Processing the disk drive data transfer request via the disk drive attached to the current PTDDC with the modified LBA (1205);
Transferring data to/from the disk drive attached to the activated PTDDC (1206);
Communicating via the PTI and HBA ports any data/status information requested by the disk drive data transfer request (1207).

Figure 12:
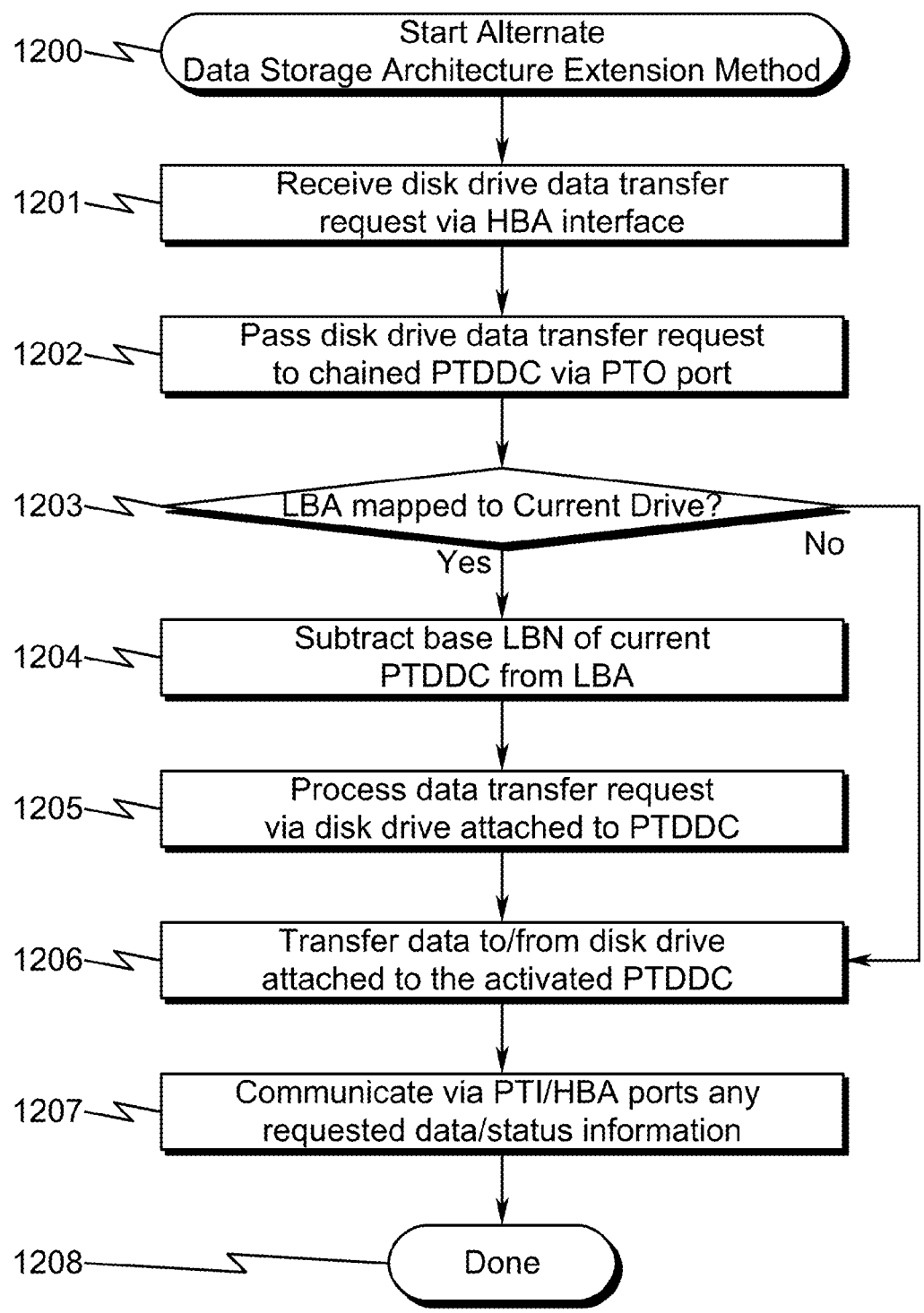
FIG. 12 illustrates a alternate general method flowchart illustrating a preferred exemplary embodiment of the present invention.

This general method variation as illustrated in FIG. 12 (1200) may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Logical Volume Mapping (1300)

The present invention may incorporate one or more PTDDCs to create "logical volumes" that are formed by concatenating the physical block address space of physical disk drives in a transparent manner. This transparent formation of the logical volume from the physical logical block address (LBA) space of physical drives permits an arbitrary concatenation of physical drives to appear as one logical volume to the HBA controller interface. Since the HBA interface sees only one logical disk drive that is sized to incorporate all the physical blocks of the attached disk drives, no software or hardware modifications need be made to the computer system or operating system software to support logical disk drives of arbitrary size.

Figure 13:
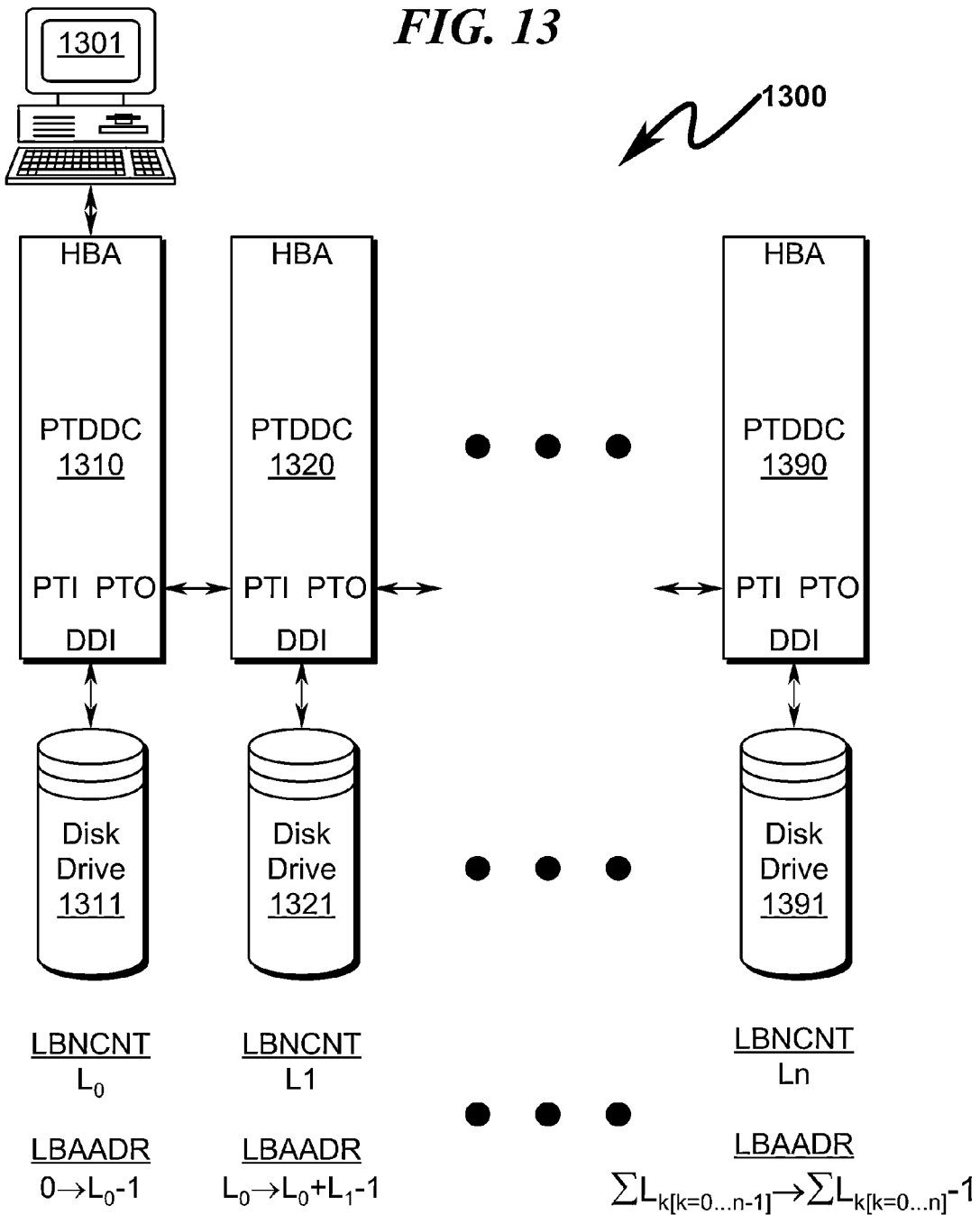
FIG. 13 illustrates an exemplary embodiment of the present invention depicting concatenation of disk drive storage within the context of a single PTDDC.

One preferred exemplary embodiment of this concept is depicted in the pictorial example generally illustrated in FIG. 13 (1300). Here we see a computer system (1301) connected to the HBA port of a PTDDC (1310) connected to a disk drive (1311). This PTDDC (1310) forms a chain of PTDDCs (1310, 1320, 1390) that have associated with each PTDDC a corresponding disk drive (1311, 1321, 1391). Each attached disk drive (1311, 1321, 1391) has a corresponding logical block count (LBNCNT) that is symbolically designated at $L_0, L_1, \ldots, L_n$ in the figure. This logical block count represents the physical number of logical blocks that is accessible by the disk drive. Associated with each disk drive is also a logical block address (LBA) that ranges from zero (0) to the logical block count minus one (1), as each disk drive is generally addressed by a number ranging from zero to the maximum physical logical block count value minus one. Thus, as seen by the diagram, the LBA address value of the chained disk drives is based on the sum of previous LBNCNT values within the PTDDC disk drive chain, with each disk drive having a base LBA value and logical block extent associated with its particular placement within the overall logical volume mapping.

Note that in this configuration it is important to distinguish between the number of physical blocks present on a given disk drive and the maximum addressable block or maximum LBA accessible on a given disk drive. Many disk drives may have the capability to "size" the drive with modification of internal registers so that the maximum accessible block address is less than the total number of available blocks on the disk drive. This capability permits some disk drives to be retrofit into situations that require a disk drive of a specific size that is less than the number of physical blocks available in the disk drive. Therefore, in the context of the present invention, the maximum LBA value of the disk drive may represent a value smaller than the maximum number of available physical blocks on the disk drive, depending on the configuration of the disk drive maximum addressable logical address.

It should be noted that this particular example as generally illustrated in FIG. 13 (1300) represents only one method of mapping the LBA addresses of each disk drive to the logical LBA address space as seen by the host computer (1301). As discussed later, the LBA mapping need not be sequential with respect to each individual disk drive.

LBA Mapping Example #1

Sequential Incremental Mapping

The teachings of the present invention as applied to some preferred exemplary embodiments utilizing a sequential incremental mapping method as generally described in the flowchart of FIG. 11 (1100) can be understood via the use of an exemplary daisy-chained drive configuration. In this example we will use four drives, although the present invention makes no limitation on the number of drives in a PTDDC daisy-chain configuration. In this example, the following disk drives will be connected via PTDDC interfaces to a main HBA interface on a computer system:

| Disk Drive # | Capacity (TB) | Capacity (LBNCNT) | Capacity (bytes) |
|---|---|---|---|
| 1 | 1.0 TB | 1,953,525,168 | 1,000,204,866,016 |
| 2 | 1.5 TB | 2,930,277,168 | 1,500,301,910,016 |
| 3 | 2.0 TB | 3,907,029,168 | 2,000,398,934,016 |
| 4 | 3.0 TB | 5,860,533,168 | 3,000,592,982,016 |

Using the sequential incremental mapping method as described above, a logical drive access starting at logical block (5,000,000,000) would proceed as follows:
  The PTDDC attached to disk drive #1 receives the data transfer request and notes that the starting LBA of the transfer address (5,000,000,000) exceeds the maximum LBA count of disk drive #1 (1,953,525,168).
  The LBA of the data transfer request is reduced by the maximum LBA count of disk drive #1 (1,953,525,168), resulting in a new disk transfer LBA value of (5,000,000,000)−(1,953,525,168)=(3,046,474,832).
  This new LBA transfer address (3,046,474,832) is passed to disk drive #2 via the PTDDC PTO port.
  The PTDDC attached to disk drive #2 receives the modified data transfer request (3,046,474,832) and notes that the starting LBA of the transfer address exceeds the maximum LBA count of disk drive #2 (2,930,277,168).
  The LBA of the data transfer request (3,046,474,832) is reduced by the maximum LBA count of disk drive #2 (2,930,277,168), resulting in a new disk transfer LBA value of (3,046,474,832)−(2,930,277,168)= (116,197,664).
  The PTDDC attached to disk drive #3 receives the modified data transfer request (116,197,664) and notes that the starting LBA of the transfer address is less than the maximum LBA count of disk drive #3 (3,907,029,168).
  The PTDDC associated with disk drive #3 passes the modified data transfer request LBA (116,197,664) to disk drive #3 and data is transmitted to/from disk drive #3 based on the remaining specifications of the data transfer request.
  Any data to be read from disk drive #3 is relayed back through the PTDDC daisy-chain of PTI/PTO ports back to the originating HBA port associated with the PTDDC connected to disk drive #1.

The above scenario may be modified in situations where the disk drive data transfer request crosses the logical block boundaries associated with a given pair of disk drives. For example, a sufficiently large data transfer request that spans disk volumes can bifurcated into two data transfer requests: one that is processed by the initially mapped disk drive in the PTDDC chain, and the remainder of the transfer can be processed by the next disk drive in the PTDDC chain. One skilled in the art will recognize that it is a simple matter to bifurcate these data transfer requests by limiting the first data transfer request to the available space in the initially mapped disk drive and reducing the transfer size for the next disk drive in the chain (after substituting a value of zero (0) for the initial data transfer block LBA value for this drive).

LBA Mapping Example #2: Direct Mapping

The teachings of the present invention as applied to some preferred exemplary embodiments utilizing a direct mapping method as generally described in the flowchart of FIG. 12 (1200) can be understood via the use of an exemplary daisy-chained drive configuration. In this example we will use four drives, although the present invention makes no limitation on the number of drives in a PTDDC daisy-chain configuration. In this example, the following disk drives will be connected via PTDDC interfaces to a main HBA interface on a computer system:

| Disk Drive # | Capacity (TB) | Capacity (LBNCNT) | Capacity (bytes) |
|---|---|---|---|
| 1 | 1.0 TB | 1,953,525,168 | 1,000,204,866,016 |
| 2 | 1.5 TB | 2,930,277,168 | 1,500,301,910,016 |
| 3 | 2.0 TB | 3,907,029,168 | 2,000,398,934,016 |
| 4 | 3.0 TB | 5,860,533,168 | 3,000,592,982,016 |

This disk drive information is used to generate a disk drive LBA mapping table associated with each disk drive (and accessible by the individual PTDDC controllers). This mapping table has the following form in many preferred embodiments:

| Disk Drive | Capacity (TB) | Start LBA | MAX LBA |
|---|---|---|---|
| 1 | 1.0 TB | 0 | 1,953,525,168 |
| 2 | 1.5 TB | 1,953,525,168 | 4,883,802,336 |
| 3 | 2.0 TB | 4,883,802,336 | 8,790,831,504 |
| 4 | 3.0 TB | 8,790,831,504 | 14,651,364,672 |

Using the direct mapping method as described above, a logical drive access starting at logical block (5,000,000,000) would proceed as follows:

The PTDDC attached to disk drive #1 receives the data transfer request and notes that the starting LBA of the transfer address (5,000,000,000) is equal to or exceeds the maximum LBA address of disk drive #1 (1,953,525, 168). The data transfer request is passed to disk drive #2.

The PTDDC attached to disk drive #2 receives the data transfer request and notes that the starting LBA of the transfer address (5,000,000,000) is equal to or exceeds the maximum LBA address of disk drive #2 (4,883,802, 336). The data transfer request is passed to disk drive #3.

The PTDDC attached to disk drive #3 receives the data transfer request and notes that the starting LBA of the transfer address (5,000,000,000) is less than the maximum LBA address of disk drive #3 (8,790,831,504).

The PTDDC associated with disk drive #3 subtracts the starting LBA of the transfer address (5,000,000,000) from the start LBA associated with disk drive #3 (4,883, 802,337) to produce a local LBA starting address for data associated with disk drive #3 (5,000,000,000)−(4, 883,802,337)=(116,197,664). This modified disk drive transfer address (including LBA) is passed to disk drive #3.

The PTDDC associated with disk drive #3 passes the modified data transfer request LBA (116,197,664) to disk drive #3 and data is transmitted to/from disk drive #3 based on the remaining specifications of the data transfer request.

Any data to be read from disk drive #3 is relayed back through the PTDDC daisy-chain of PTI/PTO ports back to the originating HBA port associated with the PTDDC connected to disk drive #1.

The above scenario may be modified in situations where the disk drive data transfer request crosses the logical block boundaries associated with a given pair of disk drives. For example, a sufficiently large data transfer request that spans disk volumes can bifurcated into two data transfer requests: one that is processed by the initially mapped disk drive in the PTDDC chain, and the remainder of the transfer can be processed by the next disk drive in the PTDDC chain. One skilled in the art will recognize that it is a simple matter to bifurcate these data transfer requests by limiting the first data transfer request to the available space in the initially mapped disk drive and reducing the transfer size for the next disk drive in the chain (after substituting a value of zero (0) for the initial data transfer block LBA value for this drive).

LBA Mapping Configuration Storage (1400)

Figure 14:
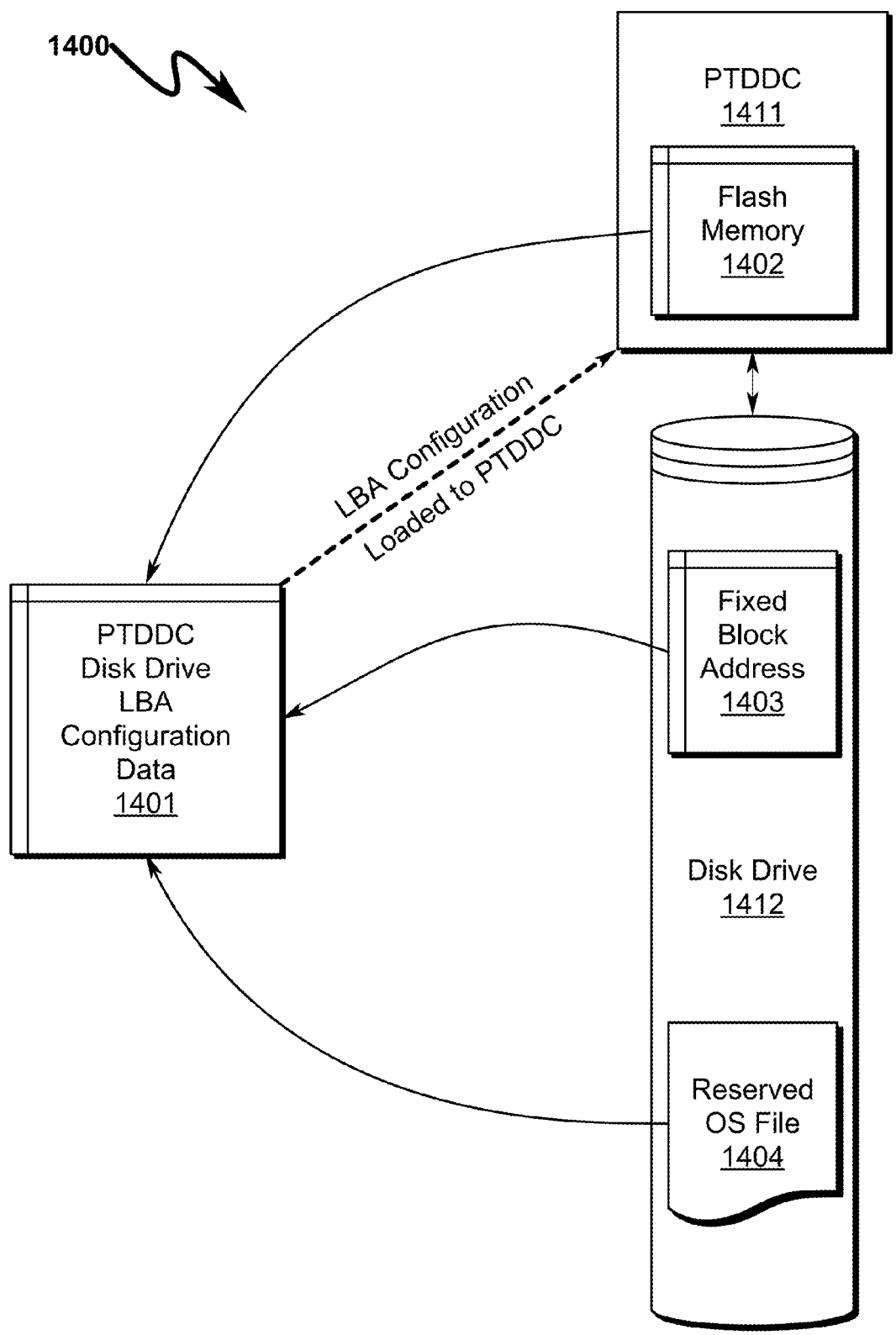
FIG. 14 illustrates several exemplary embodiments of how PTDDC disk drive LBA configuration data may be stored within the context of a PTDDC system.

The present invention as previously described anticipates a variety of methodologies may be used to provide LBA mapping from a logical volume request to the physical mapping to PTDDC connected physical disk drives. As generally illustrated in FIG. 14 (1400), storage of the LBA mapping configuration data (1401) may take many forms, but the present invention anticipates that the following methodologies are superior in many preferred exemplary embodiments:

Flash, FRAM, or non-volatile memory (1402) within each PTDDC (1411) may be utilized to store LBA mapping configuration information (1401). This approach is fast and provides a methodology to permit replacement of disk drives without regard for their contents. Note that this memory may reside outside the ASIC associated with most of the functionality of the PTDDC in many preferred embodiments. Additionally, this memory may be loaded via a serial protocol sent to the PTDDC chain and/or the PTDDC may recognize a fixed LBA block address as comprising the contents of the LBA configuration memory. A preferred exemplary embodiment utilizes logical block zero (0) (or alternatively the logical block address of all 1's) as the configuration data array, with suitable modifications to the LBA mapping logic of the PTDDC to offset all disk drive transfer requests by one logical block.

Dedicated block storage (1403) within the PTDDC attached disk drive (1412) may be utilized to store LBA mapping configuration information (1401). A dedicated block address (1403) on the attached disk drive (1412) may store a table of LBA configuration information (1401) used in the logical remapping process by the PTDDC (1411). Note in cases where the disk drive is capable of indicating a logical volume size less than the physical number of blocks on the volume, the LBA mapping configuration information can be placed BEYOND the last logically addressable block on the disk drive, and retrieved when necessary by adjusting the logical size of the disk drive. Another approach is to allocate specific blocks at the beginning or end of the volume and utilize an LBA offset to remap requests to the disk drive from the HBA interface.

Dedicated file storage (1404) within a file system resident on the PTDDC (1411) attached disk drive (1412). Specific files with optional (SYSTEM,READONLY) attributes may be placed on PTDDC attached disk drives (1412) via a supervisory operating system or application program to contain the LBA mapping information.

The present invention anticipates that these storage methodologies are only exemplary of how this LBA configuration information may be stored, and that combinations of these approaches may be appropriate in some circumstances.

LBA Logical-to-Physical Mapping Configuration (1500, 1600)

Figure 15:
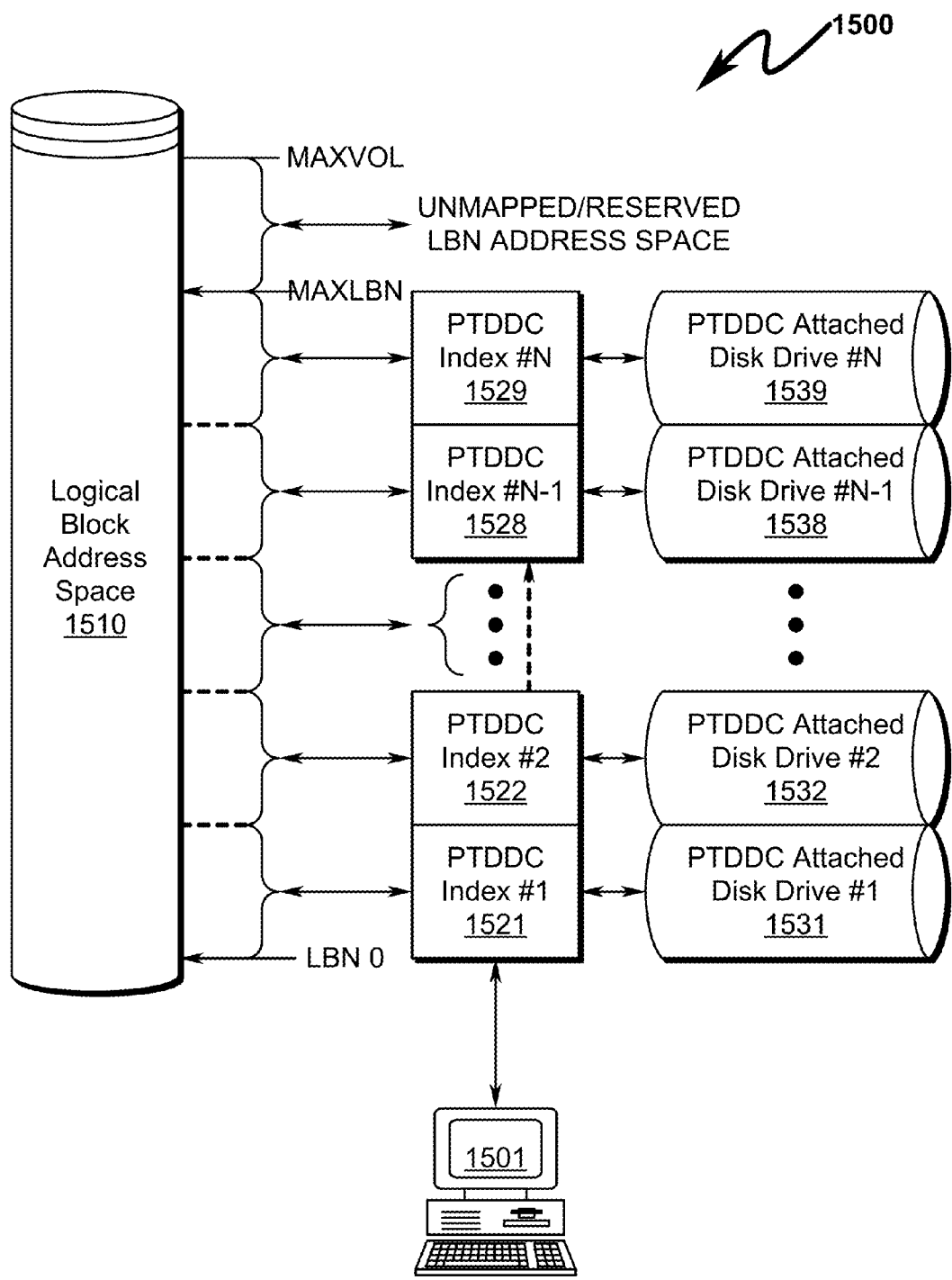
FIG. 15 illustrates an exemplary embodiment of the present invention wherein LBA logical-to-physical mapping occurs sequentially with respect to PTDDC-attached disk drives.

The present invention anticipates a variety of methodologies may be used to provide LBA logical-to-physical mapping from a logical volume request to the physical mapping of PTDDC connected physical disk drives. As previously depicted in FIG. 13 (1300) and generally illustrated in FIG. 15 (1500), LBAs may be mapped contiguously starting from the first LBA of the first PTDDC attached disk drive as seen from the computer system (1501).

Figure 16:
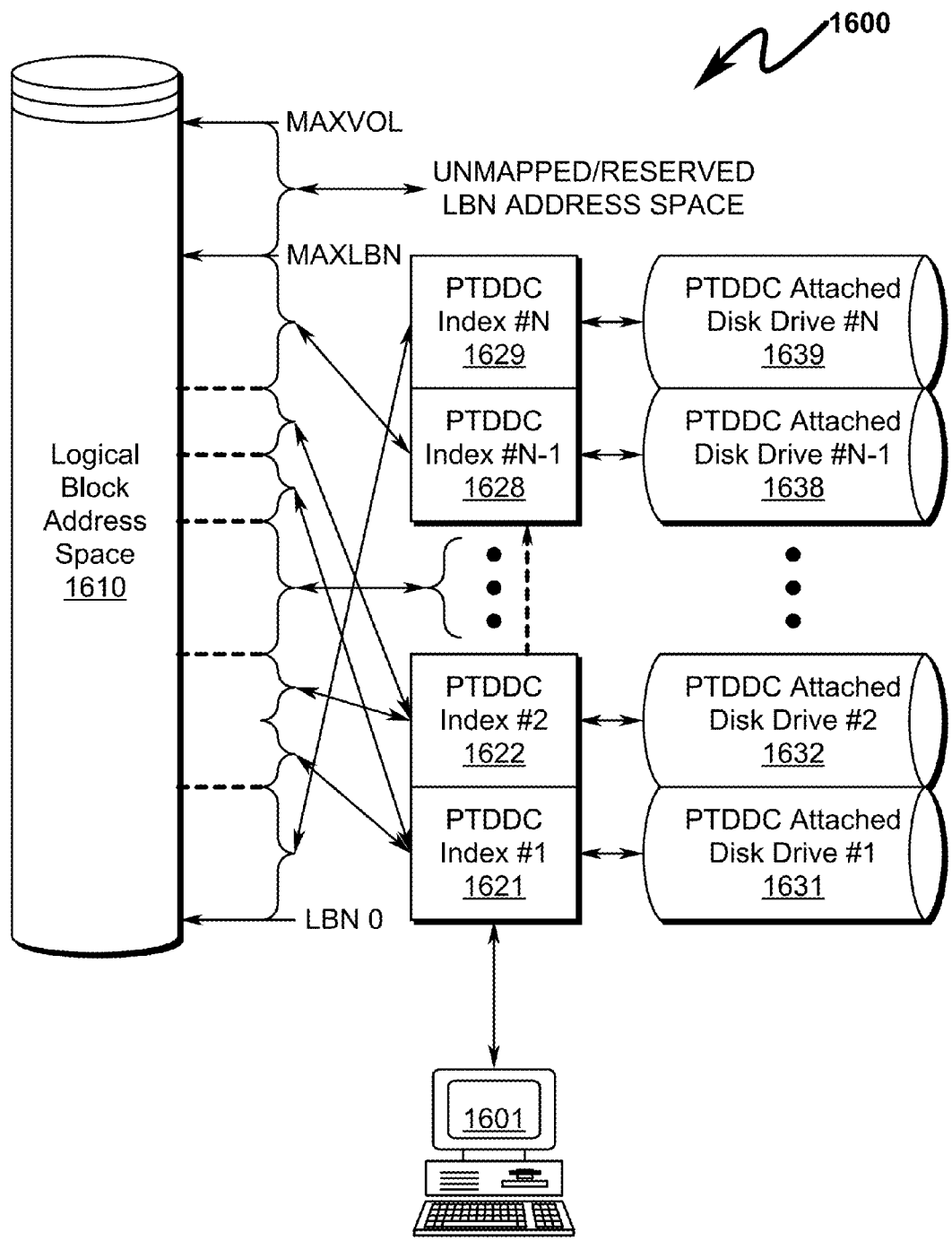
FIG. 16 illustrates an exemplary embodiment of the present invention wherein LBA logical-to-physical mapping occurs non-sequentially with respect to PTDDC-attached disk drives.

However, as generally illustrated in FIG. 16 (1600), LBAs may be mapped non-contiguously wherein the LBA range of a given PTDDC attached disk drive is arbitrarily mapped into the logical address space of the logical drive as seen from the computer system (1601). This approach is more general and permits the greatest flexibility in the physical arrangement of disk drives within a storage array comprising chained PTDDCs. This approach also permits reconfiguration of the array in situations where a failing RAID drive is to be replaced by logically remapping a spare drive within the PTDDC chain to become the mirror drive for another drive within the PTDDC chain.

Furthermore, as generally illustrated in FIG. 16 (1600), a given disk drive (1631, 1632) that is attached to a chained PTDDC (1621, 1622) may have non-contiguous and segmented mapping into the logical address space of the logical block address space (1610). This permits, for example, replacement of a 1-TB disk drive with a 2-TB disk drive such that the first 1-TB of the replacement drive is mapped to the original 1-TB logical address space consumed by the original disk drive, with the remaining 1-TB address space of the 2-TB disk drive mapped somewhere else in the logical block address space (1610). This illustrates the concept that the PTDDC may contain multiple LBA mapping windows into the logical block address space (1610) for a given PTDDC-attached disk drive. This fact is important to keep in mind when interpreting the LBA mapping address comparators detailed elsewhere in this document, as it should be understood that these LBA address comparators may operate on a multiple number of windows into the logical block address space (1610) for a given PTDDC-attached disk drive.

Internal PTDDC Architecture—SATA Example
(1700, 1800)

Overview

While many implementations of the PTDDC are possible, the general characteristics of the system/method associated with this concept can be best illustrated by an exemplary embodiment. To this end, the generalized SATA architecture illustrated in FIG. 17 (1700) is useful, as it depicts a preferred exemplary embodiment in a preferred SATA disk drive interface context.

SATA Exemplary Embodiment (70)

Figure 17:
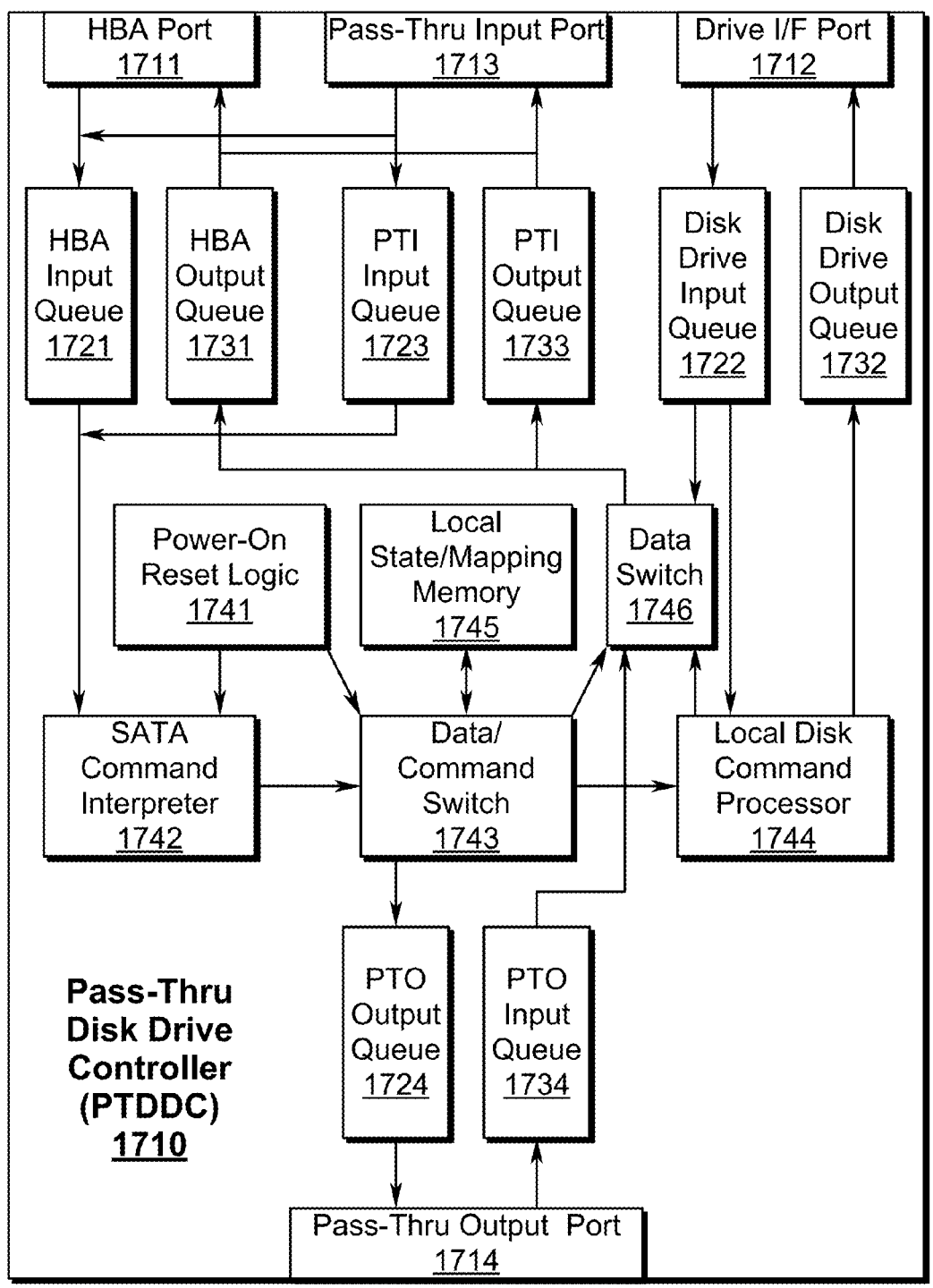
FIG. 17 illustrates an exemplary embodiment of the present invention as applied to a SATA disk drive architecture.

As illustrated in FIG. 17 (1700), the PTDDC concept (1710) as preferably implemented in a SATA environment may incorporate a HBA port interface (1711), disk drive I/F port interface (1712), pass-thru input port interface (1713), and pass-thru output port interface (1714). Each of these interfaces is bi-directional and may have associated input queues (1721, 1722, 1723, 1724) and output queues (1731, 1732, 1733, 1734) associated with them, although in the case of the pass-thru input port (1713), this interface (and its associated PTI input (1723) and PTI output (1733) queues) may be integrated into the HBA port interface (1711) as described elsewhere to minimize the hardware associated with the particular PTDDC implementation.

While many methodologies are acceptable to implement the input (1721, 1722, 1723, 1724)/output (1731, 1732, 1733, 1734) queues in this context, many preferred embodiments utilize techniques discussed in U.S. Pat. No. 4,873,665 issued to Ching-Lin Jiang and Clark R. Williams on Jun. 7, 1988 for Dual storage cell memory including data transfer circuits; U.S. Pat. No. 5,299,156 issued to Ching-Lin Jiang and Clark R. Williams on Mar. 29, 1994 for DUAL PORT STATIC RAM WITH BIDIRECTIONAL SHIFT CAPABILITY; U.S. Pat. No. 5,532,958 issued to Ching-Lin Jiang and Clark R. Williams on Jul. 2, 1996 for DUAL STORAGE CELL MEMORY; and U.S. Pat. No. 6,118,690 issued to Ching-Lin Jiang and Clark R. Williams on Sep. 12, 2000 for DUAL STORAGE CELL MEMORY.

It should be noted that while the construction of the HBA port interface (1711), disk drive I/F port interface (1712), pass-thru input port interface (1713), and pass-thru output port interface (1714) are shown to be identical, this need not be the case. For example, in this application of the PTDDC to a SATA disk drive architecture, only the HBA port interface (1711) and disk drive I/F port interface (1712) are by necessity SATA-style hardware interfaces. The remaining pass-thru input port interface (1713) and pass-thru output port interface (1714) may be constructed using other hardware interfaces that are easier/cheaper to implement. Additionally, note that the HBA port interface (1711) and disk drive I/F port interface (1712) need not be the same type of hardware interface. For example, the HBA port interface (1711) could be configured as an iSCSI interface with the disk drive I/F port interface (1712) being configured as SATA. One skilled in the art will recognize that any number of interface combinations are possible with these teachings of the present invention.

The PTDDC operates as follows. If necessary, an optional power-on reset circuit (1741) provides general initialization signaling for power-on startup of the system. While many options are available for this function, one preferred approach is shown in U.S. Pat. No. 5,164,613 issued to Eric W. Mumper, Francis A. Scherpenberg, and William L. Payne, II on Nov. 17, 1992 for RESET MONITOR. One skilled in the art will recognize that such circuits are common in a wide variety of digital systems, including those supporting disk drives.

Data and/or commands received from the HBA port (1711) and queued for processing by the HBA input queue (1721) are interpreted by a SATA command interpreter (1742) to determine content and validity. Depending on the type of command and/or data stream, a data/command switch (1743) interprets the data/command contents and makes a determination as to whether the data/command should be processed locally (to the disk drive attached to the PTDDC) or passed along the PTDDC chain to another PTDDC/disk drive pair.

If the data/command contents are not targeted towards the locally attached PTDDC disk drive, it is forwarded to the pass-thru output port (1714) via the PTO output queue (1724). Command responses and/or data from the downstream PTDDC attached disk drive is then received from the pass-thru output port (1714), cached by the PTO input queue (1734) and eventually relayed back to the HBA port (1711) via the HBA output queue (1731).

If the data/command contents are targeted towards the locally attached PTDDC disk drive, it is forwarded to the disk drive I/F port (1712) via the disk drive output queue (1732) under control of a local disk command processor (1744). Command responses and/or data from the PTDDC locally attached disk drive is then received from the disk drive I/F port (1714), cached by the disk drive input queue (1722) and eventually relayed back to the HBA port (1711) via the HBA output queue (1731).

The data/command switch (1743) controls a data switch (1746) that coordinates the return of command responses and/or data received from the local disk drive I/F port (1712) and the pass-thru output port (1714). This coordination ensures that information received from these sources is properly queued for return back to the HBA port (1711) via the HBA output queue (1731). However, in some circumstances, conversations between the local PTDDC and the locally attached disk drive should be confined to the PTDDC interface and not be relayed back to the HBA port (1711). For example, retrieving local PTDDC configuration information from the locally attached disk, inquiring as to the device identification of the locally attached disk (for drive indexing as detailed below), and other situations in which the communications should be localized to the immediate PTDDC interface space.

To aid in determining if given locally attached disk drive is within the LBA addressing range of a given PTDDC, the use of local state/mapping memory (1745) is anticipated in many preferred embodiments. This local state/mapping memory (1745) may include LBA upper/lower ranges for the attached disk drive, disk drive model/serial number information, an index value to indicate the position of the local PTDDC within a chain of serially connected PTDDCs, and other information as needed.

LBA Manning Architecture (1800)

Figure 18:
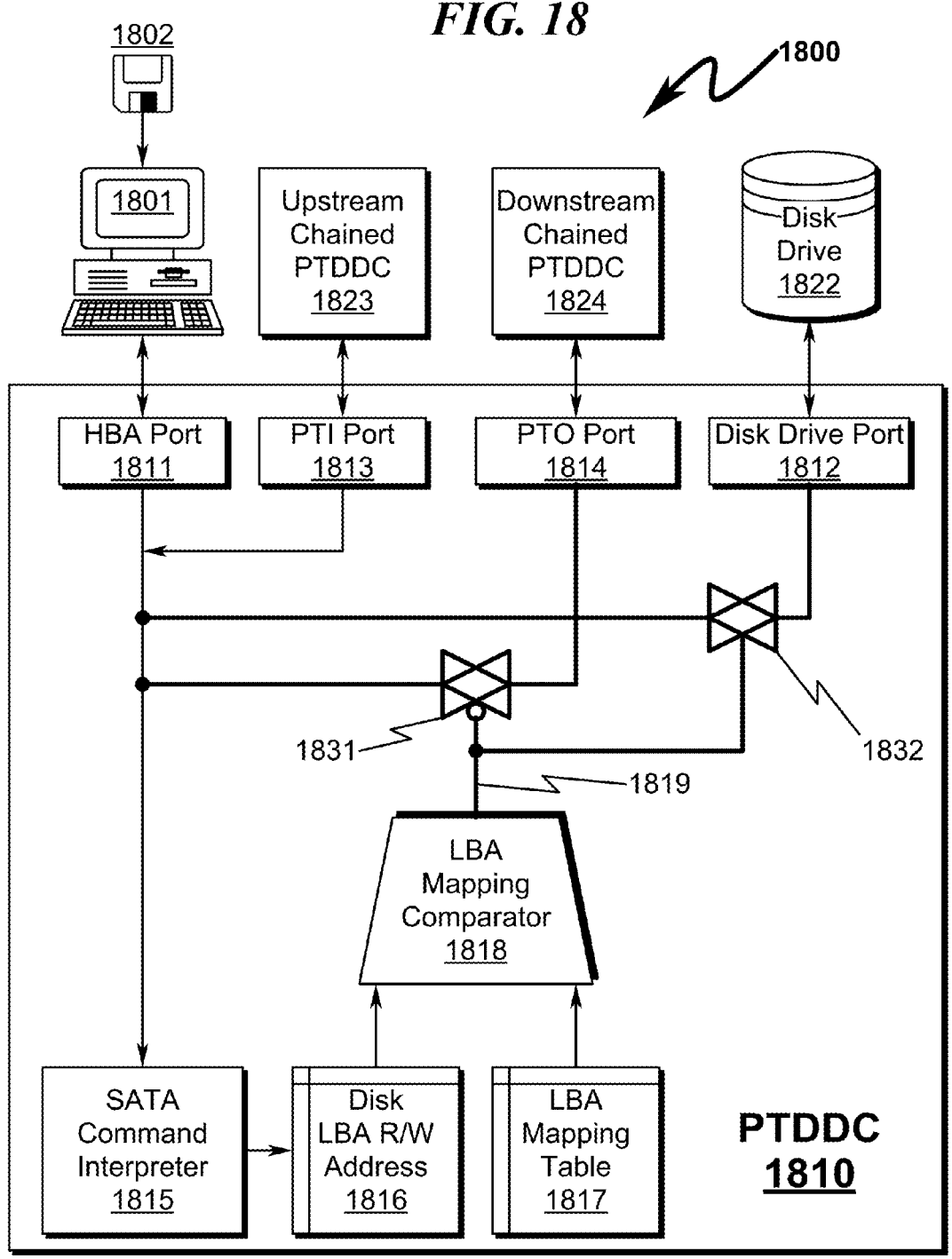
FIG. 18 illustrates an exemplary embodiment of the present invention as applied to a SATA disk drive architecture, detailing the internal LBA mapping functions of the PTDDC.

The data/command switch (1743) and data switch (1746) functionality as depicted in FIG. 17 (1700) may be clarified by inspection of the exemplary LBA mapping architecture methodology as generally illustrated in FIG. 18 (1800). In this exemplary implementation, the host computer (1801) running software (1802) interfaces with a PTDDC (1810) via a HBA port (1811) (or equivalently an upstream PTDDC (1823) is interfaced with the PTDDC (1810) via a PTI port (1813)). A locally attached disk drive (1822) is supported by the PTDDC (1810) via a disk drive port (1812) and optionally a downstream chained PTDDC (1824) is supported via a PTO port (1814).

SATA commands received from the HBA port (1811) and/or the PTI port (1813) are received by the SATA command interpreter (1815) and decoded based on the desired SATA command function. In situations where the command includes loading of disk LBA values for subsequent read/write operations, this information is loaded into a local disk LBA R/W address register (1816). This register (1816) is matched with an internal LBA mapping table (1817) (previously loaded when the PTDDC (1810) was configured) using a LBA mapping comparator (1818). The LBA mapping comparator (1818) takes the disk LBA R/W address register and determines if the requested data transfer is within the range of the locally attached disk drive (1822) as determined by the LBA mapping table (1817). The match output (1819) from the LBA mapping comparator (1818) is then used to enable a data switch (1831) from the HBA/PTI port (1811, 1813) to the PTO port (1814) and associated downstream chained PTDDC (1824) if the data transfer is not within the LBA range as indicated by the LBA mapping table (1817) or alternatively enable a data switch (1832) from the HBA/PTI port (1811, 1813) to the disk drive port (1812) and associated PTDDC-attached disk drive (1822) if the data transfer is within the LBA range as indicated by the LBA mapping table (1817). While the data switches (1831, 1832) are indicated symbolically here as transmission gates, one skilled in the art will recognize that a wide variety of data switching methodologies may be utilized in the implementation of this functionality.

SATA LBA Mapping Range

One advantage of using SATA (and SATA class) disk drives is their ability to support 48-bit LBA addressing. These drives typically incorporate a 6-byte sector address selection register which permits 2**48 sectors to be addressed (281.47E+12) or approximately 144E+15 bytes. Assuming the SATA disk drives are 1-TB capacity and comprise 1,953,525,168 512-byte sectors (1,000,204,866,016 bytes), this LBA addressing range permits approximately 144,085 disk drives to be placed within this LBA address space. Thus, for all practical situations, the PTDDC chain can be sequentially appended without any concern for exhausting the overarching address space permitted by the disk drive architecture. As mentioned previously, a wide variety of file systems support this 48-bit LBA addressing, and as such the PTDDC concept maintains compatibility with both the SATA disk drive architecture and common operating systems under which it must function.

Given that the 48-bit SATA addressing range is so large in comparison to currently available disk drive physical addressing capabilities, it should be mentioned that in some embodiments of the present invention the PTDDC chain may be serialized such that each PTDDC controller in the chain is given a unique byte identifier. Subsequent to this controller identification, LBA addresses associated with that particular PTDDC can be uniquely identified by incorporating this byte identifier as the most significant byte (MSB) of the 48-bit SATA LBA address field. This subpartitioning of the PTDDC logical address space would permit 256 "zones" of PTDDCs, each zone comprising approximately 256 disk drives. This technique, when used in conjunction with port multipliers and port selectors can provide the architectural framework for massive "cloud" computing storage systems having both high capacity, high availability, and internal redundancy.

One skilled in the art will recognize that the 48-bit SATA LBA address space can be subpartitioned into a number of "groups" or "zones", each of which comprising a number of bits of the 48-bit address map with the general architecture being one of a "network" of disk drives that form a "tree" of information storage, all of which is accessible via a single HBA connection to the host computer system. This is a very powerful concept when applied to very large computer installations, both because of its capability, but also the practical nature of its implementation feasibility, especially given the low cost profile of the overall system implementation as detailed elsewhere in this document.

Individual Drive Indexing—SATA Example

Overview

The PTDDC concept disclosed herein attempts to treat the entire chain of PTDDC-attached disk drives as one logical volume from the perspective of the host computer HBA. While in the vast majority of hard drive access operations this is acceptable, there are some circumstances in which it may be necessary to individually address a given disk drive in the PTDDC chain for a variety of purposes, including but not limited to:

Initializing the disk drive with an index value (disk drive address (DDA)) to be associated with accessing the individual disk drive.

Configuring the disk drive with the lower/upper range of LBA addresses in which the drive is to be mapped into the overall HBA logical address space.

Low-level formatting of the drive.

Setting drive security information.

Reporting of drive diagnostics and other maintenance information.

Other functions as permitted by the individual disk drives.

One skilled in the art will recognize that the scope of the inquiry will be heavily based on the hard drive architecture utilized within the context of the PTDDC system/method.

Fundamental Unique PTDDC Indexing Question and System Context

A core question to be answered in this context is "How does a PTDDC become individually addressable when each PTDDC may be manufactured in an identical fashion (and therefore has no uniqueness when originally installed)?". To provide exemplary embodiments of the present invention that implement this feature it will be useful to select a particular disk drive technology as the basis of analysis. Therefore, the remaining discussion will utilize the SATA disk drive interface, a preferred implementation context for the present invention, as the basis for detailing a solution to this problem.

PTDDC ID Method #1—PTDDC Internal Indexing/Identification (1900)

Figure 19:
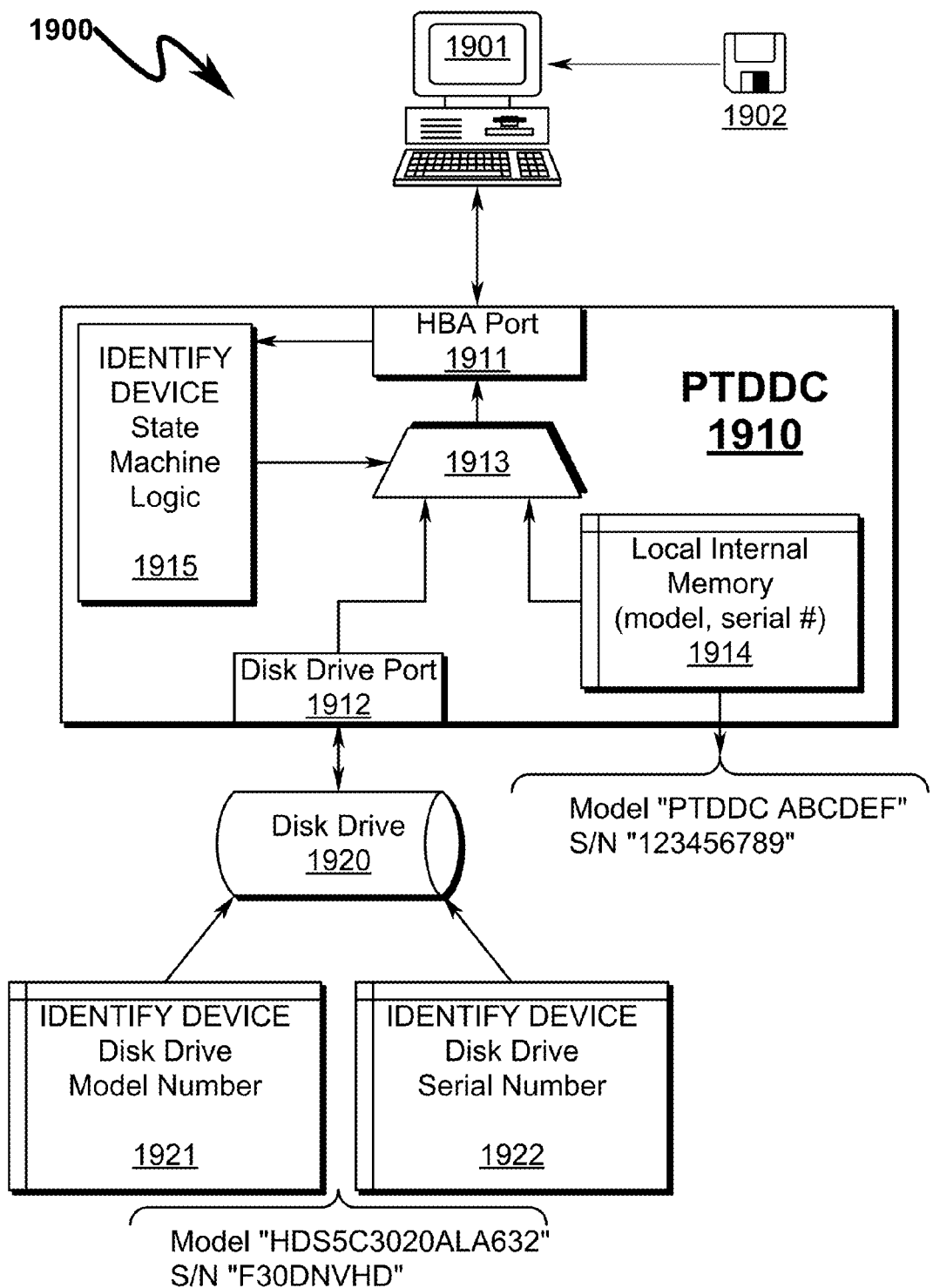
FIG. 19 illustrates an exemplary system/method of accessing PTDDC identification information.

As generally illustrated in FIG. 19 (1900), one method of uniquely identifying a particular PTDDC is to have each PTDDC (1910) uniquely tagged in the factory with an electronic serial number (1914) that is readable via the HBA port (1911) via a computer system (1901) under control of operating system or application software (1902). This may be accomplished in a SATA environment by modification of the IDENTIFY DEVICE (0xEC) command results (1921, 1922) to modify the following return fields for this inquiry:

DISK DRIVE MODEL NUMBER (1921). Words 27-46 (20 bytes) of the returned 512-byte sector in this command normally indicate the model number of the attached disk drive in ASCII. This 20-byte field can be replaced on alternate IDENTIFY DEVICE commands with a unique electronic text field ("PTDDC" for example) to indicate that the associated serial number field returned is for the PTDDC.

DISK DRIVE SERIAL NUMBER (1922). Words 10-19 (10 bytes) of the returned 512-byte sector in this command normally indicate the serial number of the attached disk drive in ASCII, and zero (0) if not specified. This 10-byte field can be replaced on alternate IDENTIFY DEVICE commands with a unique electronic serial number for the PTDDC.

This technique can be used in conjunction with methods below to provide information on both the PTDDC interface itself as well as any disk drive attached to the PTDDC. For example, it may be possible to interrogate the chain of PTDDC interfaces separate and apart from the disk drives that are attached to the individual PTDDCs.

This system/method normally operates such that a "RESET DEVICE" command received by the PTDDC (1910) HBA port (1911) operates to initialize the state machine logic (1915) so that a subsequent IDENTIFY DEVICE command retrieves disk drive (1920) information normally including a model number (1921) and serial number (1922). This information is relayed back to the host computer via the HBA port (1911) through a data multiplexer (1913). A subsequent IDENTIFY DEVICE command changes the state of the state machine logic (1915) so that data from a PTDDC local memory (including a model, serial number, and other identifying information) is substituted for the original disk drive model (1921) and/or serial (1922) number information and presented to the host computer (1901) via the HBA port (1911) through the data multiplexer (1913).

PTDDC ID Method #2—Phantom Interface (2000)

Yet another method of accessing data within the context of the PTDDC is to use a "phantom" interface similar to that utilized in the MAXIM INTEGRATED PRODUCTS, INC. model DS1315 Phantom Time Chip. This integrated circuit utilizes a series of device accesses under a strict address accessing protocol to match a 64-bit data pattern (0xC5,3A, A3,5C,C5,3A,A3,5C). If this series of address access patterns is matched, the state of the phantom interface changes to permit reads and/or writes of data to the phantom memory via particular address accesses.

As illustrated in the exemplary system block diagram of FIG. 20 (2000), application of this phantom interface technique to the PTDDC (2010) can be described as follows. The host computer system (2001) under control of software (2002) interfaces with the PTDDC (2010) via the HBA port (2011) (or equivalently an upstream chained PTDDC (2023) connected via a PTI port (2013)) to send disk drive commands to a SATA interpreter (2030) that decodes and validates the disk drive command.

The output of the SATA command interpreter (2030) is filtered by a command address filter (2031) that extracts the address protocol information from the command stream. This function can take many forms, but one example would be to extract the byte value associated with the MSB of the 48-bit SATA LBA sector address. This address value is compared with a protocol match pattern (2032) by a protocol matching comparator (2033). If a match between the protocol match pattern (2032) and the SATA address access is detected, a match latch (2034) is activated to indicate a protocol match.

Within the context of this protocol matching functionality a power-on reset (2035) circuit permits initialization of a protocol index counter (2036) that indexes the protocol match pattern (2032) against the incoming results of the command address filter (2031).

If a protocol match is indicated by the match latch (2034), a data switch is activated (2037) to divert address access information from the SATA command interpreter (2031) to permit read/write access to the local setup memory (2038). This local setup memory (2038) is responsible for configuring the characteristics of the PTDDC (2010), such as setting LBA mapping ranges and other functions.

Figure 20:
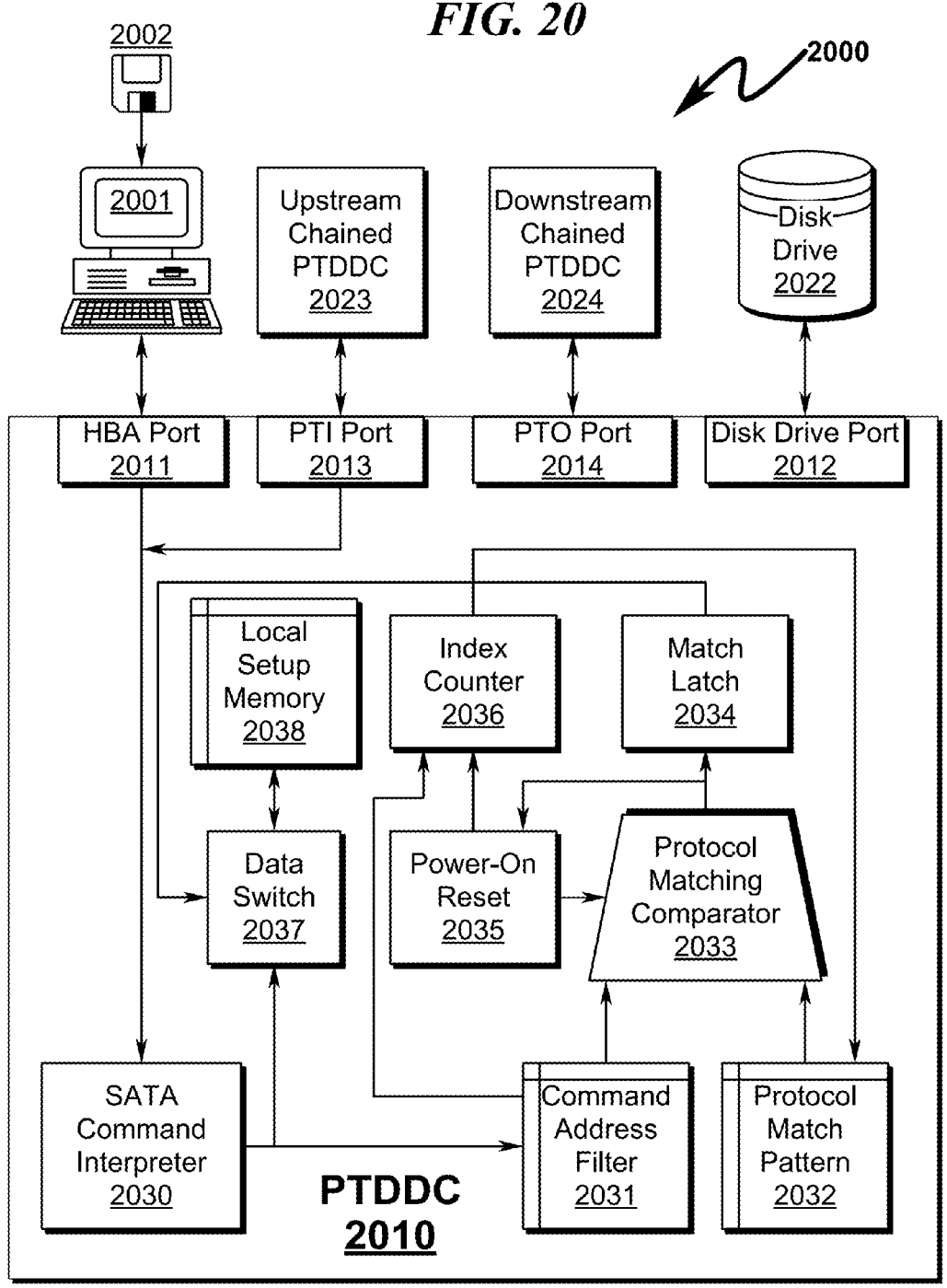
FIG. 20 illustrates an exemplary system/method of accessing PTDDC internal data structures using phantom addressing techniques.

As generally illustrated in FIG. 20 (2000), within the context of the PTDDC (2010), this technique can be used to access local setup memory (2038) within the first PTDDC in the chain to write configuration information to the PTDDC. A "lock" bit can then be written to lock the information within the first PTDDC, thus permitting subsequent protocol accesses to skip the first PTDDC and access the downstream chained PTDDC (2024). The process can be repeated for each PTDDC in the sequential chain and thus permit complete configuration of each PTDDC in the entire chain. Use of a "DRIVE RESET" command or other SATA specific command can be utilized to reset the "lock" bit to permits access to the front of the PTDDC chain if necessary.

As to the specifics of the protocol match pattern (2032) and the manner in which the address recognition by the command address filter (2031) is accomplished, the present invention makes no limitation on how this is accomplished. One preferred methodology would be to use the most significant bit of the SATA LBA address to provide this addressing information, requiring one SATA read cycle for each match of the protocol match pattern (2032). Once the protocol match pattern (2032) has been matched, subsequent SATA read operations could indicate a "write" if the high order LBA sector address bit is a "1" and a "read" if the high order LBA sector address bit is a "0", with "write" data being obtained from the low order LBA sector address bit if necessary. This architecture ensures that a fixed number of configuration bits can be stored in the local setup memory (2038) using only SATA READ SECTOR commands, providing insurance that these operations are non-destructive with respect to data contained on the PTDDC-attached disk drive (2022).

PTDDC ID Method #3—Sequential Drive Serial Number Search (2100)

Figure 21:
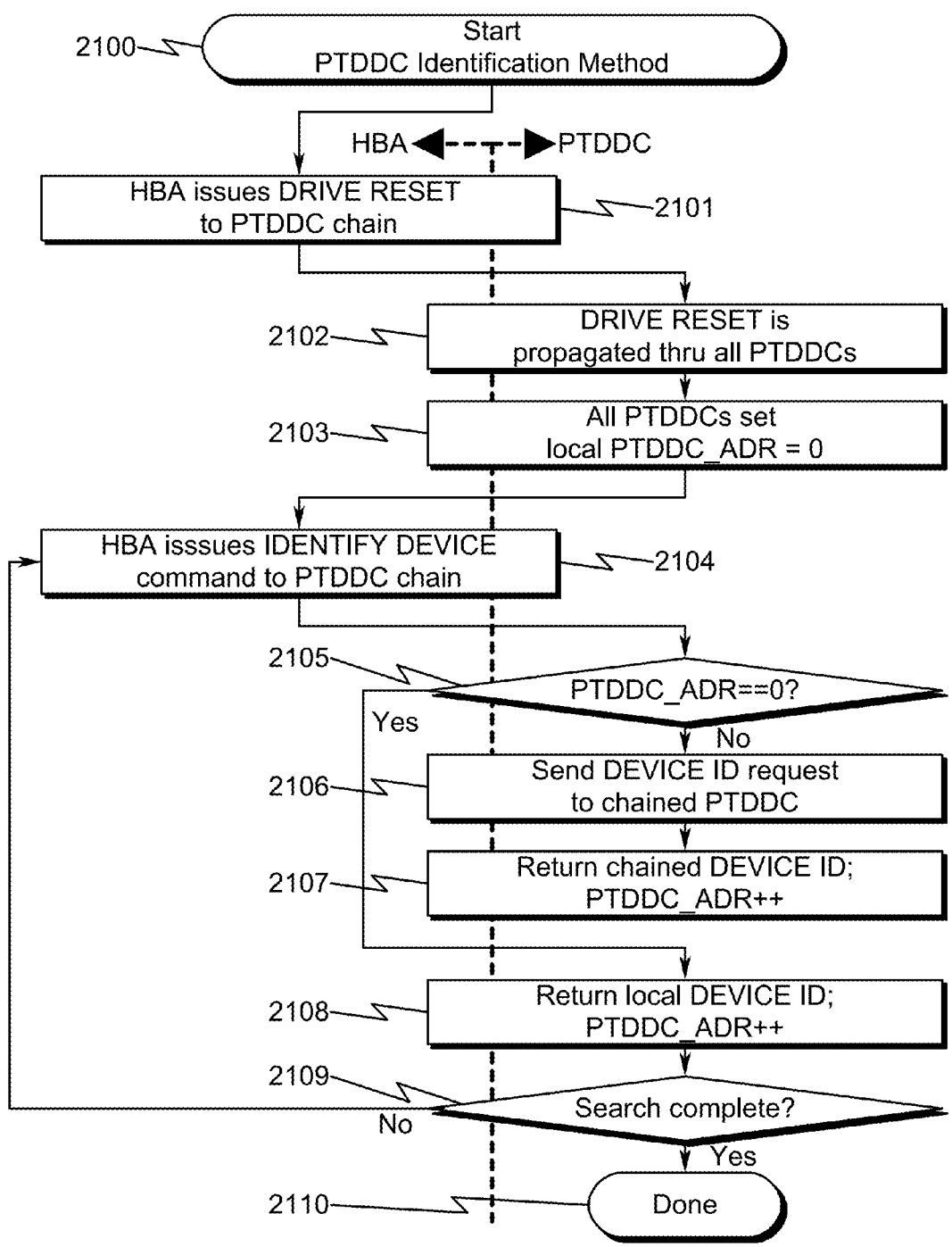
FIG. 21 illustrates an exemplary PTDDC/disk drive identification method.

One present invention PTDDC ID method embodiment variation can be generally illustrated by the preferred exemplary embodiment illustrated in FIG. 21 (2100), wherein the method flowchart as illustrated is depicted using actions by the HBA and the PTDDC. The general steps of this method comprise the following:

Issuing a DRIVE RESET command by the HBA to the PTDDC chain (2101);

Propagating the DRIVE RESET command issued by the HBA thru all chained PTDDCs (2102);

All PTDDCs set a local variable PTDDC_ADR to zero (0) in response to the DRIVE RESET command (2103);

Issuing an IDENTIFY DEVICE command by the HBA to the PTDDC chain (2104);

If the PTDDC receiving the IDENTIFY DEVICE command indicates the value of PTDDC_ADR as non-zero, then control passes to step (8) (2105);

The IDENTIFY DEVICE command is sent to the chained PTDDC (2106).

Data returned from the chained PTDDC IDENTIFY DEVICE command is returned to the HBA, the PTDDC_ADR value is incremented, and control proceeds to step (9) (2107).

If the first PTDDC receiving the IDENTIFY DEVICE command indicates the value of PTDDC_ADR as zero (0), then the IDENTIFY DEVICE command is issued to the disk drive attached to the PTDDC, and the PTDDC_ADR value is incremented (2108).

If the search is not complete, then control passes to step (4) (2109).

The PTDDC identification method is terminated (2110).

It should be noted that after this procedure is completed, the HBA has been able to sequentially read the results of the IDENTIFY DEVICE command that contains not only 20 bytes of information on the disk drive model number, but also 10 bytes of information on the disk drive serial number, the combination of which should be unique in the space of attached disk drives. Additionally, at the end of the process, each PTDDC should have a value of PTDDC_ADR that indicates its distance from the end of the PTDDC chain. For example, the last chained PTDDC will have a PTDDC_ADR value of 1, and the first PTDDC will have a value equal to the number of PTDDCs in the chain. Note that the value of PTDDC_ADR in step (7) is only incremented if a value is returned by the chained PTDDC in response to the IDENTIFY DEVICE COMMAND. If there is no chained PTDDC, then no response will be forthcoming, and PTDDC_ADR will not be incremented.

This general method variation as illustrated in FIG. 21 (2100) may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

PTDDC Disk Drive Command Method—Drive Serial Number Match (2200)

Once information on the chain of PTDDCs and their associated disk drives is obtained, another question presents itself in devising a method to send disk drive commands to individual disk drives within the PTDDC chain. One present invention PTDDC disk drive command method embodiment variation can be generally illustrated by the preferred exemplary embodiment illustrated in FIG. 22 (2200), wherein the method flowchart as illustrated is depicted using actions by the HBA and the PTDDC. The general steps of this method comprise the following:

Issue a MATCH DEVICE command by the HBA to the PTDDC chain (2201). This command can be arbitrarily selected from a range of unused or reserved disk drive command opcodes for the given disk drive technology.

Send a MATCH ID data block from HBA thru all chained PTDDCs (2202). This MATCH ID block is the concatenation of the DISK DRIVE MODEL NUMBER and the DISK DRIVE SERIAL NUMBER retrieved from a series of previous IDENTIFY DEVICE to the PTDDC chain and uniquely identifies a given disk drive in the universe of disk drives.

Receive the MATCH ID data block by all PTDDCs (2203);

Send an IDENTIFY DEVICE command to all PTDDC attached disk drives (or alternatively using an internal copy of this information from a previously executed IDENTIFY DEVICE command) (2204);

Compare the MATCH ID block to the DEVICE ID block (2205).

If the MATCH ID block does not match the DEVICE ID block, set the local variable PTDDC_CMD to 0 (2206), otherwise set the local variable PTDDC_CMD to 1 (2207).

Sending a disk drive command from the HBA to the PTDDC chain (2208).

If the local PTDDC_CMD variable is not 1, proceed to step (12) (2209).

Pass the HBA disk drive command to the PTDDC locally attached disk drive (2210) and proceed to step (12).

Pass the HBA disk drive command to the next PTDDC in the chain (2211).

The PTDDC disk drive command method is terminated (2212).

It should be noted that after this procedure is completed, subsequent HBA disk drive commands will target the PTDDC that has been flagged as command-active (PTDDC_CMD==1). This behavior can be modified if necessary to only operate on drive-specific commands that are not data transfer related, such that the LBN mapping functions occur transparently to the operation of other drive-specific commands.

Figure 22:
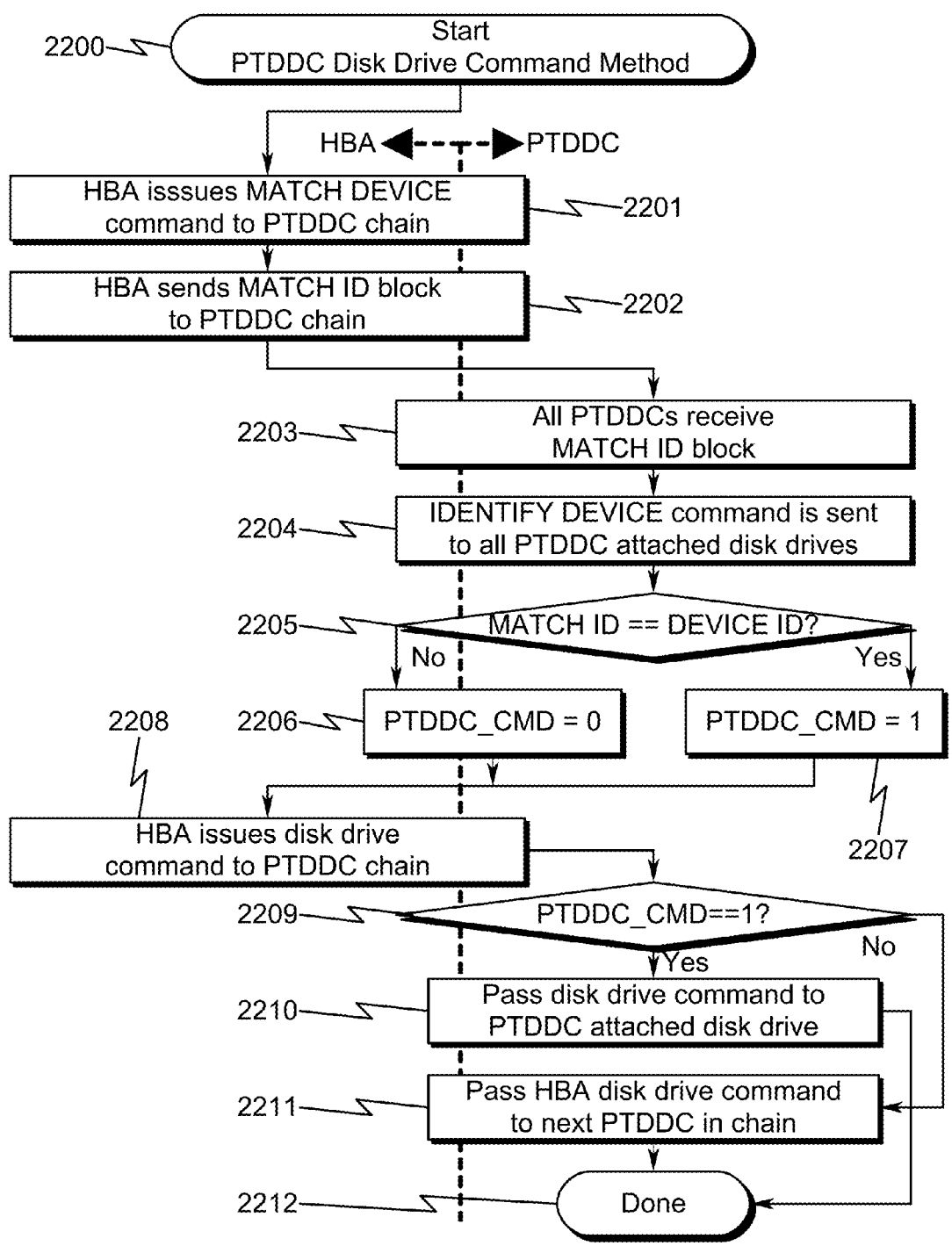
FIG. 22 illustrates an exemplary method for executing a drive-specific disk drive command within a sequential chain of PTDDC-attached disk drives.

This general method variation as illustrated in FIG. 22 (2200) may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

RAID-0 Support (2300)

Figure 23:
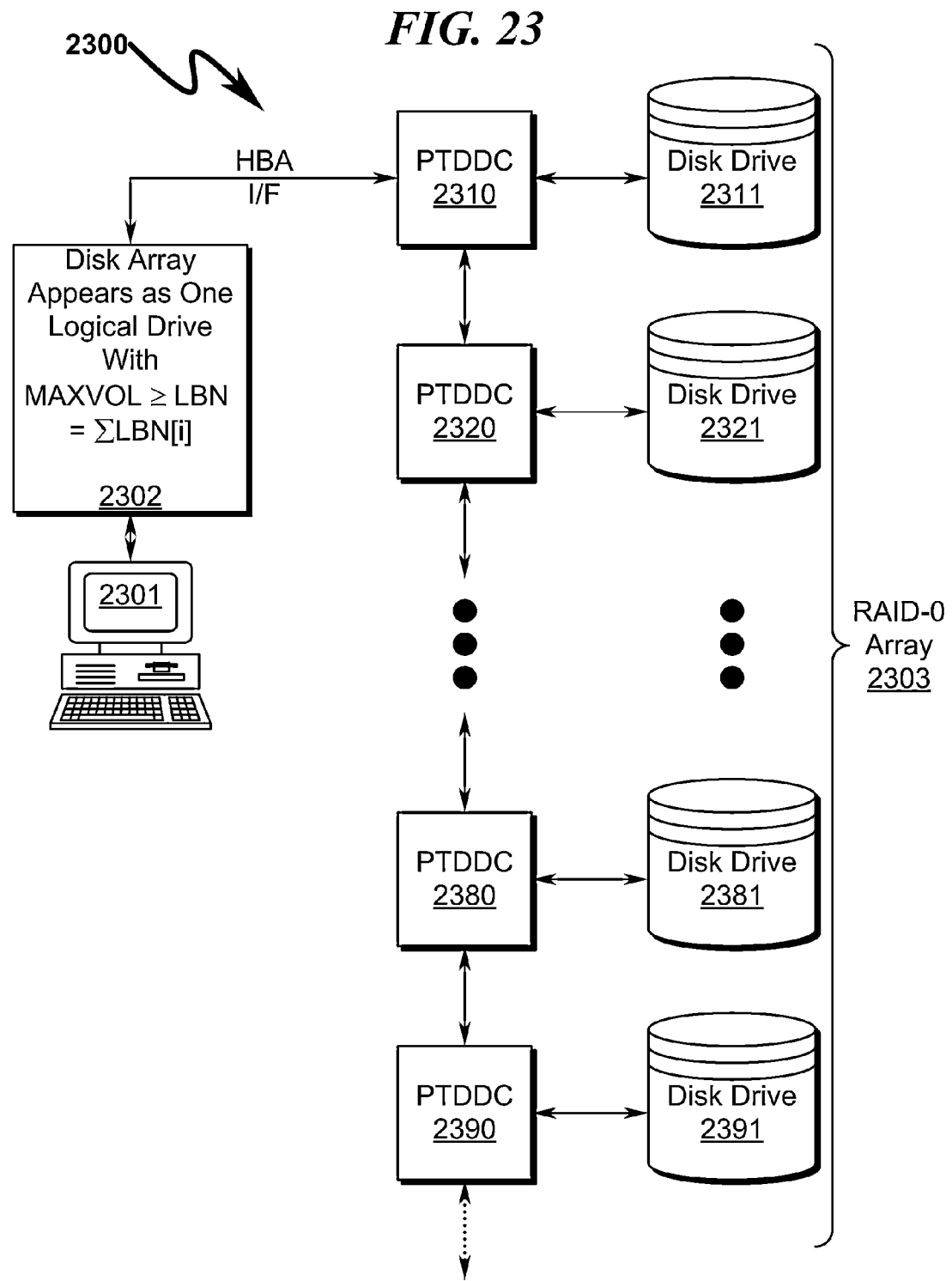
FIG. 23 illustrates a preferred exemplary embodiment implementing a RAID-0 storage array.

As generally illustrated in FIG. 23 (2300), the present invention when configured to concatenate the LBN counts of disk drives that are attached to daisy-chained PTDDCs (2310, 2320, 2380, 2390) as described herein nominally implements a RAID-0 storage array (2303), sometimes referred to as a JBOD ("just a bunch of disks") array. In this configuration the daisy-chained PTDDCs are viewed as one large disk drive (2302) with a maximum LBA equivalent to at least the sum of LBN maximums from all disk drives attached (2311, 2321, 2381, 2391) to the daisy-chained PTDDCs (2310, 2320, 2380, 2390).

RAID-0 arrays generally do not contain any data redundancy and are thus susceptible to failure should one or more of the disk drives fail. However, in circumstances where data storage capacity is paramount, RAID-0 arrays can provide a useful mechanism to overcome the single-drive capacity limitations present with conventional disk drive technologies. Furthermore, in situations where data is mirrored across separate computer systems that each incorporate RAID-0 support in their storage architectures, the use of RAID-0 in conjunction with redundant computer system processor hardware can provide high availability should either a single drive fail or a computer system related component fail.

In contrast to traditional RAID-0 configurations, the present invention presents the storage system to the computer (2301) simply as a conventional disk drive having characteristics of a very large disk drive. The advantage to this approach is that no software modifications to the computer system need be made, no additional BIOS firmware is required to support the storage system, and the system can be expanded incrementally as necessary without replacing existing storage elements. For systems that are limited in their number of disk drive interfaces, this permits storage expansion within the existing computer enclosure without the need for external disk drive cabling, the use of slower NAS storage, or the complete replacement of existing disk drives with more costly higher density units. For systems that require a small form factor and high storage capability, the architecture taught by the present invention is superior to existing storage architectures because it permits additional disk drives to be incorporated in a computer tower case without the need to resort to more exotic storage solutions.

RAID-1 Support (2400)

Figure 24:
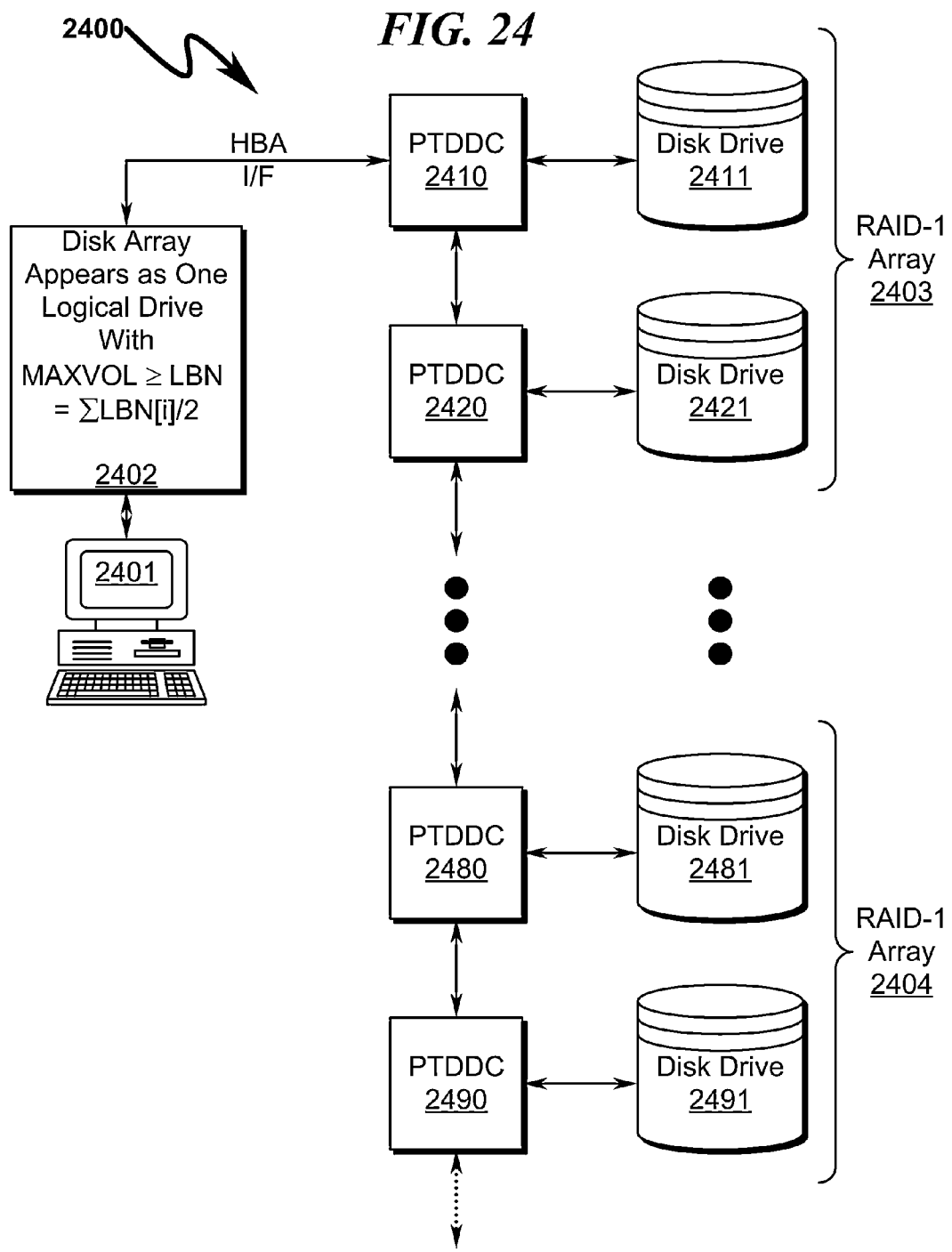
FIG. 24 illustrates a preferred exemplary embodiment implementing a RAID-1 storage array.

As generally illustrated in FIG. 24 (2400), the present invention may also be configured to overlap the LBN counts of paired disk drives (2411, 2421) (2481, 2491) that are attached to corresponding daisy-chained PTDDCs (2410, 2420) (2480, 2490) as described herein to nominally implement a RAID-1 storage array (2403, 2404), providing single disk failure recovery capability. In this configuration the daisy-chained PTDDCs are viewed as one large disk drive (2302) with a maximum LBA equivalent to half the sum of LBN maximums from all disk drives attached (2411, 2421) (2481, 2491) to the daisy-chained PTDDCs (2410, 2420) (2480, 2490).

RAID-1 arrays generally contain data redundancy to support the failure of a single drive. Generally speaking, however, support for this type of redundancy must be supported in software (within the computer operating system) and/or within the HBA disk controller. In either scenario, retrofitting systems to include this support can be both difficult and expensive. The present invention presents a uniform HBA interface to the computer system that is transparent to the functions of the operating system and thus can be implemented in any system that requires the RAID-1 functionality, even in retrofit situations where the hardware and/or software cannot be modified to support RAID-1 capabilities.

Implementation of the RAID-1 functionality is quite straightforward using the PTDDC disk drive approach. The PTDDCs in the chain (2410, 2420) (2480, 2490) are configured so that the LBA mapping of the drives is duplicated for each pair of RAID-1 drives, such that a given pair (2410, 2420) (2480, 2490) of PTDDCs maps the same LBN address space. Thus, when a disk drive write operation takes place, it is written to both drives attached to the PTDDC pairs. Similarly, a read operation reads data from both PTDDC pairs, with only one copy of the data returned to the HBA, the remaining data transfer discarded (unless the first PTDDC-attached drive in the RAID-1 pair fails, in which the secondary data copy is returned to the HBA). RAID-1 consistency in the case of a disk drive replacement may be accomplished by background transfers between paired PTDDCs. Thus, in contrast to traditional RAID-1 configurations, the present invention presents the storage system to the computer (2401) simply as a conventional disk drive having characteristics of a very large disk drive. The advantage to this approach is that no software modifications to the computer system need be made, no additional BIOS firmware is required to support the storage system, and the system can be expanded incrementally as necessary without replacing existing storage elements. For systems that are limited in their number of disk drive interfaces, this permits storage expansion within the existing computer enclosure without the need for external disk drive cabling, the use of slower NAS storage, or the complete replacement of existing disk drives with more costly higher density units. For systems that require a small form factor and high storage capability, the architecture taught by the present invention is superior to existing storage architectures because it permits additional disk drives to be incorporated in a computer tower case without the need to resort to more exotic storage solutions.

RAID-2/RAID-3/RAID-4/RAID-5/RAID-6 Support

One skilled in the art will recognize that the above examples also permit support of RAID-2, RAID-3, RAID-4, RAID-5, and RAID-6 arrays using the PTDDC architecture.

Exemplary Embodiment Logical Drive Extension (2500)

Overview

The present invention may incorporate a system/method for logically increasing the size of a disk drive volume that has been low-level formatted and initialized with a file system structure via an operating system. The goal with these disclosed systems and methods is to permit a user to create a logical file system on one or more disk drive volumes and then extend the size of the physical number of disk drives as needed when space on the existing disk volumes is consumed, without the need for complex manipulation of the existing data on the currently installed disk drive volumes.

The prior art as taught by the various patents issued to Digital Robotics, Inc. (and listed elsewhere in this document), as well as some NAS attached storage systems, is to essentially place a virtual disk drive block allocation operating system (with associated hardware) between the HBA interface and the "farm" of currently installed disk drives residing in the disk drive array. This system permits physical extension of the logical disk drive storage space by misinforming the host operating system as to the true size of the disk drive array, and then via a file system aware operating system mapping allocated blocks used by the operating system to physical disk drives that populate the logical address space. The problem with this approach is its complexity, cost, and overhead.

Present Invention Architecture

Figure 25:
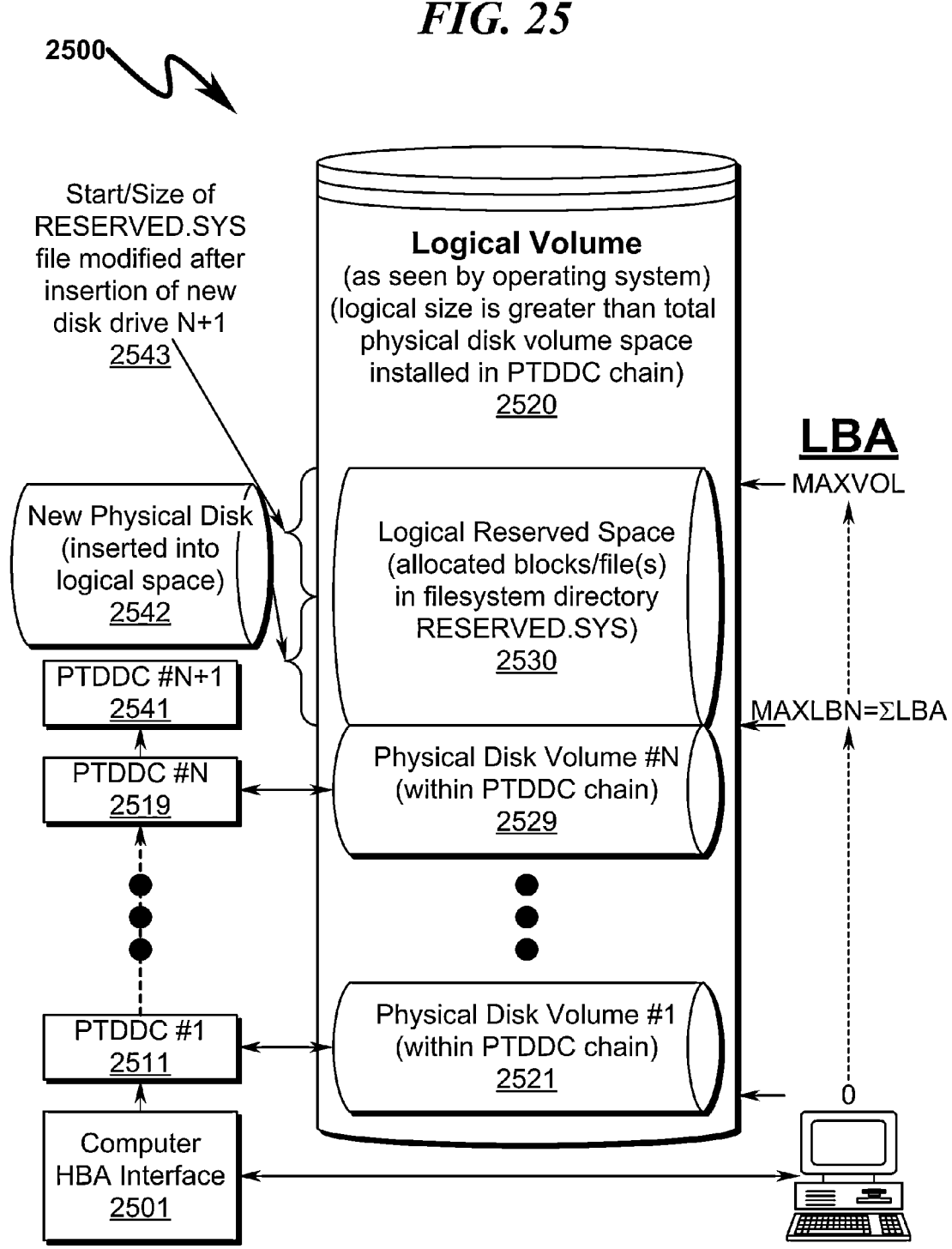
FIG. 25 illustrates the use of RESERVED file allocation within some preferred exemplary embodiments of the present invention that utilize logical volume sizing that is greater than physical volume sizing.

In contrast, the present invention takes the general approach illustrated in FIG. 25 (2500) to address the issue of extensible disk volume support in this context. Here we see that the computer system HBA interface (2501) services an arbitrarily long chain of PTDDC devices (2511, 2519) that directly control physical disk volumes (2521, 2529) within this chain. The logical disk volume (2510) as seen by the operating system comprises the physical disk volumes (2521, 2529) within the chain such that the maximum physical LBA of the logical drive is the sum of the individual disk drive maximum LBN values, or as depicted in this diagram the symbolic value MAXLBN.

However, the logical drive size may be configured to be much larger than MAXLBN. In fact in this configuration the logical drive size as seen by the HBA interface (2501) may be arbitrarily set within the confines of the file system architecture type, here designated symbolically herein as MAXVOL. To prevent the operating system from actually using the logical disk space between MAXLBN and MAXVOL, the file system is modified (via appropriate operating system application software) to allocate and reserve the space between MAXLBN and MAXVOL to one or more reserved system file(s). These files are typically hidden and protected as system/read-only to prevent use of this logical disk space by the operating system.

As storage within the PTDDC attached disk drives (2521, 2529) is filled, the need may arise to increase physical storage within the logical disk volume (2520). This is accomplished by extending the PTDDC chain with another PTDDC controller (2541) and associated disk drive (2542). Once this physical storage has been added, the logical reserved space (RESERVED.SYS) file is modified by (a) increasing the starting LBA BASE LOCATION for the file by the size of the added disk drive (2542), and (b) reducing the EXTENT SIZE of the file by the size of the added disk drive (2542).

Data Storage Architecture Extension Format Method (2600)

The concept of allocating a logical drive serviced by sparsely populated physical drives within a PTDDC chain as described above may be implemented in many preferred exemplary embodiments of the present invention using a variety of methods, two of which are currently known as preferred exemplary embodiments.

Figure 26:
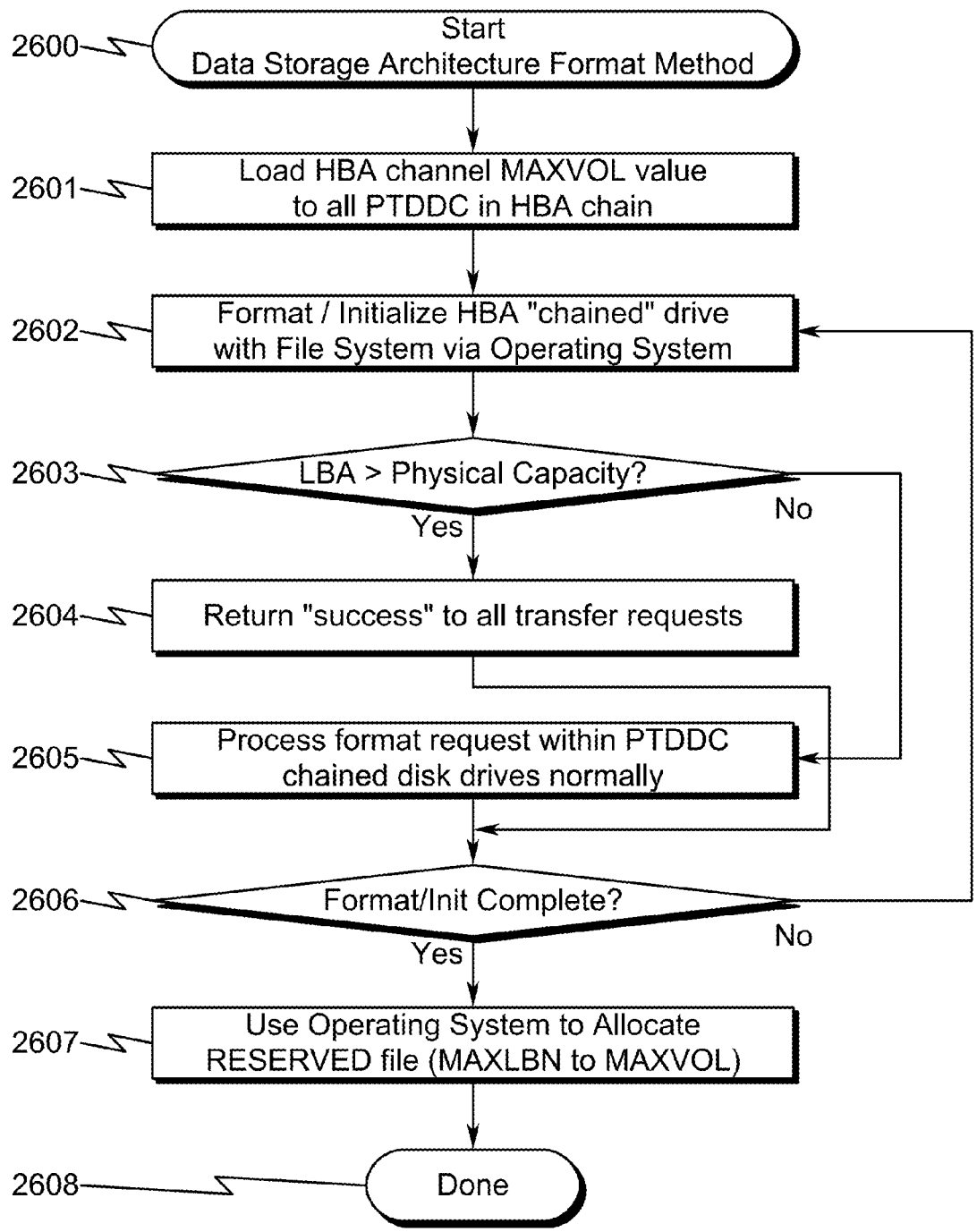
FIG. 26 illustrates a generalized method flowchart illustrating a data storage architecture extension volume formatting methodology utilized in some preferred exemplary embodiments of the present invention.

One present invention format method embodiment variation can be generally illustrated by the preferred exemplary embodiment illustrated in FIG. 26 (2600). The general steps of this method comprise the following:

Loading the MAXVOL value to be associated with the HBA channel to all PTDDC interfaces in the PTDDC chain associated with the HBA (2601);

Format/initialize the HBA "chained" drive with a file system using operating system software (2602);

If a LBA requested during the format/initialization step (2) is less than the MAXLBN physical capacity of the chained PTDDC disk drives, proceed to step (5) (2603);

Return "success" to all transfer requests to the PTDDC disk drive chain and proceed to step (6) (2604);

Process the format/initialization request within the PTDDC chained disk drives normally (2605);

If the format/initialization process is not complete, proceed to step (2) (2606);

Use operating system utilities or custom applications to allocate RESERVED file space from MAXLBN to MAXVOL within the logical drive space associated with the HBA (2607).

This general method variation as illustrated in FIG. 26 (2600) may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Data Storage Architecture Extension Format Method (2700)

Figure 27:
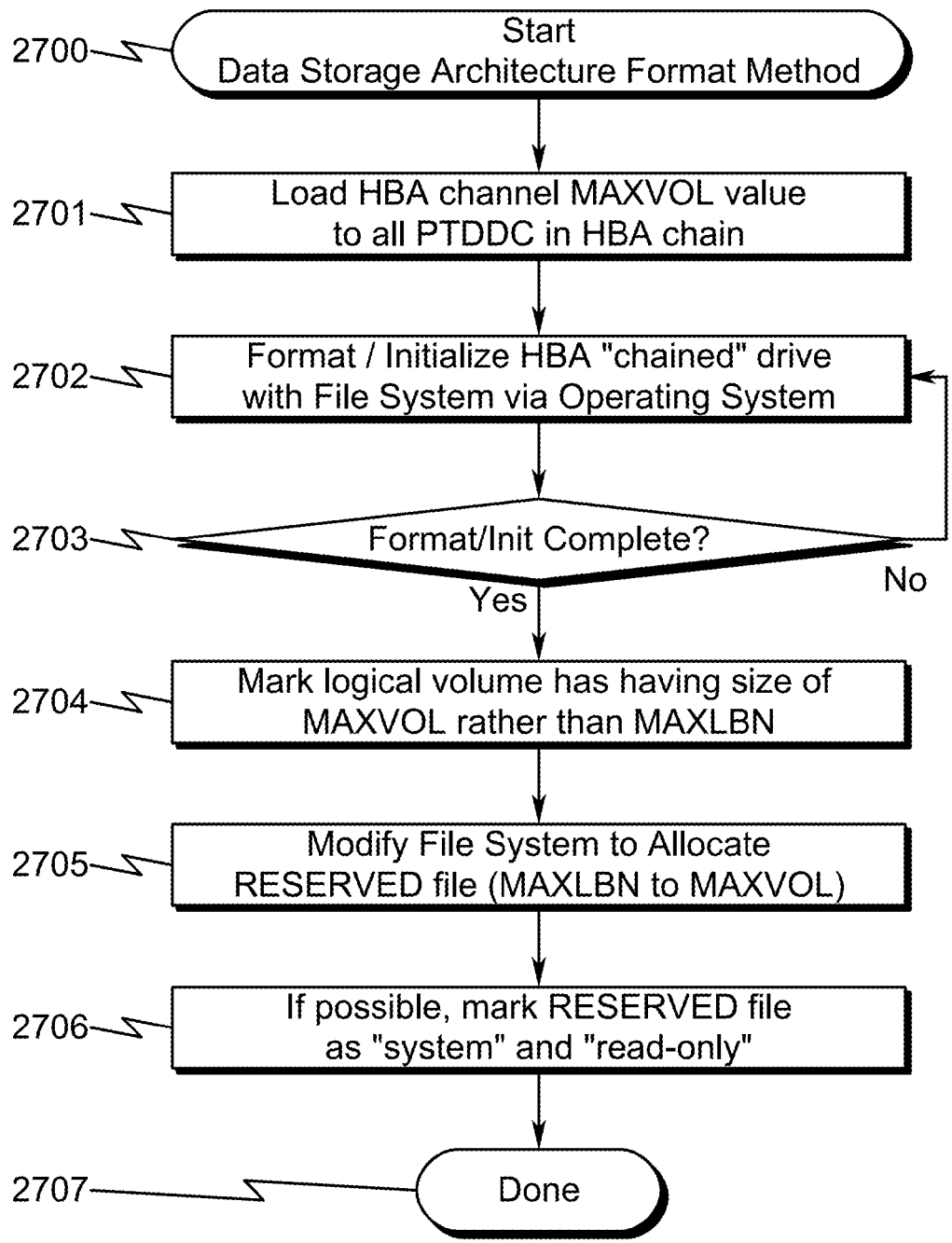
FIG. 27 illustrates an alternate generalized method flowchart illustrating a data storage architecture extension volume formatting methodology utilized in some preferred exemplary embodiments of the present invention.

Another present invention format method embodiment variation can be generally illustrated by the preferred exemplary embodiment illustrated in FIG. 27 (2700). The general steps of this method comprise the following:

Loading the MAXLBN value (sum of all disk drive sizes in the current PTDDC chain) to all PTDDC interfaces in the PTDDC chain associated with the HBA (2701);

Format/initialize the HBA "chained" drive with a file system using operating system software and sizing the logical volume to have size MAXLBN (2702);

If the format/initialization process is not complete, proceed to step (2) (2703);

Using a custom application program running under the operating system, modify the file system structure created on the HBA chained PTDDC logical drive to indicate a logical drive size of MAXVOL rather than MAXLBN (2704);

Using a custom application program running under the operating system, create a file directory entry on the logical volume created on the HBA chained PTDDC local drive to allocate a RESERVED file comprising LBA from MAXLBN to MAXVOL (2705);

If possible, mark the RESERVED file as "system" and "read-only" (2706).

This general method variation as illustrated in FIG. 27 (2700) may be modified heavily depending on a number of factors, with rearrangement and/or addition/deletion of steps anticipated by the scope of the present invention. One skilled in the art will recognize that operating system "mount" and "unmount" operations may be utilized within this general framework to achieve file system consistency within the context of this volume formatting/initialization procedure. Integration of this and other preferred exemplary embodiment methods in conjunction with a variety of preferred exemplary embodiment systems described herein is anticipated by the overall scope of the present invention.

Data Storage Architecture Data Storage Extension Method (2800)

Once the logical drive has been formatted as generally depicted in FIG. 26 (2600) and FIG. 27 (2700), the logical volume may be mounted by the operating system and used as needed to store/retrieve data. Should the logical volume require additional storage as its physical drives become filled with data, an exemplary invention embodiment data extension method may be utilized to increase the physical storage capacity of the overall logical drive.

Figure 28:
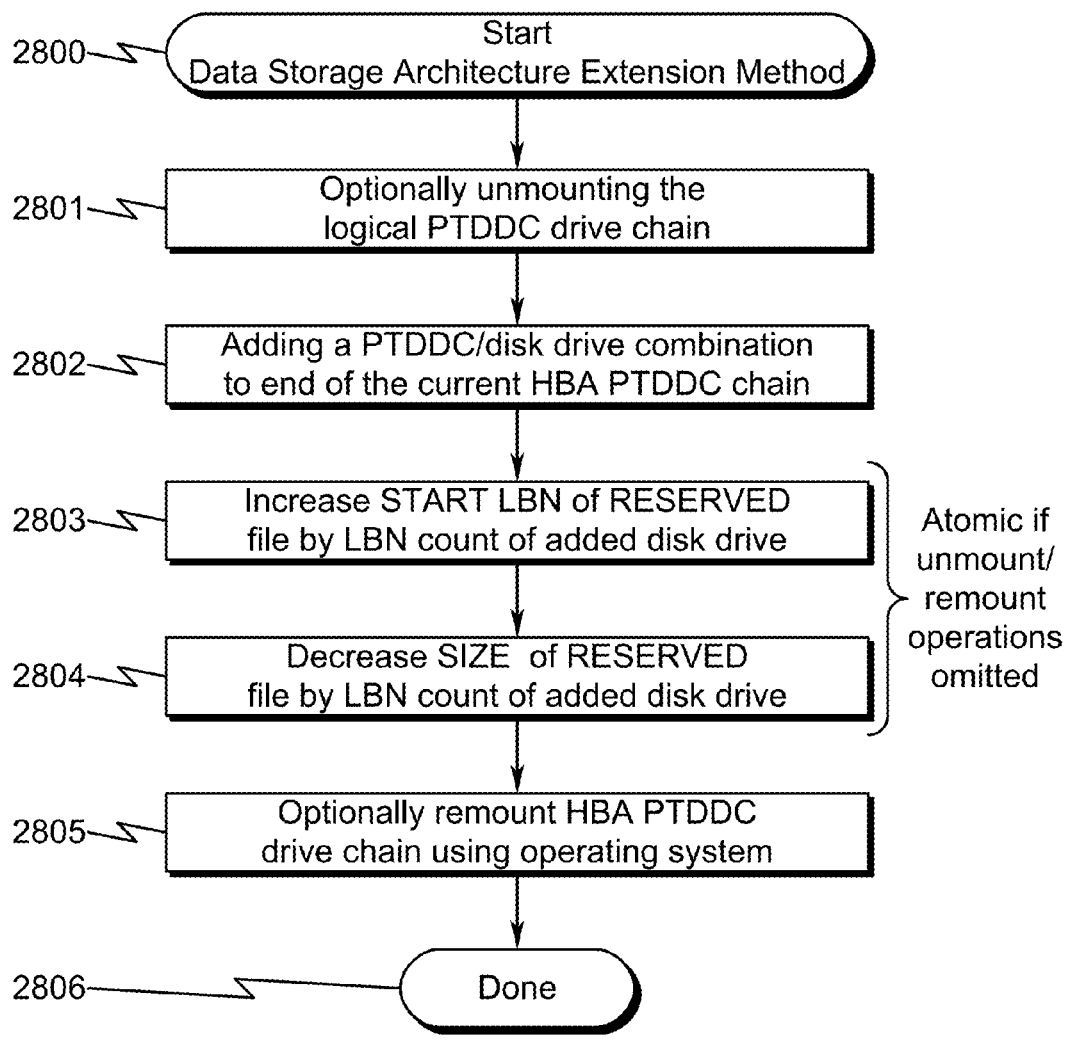
FIG. 28 illustrates a generalized method flowchart illustrating a data storage architecture extension volume insertion methodology utilized in some preferred exemplary embodiments of the present invention.

One present invention data storage extension method embodiment variation can be generally illustrated by the preferred exemplary embodiment illustrated in FIG. 28 (2800). The general steps of this method comprise the following:

Optionally unmounting the HBA PTDDC logical drive chain (2801);

Adding a PTDDC/disk drive combination to end of the current HBA PTDDC chain (2802);

Increasing START LBN of RESERVED file by LBN count of added disk drive (2803);

Decreasing SIZE of RESERVED file by LBN count of added disk drive (2804);

Optionally remount HBA PTDDC logical drive chain using operating system (2805).

This general method variation as illustrated in FIG. 28 (2800) may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

It is interesting to note that in some configurations the utilization of "hot swap" disk drive HBA interfaces (such as SATA, eSATA, microSATA) can permit this extension of disk drive physical storage to occur without the need for the unmounting operation (step (1) (2801)) or the remounting operation (step (5) (2805)) because the operating system already recognizes the logical drive size of the mounted drive as MAXVOL, with the only caveat that any space above MAXLBN is allocated to the RESERVED file(s) that may not be used by applications within the operating system. The only requirement for this method to work without the need for unmount/remount operations is that step (3) (2803) and step (4) (2804) be atomically interlocked in implementation.

Exemplary System Embodiment Construction (2900)

Figure 29:
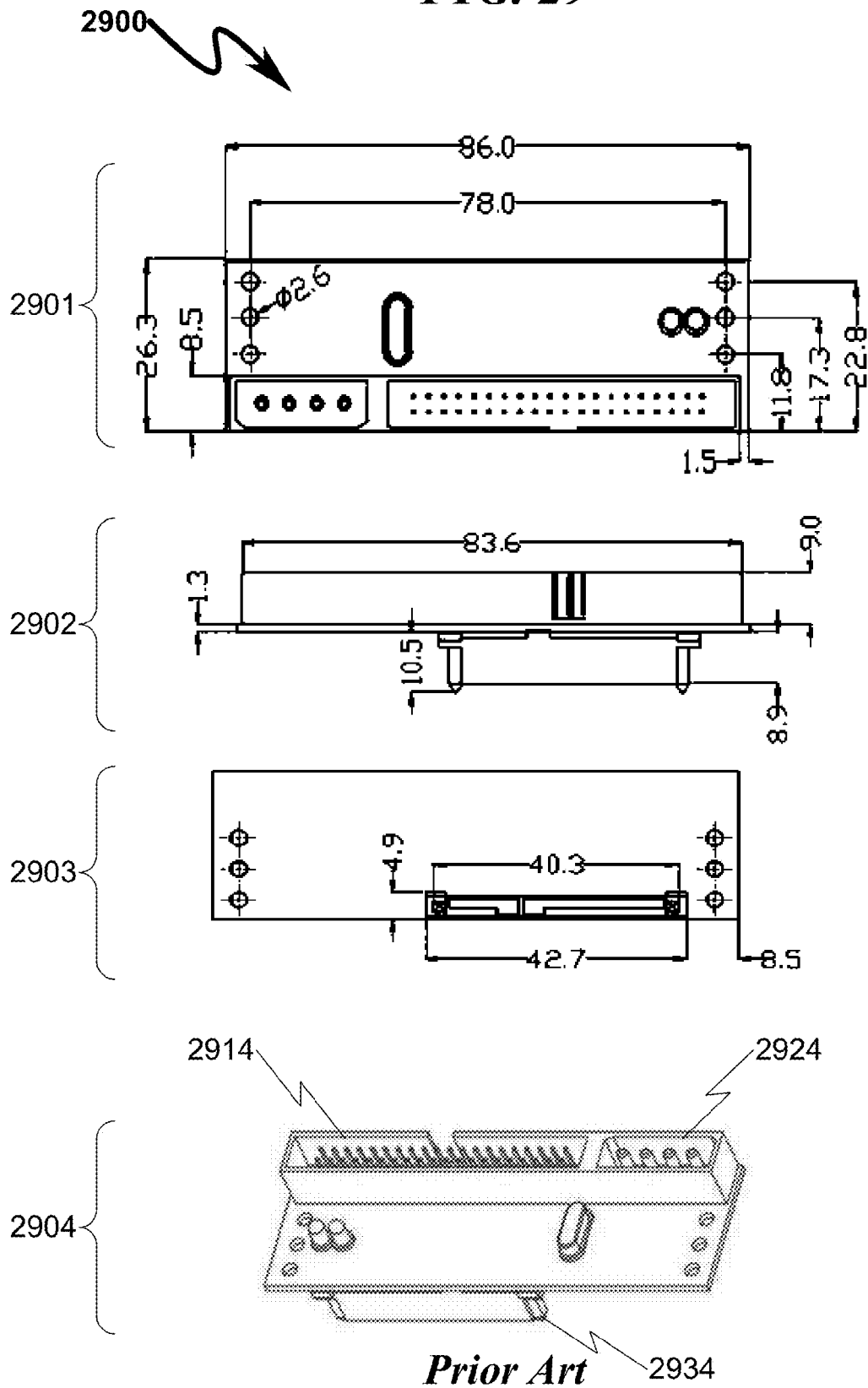
FIG. 29 illustrates a prior art "piggy-back" SATA-to-IDE converter/adapter mechanical substrate example useful in implementing some preferred exemplary embodiments of the present invention.

The present invention may be embodied in many physical implementations, but several preferred exemplary embodiments utilize a "piggy-back" printed circuit board (PCB) that mates with the disk drive to provide a mechanical platform for an application specific integrated circuit (ASIC) to implement the disclosed PTDDC. An example of this physical construction as implemented within a SATA-to-IDE converter/adapter is generally illustrated in FIG. 29 (2900). As generally illustrated in FIG. 29 (2900), this converter/adapter is illustrated in a front (2901), top (2902), rear (2903), and perspective views (2904) with nominal dimensions in millimeters. In this example, the converter operates by integrating a PATA IDE interface (2914) in addition to a drive power connector (2914) on a PCB (2904). This PCB also contains a combination SATA data/power connector (2934) that is connected to a SATA disk drive. The PCB also contains an ASIC that electrically interfaces the PATA IDE interface (2914) to the SATA disk drive interface (2934).

Exemplary Embodiment

Drive Stacking Connections (3000)

Figure 30:
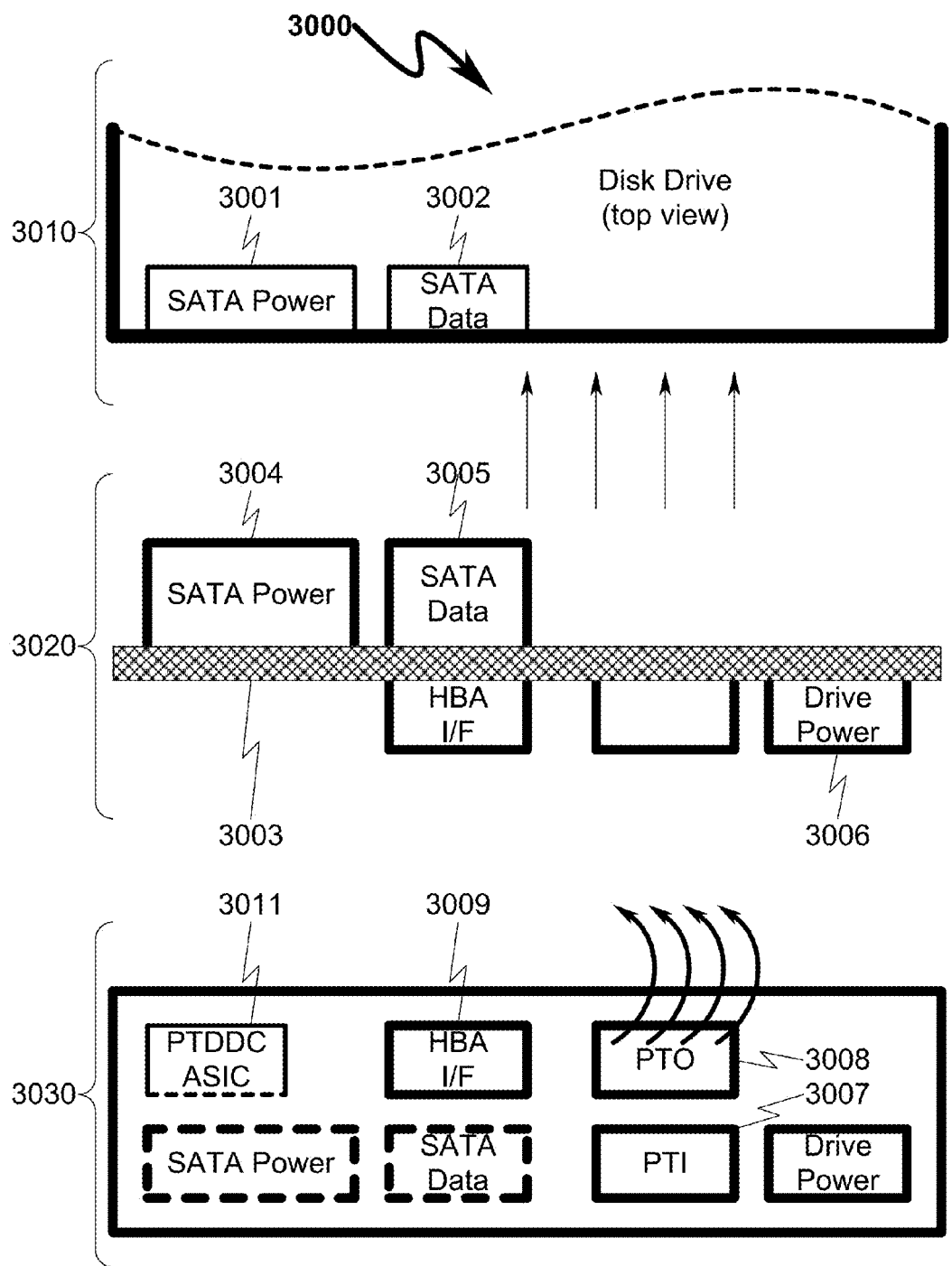
FIG. 30 illustrates a "piggy-back" mechanical substrate implementation, complete with connector placement, useful in implementing some preferred exemplary embodiments of the present invention with respect to SATA disk drives.

This piggy-back PCB adapter architecture may be used as a framework to provide a physical platform for the present invention implementing a PTDDC as generally illustrated in FIG. 30 (3000). In this preferred exemplary embodiment, the target disk drive (3010) comprises a SATA interface having SATA power (3001) and SATA data connectors (3002). This SATA disk drive (3010) is interfaced to the present invention preferred embodiment via the use of a PCB or other substrate (3003) having SATA power (3004) and SATA data (3005) connectors as well as a drive power connector (3006) as generally illustrated in the top view of the preferred exemplary embodiment (3020).

The PCB or other substrate (3003) will generally also incorporate pass-thru input (PTI) (3007) and pass-thru output (PTO) (3008) connections that are used to pass data and control information between daisy-chained PTDDC subsystems. The host bus adapter (HBA) (3009) connection is provided to permit a direct interface to the computer disk drive interface via a cable, in this implementation a SATA data cable. The PCB (3003) will generally also support the integration of the ASIC (3011) used to implement the PTDDC functionality. Note in this exemplary implementation that the PTO connector (3008) will generally be constructed to permit daisy-chaining of one PTDDC unit PTO connection to a subsequent PTDDC unit PTI connection.

As generally illustrated in FIG. 30 (3000), the PTDDC as implemented on a piggy-back PCB substrate may orient the PTI and PTO connectors in a manner to permit daisy-chaining of the PTDDC modules if these modules (and their associated disk drives) are stacked vertically on top of one another. The connectors used in this configuration may be of the ribbon cable type incorporating pinned headers for economy and ease of connection.

One optimization that may take place in this configuration is that the HBA connector (3009) may be electrically connected to the PTI port connector (3007). In this configuration, the ASIC (3011) need only have three SATA ports: a combined HBA/PTI port, a PTO port having SATA electrical characteristics, and a SATA drive interface port (3005). This optimization permits the use of reduced-cost interconnects between the PTO/PTI connectors that daisy-chain the SATA drives while still permitting interfacing to the computer system drive interface bus using a standard SATA data interface cable.

Exemplary Embodiment

Stacked Drive Enclosures (3100)

The present invention anticipates that the techniques associated with the PTDDC may be implemented on a PCB that incorporates connectors for disk drives to be plugged into the PCB at right angles to the plane of the PCB. By incorporating the PTDDC onto the PCB, it is possible to create a stacked drive enclosure with a plethora of disk drive bays that can be inserted or removed at will. This configuration is especially useful in scenarios where the PTDDC implements some form of RAID among the various hard drives within the stacked drive enclosure, permitting disk drives that have failed to be replaced if necessary.

Figure 31:
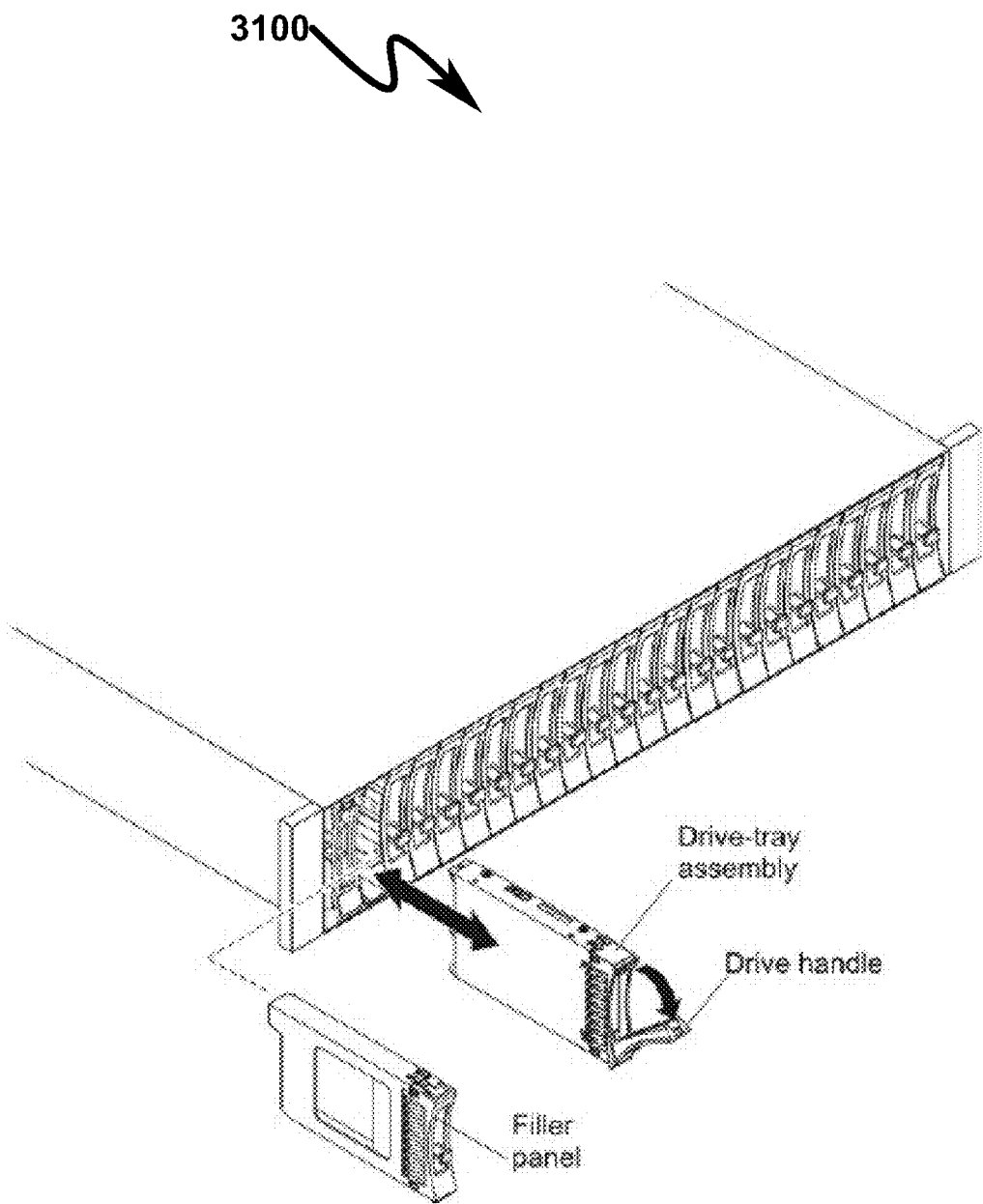
FIG. 31 illustrates an exemplary embodiment of the present invention applied to scenarios wherein a chained series of PTDDCs is mounted on a PCB that provides for connections to disk drives that are rack-mounted.

As an example of this type of enclosure concept, a prior art enclosure is illustrated in FIG. 31 (3100) and generally illustrates that the stacked drive enclosure can incorporate multiple disk drives that can be removed without the use of tools or other hardware. In this scenario, the invention anticipates that the best mode implementation of this concept will utilize SATA drives incorporating hot-swap capabilities.

Exemplary Embodiment

Integrated Drive Stacking (3200)

The present invention may be embodied in many physical implementations, but several preferred exemplary embodiments integrate the PTDDC on the PCB of the disk drive and expand the connector complement on the disk drive to permit disk drives to be "stacked" within drive enclosures and serviced by a single HBA drive interface cable. Many existing disk drives incorporate a single chip integrated circuit controller (ASIC) that serves as the HBA interface as well as controlling most if not all functions associated with the disk drive. The present invention anticipates that the additional PTDDC functionality detailed herein may be rolled into the existing ASIC disk drive controller circuitry to provide an optimal and cost effective methodology to promote data storage extension with off-the-shelf hard disk drive components.

Figure 32:
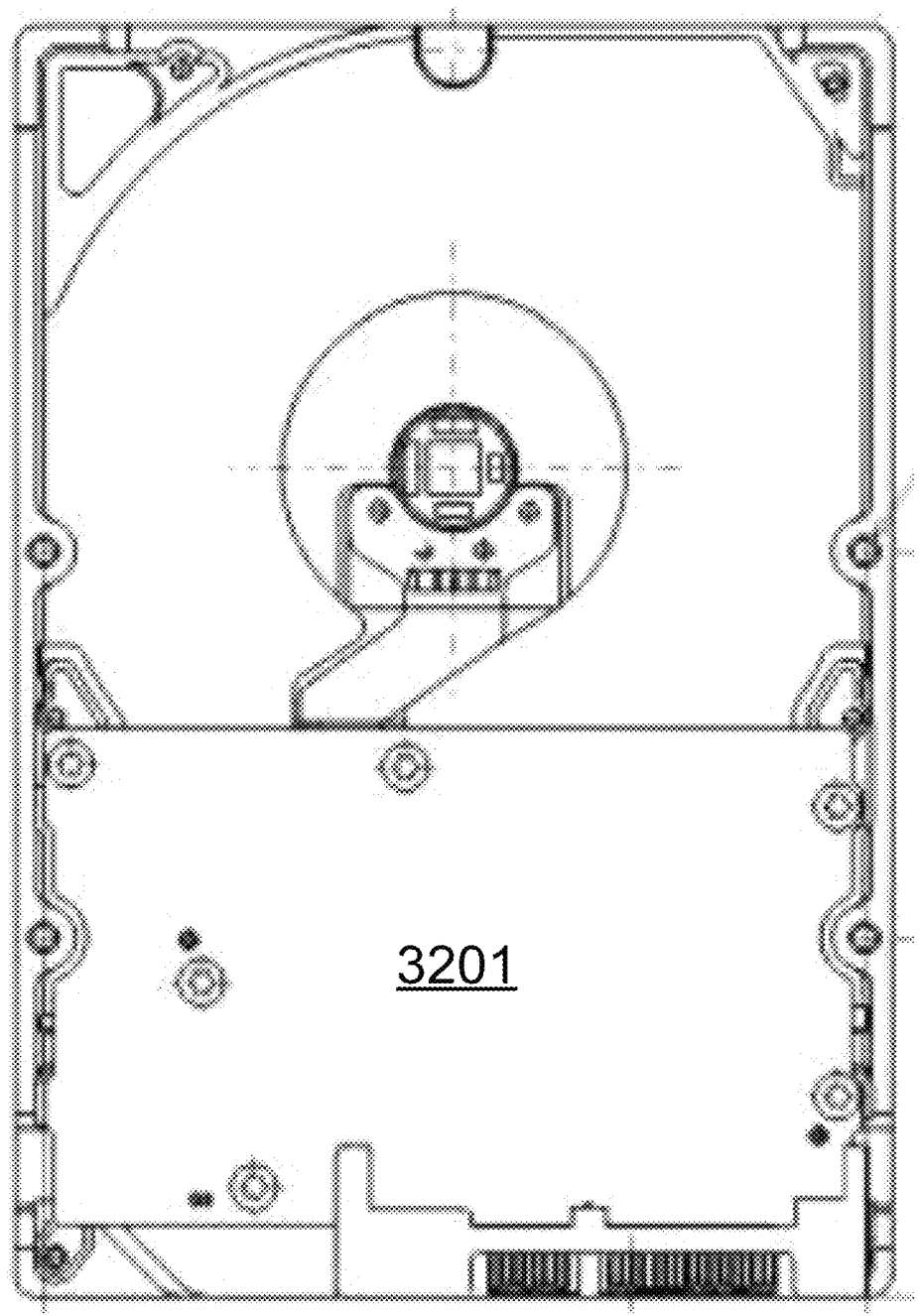
FIG. 32 illustrates an exemplary embodiment of the present invention applied to scenarios wherein disk drives are rack-mounted.

Many preferred exemplary embodiments of the present invention will utilize this technique incorporated into disk drives having SATA interfaces, as this will present economies and optimizations for cable management that may not be present in other disk drive interfaces. A typical hardware configuration for such a system is generally illustrated in the prior art disk outline of FIG. 32 (3200), wherein the PCB (3201) is anticipated to integrate both the disk drive electronics and the proposed PTDDC functionality. Note that the PTI/PTO port functionality as generally depicted in FIG. 30 (3000) would by necessity be augmented into the connector complement of this hardware configuration to implement the necessary pass-thru functionality utilized in the present invention.

Operating System Independence

A significant detriment to NFS and other attached storage systems that are managed by internal operating systems is that the on-disk file structure created by these specialized NFS systems often does not match that of the native file system used by the operating system on the host computer using the NFS system for data storage. Specialized features within the host operating system on-disk file system may or may not have equivalent mappings to the on-disk file system supported by the NFS.

The present invention, by making the logical PTDDC daisy-chained disk drives appear as one logical disk drive with a standard host HBA interface permits the native operating system to format/partition/initialize an on-disk file system that has all the native capabilities supported by the host operating system. For this reason the system is extremely efficient with respect to the on-disk file system implementation in that no abstraction layers or file system translators are necessary to interface to the host operating system.

Compatibility With Port Multipliers/Port Selectors

Figure 6:
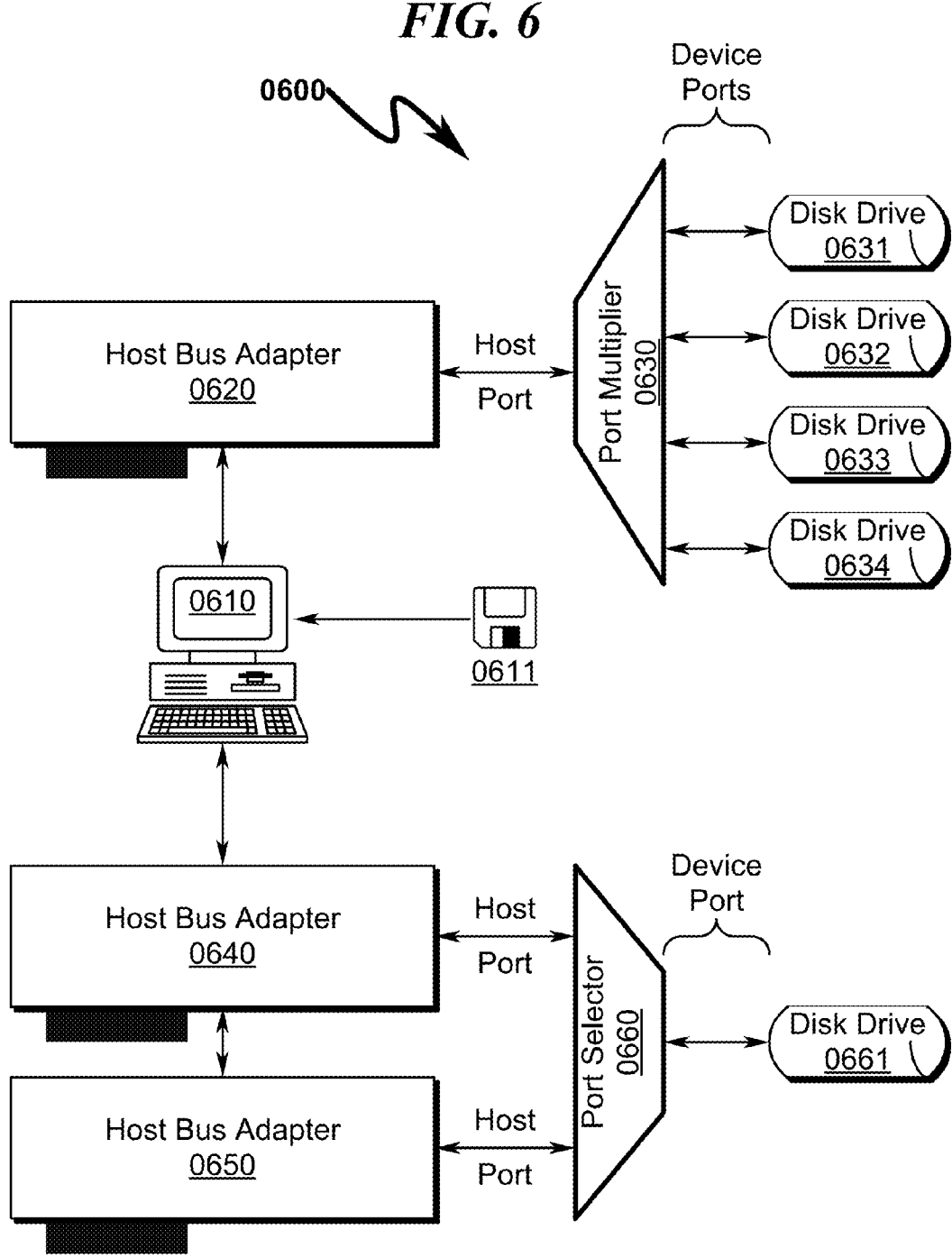
FIG. 6 illustrates a prior art port multiplier/port selector concept.
Figure 7:
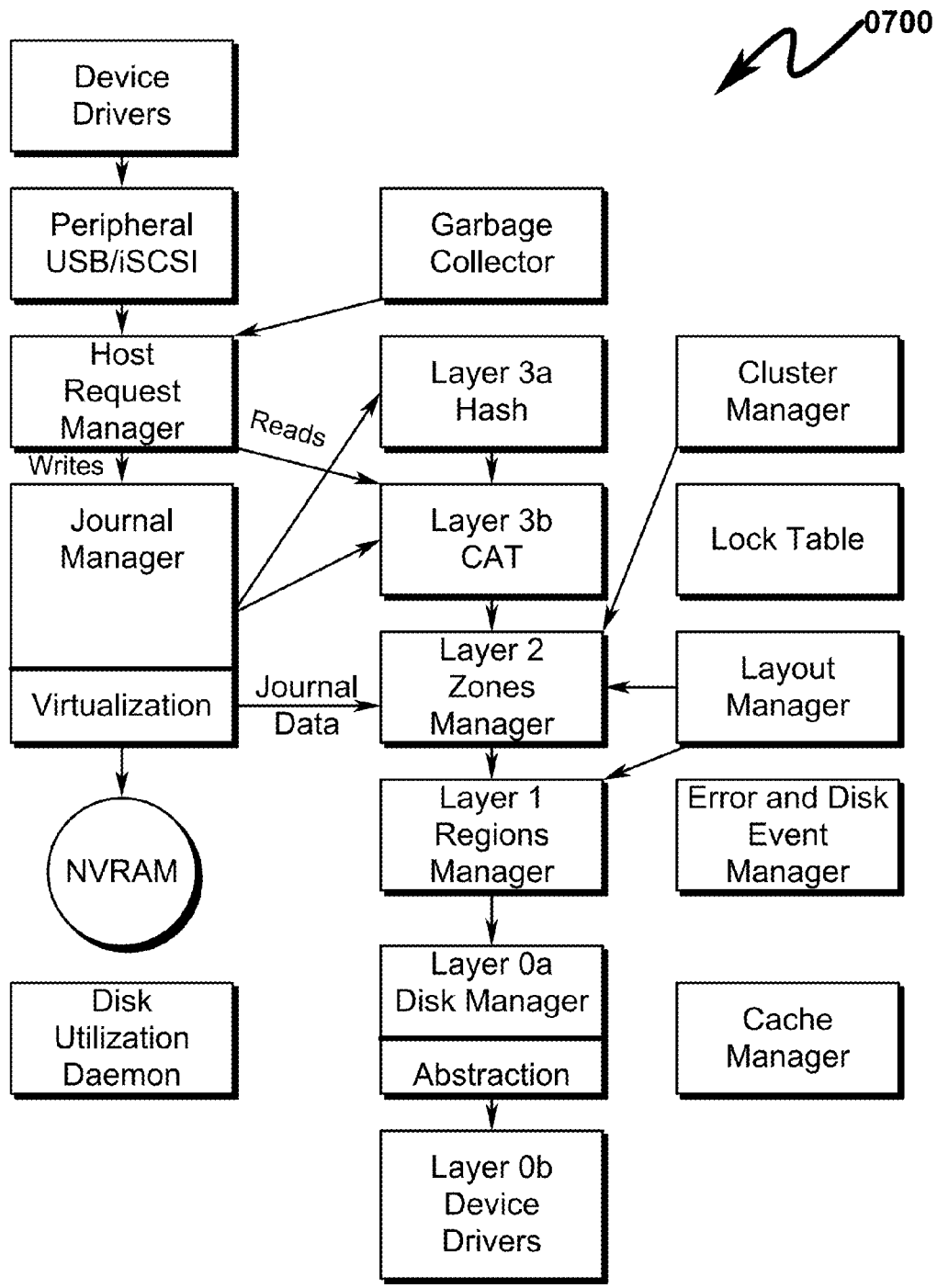
FIG. 7 illustrates a prior art data storage extension system as taught by U.S. Pat. No. 7,814,272.
Figure 8:
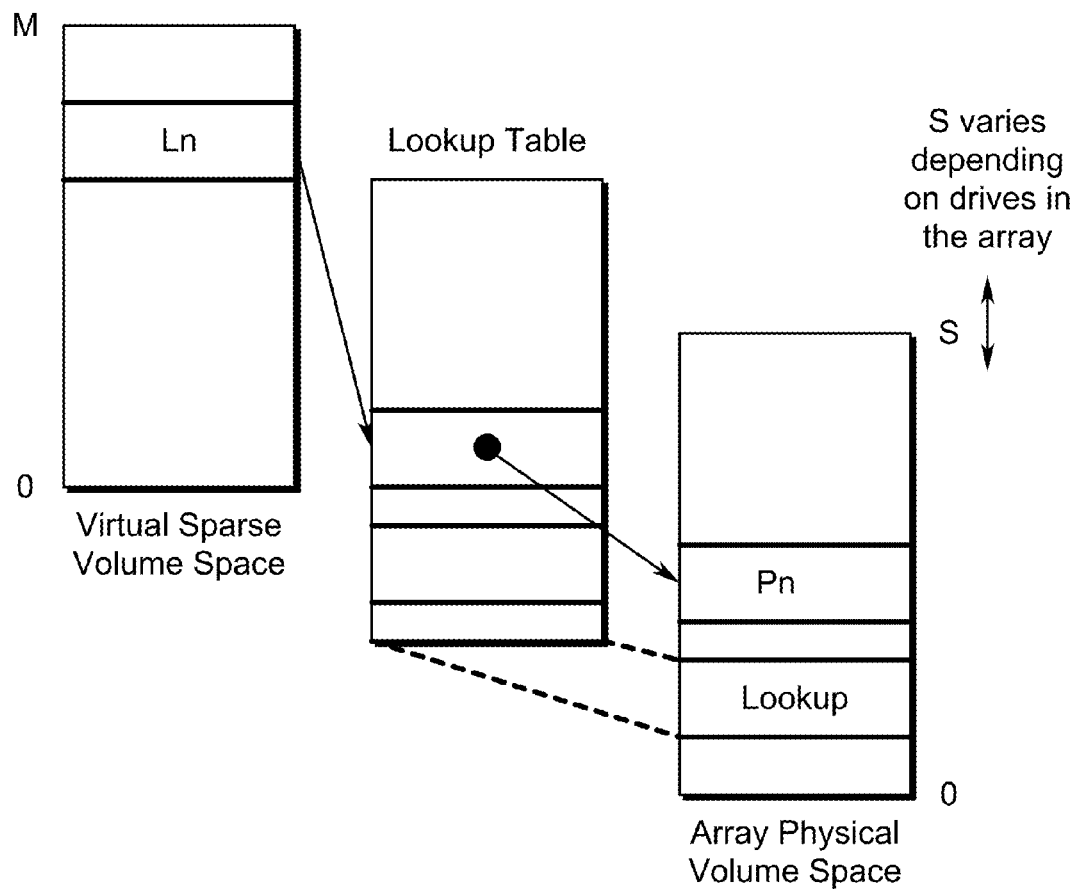
FIG. 8 illustrates a prior art data storage extension system incorporating logical block address remapping as taught by U.S. Pat. No. 7,814,272.
Figure 9:
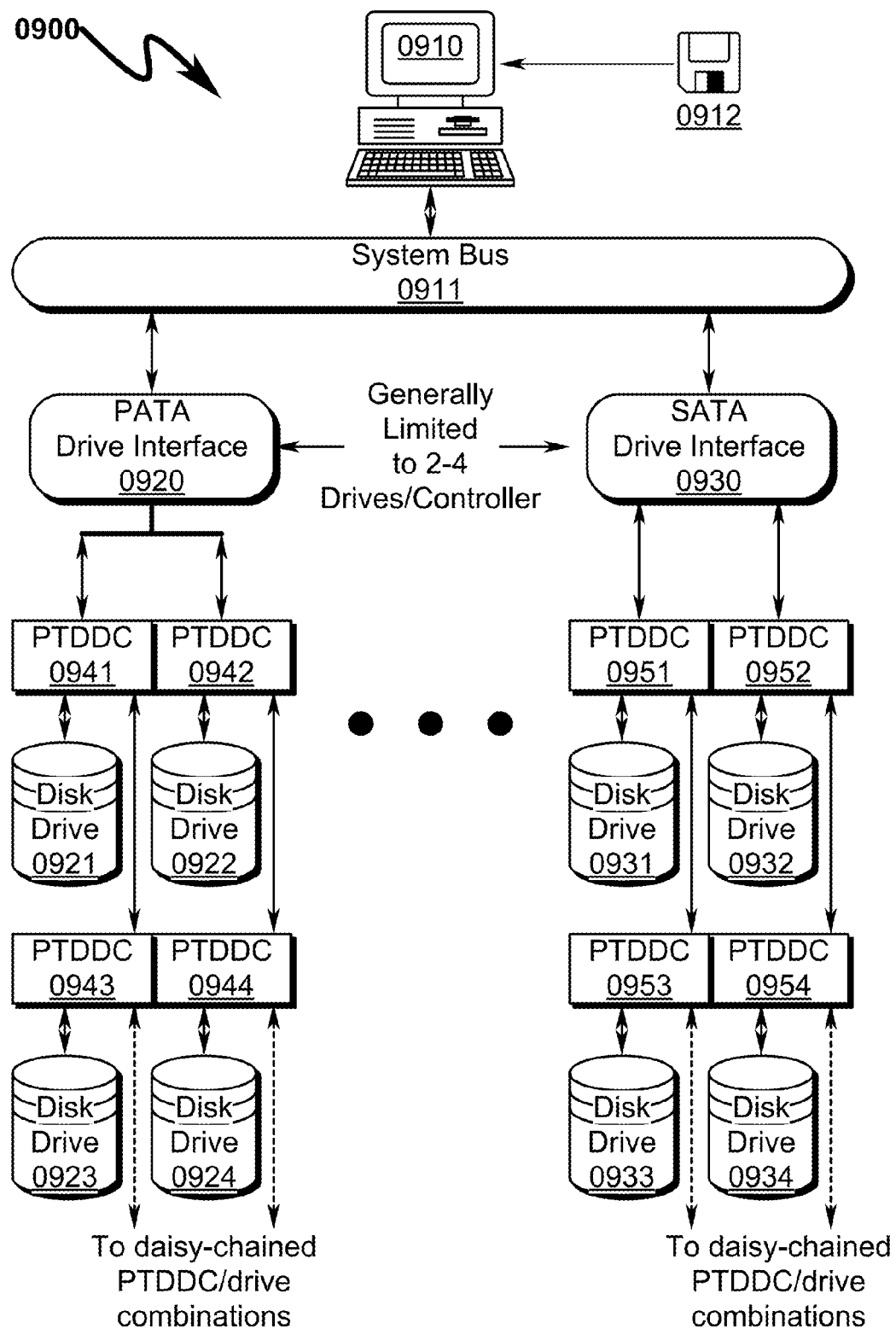
FIG. 9 illustrates a data storage application system utilizing an exemplary system embodiment of the present invention, contrasting the prior art data storage architecture of FIG. 1.

The present invention as exemplified by the PTDDC concept is totally compatible with existing port multiplier/port selector techniques described in the SATA specification and generally depicted in FIG. 6 (0600). This compatibility permits rapid integration of the present invention into "cloud" computing environments where vast arrays of data storage are implemented for the support of a plethora of computers and associated computer users. The advantage of the present invention as implemented in these environments is a significant cost reduction in overall data storage costs at the enterprise level as compared to the prior art and detailed below.

Cost Comparison to the Prior Art

As stated previously, one of the deficiencies of the prior art is the near exponential increase in the disk drive cost when the disk drive is attached to the computer system via the use of NAS and related technologies. The fact that these technologies rely on a separate computer-controlled interface to the storage array which then must be interfaced to a host computer requires the deployment of significant hardware and software resources that necessarily drive up the cost of these systems, generally to 4-10 times that of the individual disk drives that are added. Unfortunately, as the storage array size is increased, so is this per-drive cost multiplication factor.

In contrast, the PTDDC daisy-chained approach of the present invention permits the per-drive interface to consume only an estimated USD$4 in PCB/ASIC costs (asymptotically reaching USD$1 in quantity). Even assuming this per-drive interface cost was USD$10, it would still only represent a 25% increase in overall per-drive installation costs for a given storage array, not the 500%-1000% cost increases associated with the prior art. As a practical example, using the inflated USD$10 cost of each PTDDC and 2-TB disk drives to create a 24-TB storage array, the resulting retail storage array cost would be approximately USD$1200, rather than the cited USD$15000 value for the DROBO® brand NAS equivalent storage system detailed herein above. Even assuming disk drive rack mounting system and associated power supplies costing USD$300, this still represents a cost reduction of an order of magnitude in comparison to the current capabilities of the prior art.

System Summary

The present invention system anticipates a wide variety of variations in the basic theme of construction, but can be generalized as a data storage architecture extension system comprising a pass-thru disk drive controller (PTDDC), the PTDDC further comprising:
(a) host bus adapter (HBA) port;
(b) disk drive interface (DDI) port;
(c) pass-thru input (PTI) port; and
(d) pass-thru output (PTO) port;
wherein
the PTDDC receives disk drive data access command (DDDAC) input via the HBA port or the PTI port;
the DDDAC is translated by the PTDDC and electrically transmitted via the DDI port in a form suitable for use by any attached and logically addressed disk drive electrically connected to the DDI port;
the PTDDC determines if the DDDAC falls within the LBA range of the attached disk drive, and if so, passes the DDDAC to the attached disk drive after modifying the DDDAC to account for the logical block address space mapped by the attached disk drive;
the PTDDC determines if the DDDAC falls within the LBA range of the attached disk drive, and if not, the DDDAC is passed via the PTO port to the PTI port of any daisy-chained PTDDC attached to the PTDDC PTO port; and
the PTDDC logically connects the DDI port from the attached disk drive with the HBA port and the PTI port to affect data transfers requested by the DDDAC to/from the attached disk drive and the HBA port or the PTI port.

This general system summary may be augmented by the various elements described herein to produce a wide variety of invention embodiments consistent with this overall design description.

Method Summary

The present invention method anticipates a wide variety of variations in the basic theme of implementation, but can be generalized as a data storage architecture extension method wherein the method controls a data storage architecture extension system comprising a pass-thru disk drive controller (PTDDC), the PTDDC further comprising:
(a) host bus adapter (HBA) port;
(b) disk drive interface (DDI) port;
(c) pass-thru input (PTI) port; and
(d) pass-thru output (PTO) port;
with the method comprising the steps of:
(1) receiving a disk drive data access command (DDDAC) input via the HBA port or the PTI port;
(2) translating the DDDAC and transmitting the DDDAC via the DDI port in a form suitable for use by any attached and logically addressed disk drive electrically connected to the DDI port;
(3) determining if the DDDAC falls within the LBA range of the attached disk drive, and if so, passing the DDDAC to the attached disk drive after modifying the DDDAC to account for the logical block address space mapped by the attached disk drive;
(4) determining if the DDDAC falls within the LBA range of the attached disk drive, and if not, passing the DDDAC via the PTO port to the PTI port of any daisy-chained PTDDC attached to the PTDDC PTO port; and
(5) logically connecting the DDI port from the attached disk drive with the HBA port and the PTI port to affect data transfers requested by the DDDAC to/from the attached disk drive and the HBA port or the PTI port.

This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and its associated method may be augmented with a variety of ancillary embodiments, including but not limited to:
An embodiment wherein the HBA port comprises an electrical interface selected from a group consisting of PATA, SATA, eSATA, microSATA, Fibre Channel, Serial Storage Architecture (SSA), and USB.

An embodiment wherein the HBA port and the PTI port are electrically connected and form a single unitary interface port with respect to the PTDDC.

An embodiment wherein the PTDDC comprises an ASIC mounted on a PCB, the PCB further comprising a connector for electrically mating the DDI port to a disk drive, a connector for electrically mating the HBA port to a computer host bus adapter, a connector for electrically mating the PTO port to the PTI port of a downstream daisy-chained PTDDC controller, and a connector for electrically mating the PTI port to the PTO port of an upstream daisy-chained PTDDC controller.

An embodiment wherein the PTDDC comprises an ASIC mounted on a PCB, the ASIC incorporating disk drive control electronics in conjunction with PTDDC functionality, the PCB being integrated into the electrical control system of a disk drive, the PCB further comprising a connector for electrically mating the HBA port to a computer host bus adapter, a connector for electrically mating the PTO port to the PTI port of a downstream daisy-chained PTDDC controller, and a connector for electrically mating the PTI port to the PTO port of an upstream daisy-chained PTDDC controller.

An embodiment wherein the PTDDC performs the translation by determining if the LBA values associated with the DDDAC falls within the LBA range of the attached disk drive, and if not, reducing the LBN values associated with the DDDAC by the LBA count of the attached disk drive and passing this resulting DDDAC via the PTO port to the PTI port of any daisy-chained PTDDC attached to the PTDDC PTO port.

An embodiment wherein the disk drive access command does not undergo LBA translation but is immediately forwarded to the PTO port for processing by the daisy-chained PTDDC to affect a RAID storage array configuration between the attached disk drive and another disk drive attached to the daisy-chained PTDDC, the RAID storage array configuration selected from a group consisting of RAID-0, RAID-1, RAID-2, RAID-3, RAID-4, RAID-5, and RAID-6.

An embodiment wherein the DDI port comprises an electrical interface selected from a group consisting of PATA, SATA, eSATA, microSATA, Fibre Channel, Serial Storage Architecture (SSA), and USB.

An embodiment comprising a logical file system, the logical file system comprising a plethora of PTDDC controllers daisy-chained in series via connection of a PTO port from an upstream PTDDC to the PTI port on a downstream PTDDC, with each the PTDDC connected to a disk drive via a DDI port, and with the HBA port of the first PTDDC in the daisy-chain connected to the host bus adapter of a computer system.

An embodiment wherein the logical file system implements an on-disk file system selected from a group consisting of EXT2, EXT3, EXT4, FAT12, FAT16, FAT32, Files-11 (ODS), HFS, HFS Plus (HFS+), NTFS, and XFS.

An embodiment wherein the logical file system has a logical storage capacity larger than the sum of the storage capacity of disk drives attached to the plethora of series daisy-chained PTDDC controllers, with the logical storage capacity in excess of the disk drive capacity allocated to one or more RESERVED files within the logical file system, wherein the BASE LOCATION and EXTENT SIZE of the RESERVED files may be modified to permit addition of one or more supplemental disk drives/PTDDC controller combinations as these the supplemental disk drives/PTDDC controller combinations are added to the terminal end of the chain of the plethora of series daisy-chained PTDDC controllers.

One skilled in the art will recognize that other embodiments are possible based on combinations of elements taught within the above invention description.

CONCLUSION

A data storage architecture extension (DAX) system and method that permits multiple disk drive storage elements to be logically daisy-chained to allow a single host bus adapter (HBA) to view the storage elements as one logical disk drive has been disclosed. The system/method may be broadly described as comprising a pass-thru disk drive controller (PTDDC) further comprising a HBA port, a disk drive interface (DDI) port, pass-thru input (PTI) port, and a pass-thru output (PTO) port. The PTDDC intercepts and translates the HBA port input to the requirements of an individual disk drive connected to the drive interface port. Each PTDDC may be daisy-chained to other PTDDCs to permit a plethora of disk drives to be associated with a given HBA, with the first PTDDC providing a presentation interface to the HBA integrating all disk drive storage connected to the PTDDCs. The system/method also permits RAID configuration of disk drives using one or more PTDDCs.

What is claimed is:

1. A serial advanced technology attachment (SATA) disk drive identification method for individually identifying a daisy-chained data storage architecture extension system comprising a pass-thru disk drive controller (PTDDC), said PTDDC further comprising:
   (a) pass-thru input (PTI) port;
   (b) disk drive interface (DDI) port; and
   (c) pass-thru output (PTO) port;
   wherein
   said PTI port, said DDI port, and said PTO port are SATA interfaces;
   said PTDDC is configured to connect a plurality of PTDDCs to form a serial daisy-chain by only interconnecting the PTO port of one PTDDC to the PTI port of another PTDDC in said daisy-chain;
   said PTDDC is configured to present a continuous logical block address space via said PTI port comprising disk drives electrically connected to PTDDCs in said daisy-chain;
   said PTDDC is configured to receive disk drive data access command (DDDAC) input via said PTI port;
   said PTDDC is configured to translate said DDDAC and electrically transmit said translation via said DDI port in a form suitable for use by any attached and logically addressed disk drive electrically connected to said DDI port;
   said PTDDC determines when said DDDAC falls within the logical block address (LBA) range of said attached disk drive, and if so, passes said DDDAC to said attached disk drive after modifying said DDDAC to account for said LBA range mapped by said attached disk drive;
   said PTDDC determines when said DDDAC falls within said LBA range of said attached disk drive, and if not, said DDDAC is passed via said PTO port to the PTI port of any daisy-chained PTDDC attached to said PTDDC PTO port; and
   said PTDDC logically connects said DDI port from said attached disk drive with said PTI port to pass-thru data transfers requested by said DDDAC to/from said attached disk drive and said PTI port;

wherein said method further comprises the steps of:
(1) storing a unique electronic serial number (ESN) within said PTDDC via the steps of:
   (a) issuing a DRIVE RESET command via a host bus adapter (HBA) to the first PTDDC in said PTDDC serial daisy-chain;
   (b) propagating said DRIVE RESET command through all PTDDCs in said PTDDC daisy-chain;
   (c) setting a local PTDDC_ADR variable only within said PTDDC configured to increment that is maintained within each PTDDC in said serial daisy-chain to a value of zero in response to said DRIVE RESET command;
   (d) issuing an IDENTIFY DEVICE command to said PTDDC daisy-chain via said HBA;
   (e) determining when a PTDDC within said PTDDC serial daisy chain receiving said IDENTIFY DEVICE command has a local PTDDC_ADR variable that is equal to a value of zero, and if so, proceeding to step (h);
   (f) sending said IDENTIFY DEVICE command to the current PTDDC in said PTDDC daisy-chain;
   (g) returning data from the current PTDDC in said PTDDC daisy-chain and incrementing the value of said PTDDC_ADR local variable within said current PTDDC;
   (h) determining when the first PTDDC receiving said IDENTIFY DEVICE command indicates the value of said local PTDDC_ADR variable is zero, then issuing said IDENTIFY DEVICE command to any disk drive attached to said first PTDDC, and incrementing said PTDDC_ADR local variable;
   (i) passing control to said step (d) until PTDDCs searching is completed; and
(2) configuring said PTDDC to enable said ESN to be readable via said PTI port.

2. The SATA disk drive identification method of claim 1 wherein said ESN comprises a unique electronic text field to indicate that said text field is associated with a PTDDC.

3. The SATA disk drive identification method of claim 1 wherein said steps further comprise modifying results in a SATA IDENTIFY DEVICE command response by said PTDDC to return said ESN information within a SATA DISK DRIVE MODEL NUMBER data field via said command response.

4. The SATA disk drive identification method of claim 1 wherein said steps further comprise modifying results in words 27-46 of a SATA IDENTIFY DEVICE command response by said PTDDC to return said ESN information within a SATA DISK DRIVE MODEL NUMBER data field via said command response.

5. The SATA disk drive identification method of claim 1 wherein said steps further comprise modifying results in words 10-19 of a SATA IDENTIFY DEVICE command response by said PTDDC to return said ESN information within a SATA DISK DRIVE SERIAL NUMBER data field via said command response.

6. The SATA disk drive identification method of claim 1 wherein said steps further comprise modifying results in a SATA IDENTIFY DEVICE command response by said PTDDC to return said ESN information within a SATA DISK DRIVE SERIAL NUMBER data field via said command response.

7. The SATA disk drive identification method of claim 1 wherein said steps further comprise issuing a RESET DEVICE command to said PTDDC to initialize state machine logic within said PTDDC such that a subsequent IDENTIFY DEVICE command received by said PTDDC retrieves disk drive information normally including a model number and serial number.

8. The SATA disk drive identification method of claim 1 wherein said steps further comprise issuing a RESET DEVICE command to said PTDDC followed by subsequent IDENTIFY DEVICE commands to said PTDDC to retrieve disk drive information for a disk drive connected to said DDI port and data from local memory of said PTDDC.

9. The SATA disk drive identification method of claim 1 wherein said steps further comprise presenting said ESN to said PTI port in response to a phantom protocol request presented to said PTDDC.

10. The SATA disk drive identification method of claim 1 wherein said steps further comprise presenting said ESN to said PTI port in response to a phantom protocol request presented to said PTDDC that is associated with a sector address of a SATA disk drive attached to said DDI port.

11. The SATA disk drive identification method of claim 1 wherein said steps further comprise writing said ESN to said PTDDC by writing memory within said PTDDC and subsequently writing a memory bit within said PTDDC to lock said ESN within said PTDDC.

12. The SATA disk drive identification method of claim 1 wherein said steps further comprise issuing a "DRIVE RESET" command to said PTDDC serial daisy-chain to clear a lock bit used to prevent writing memory within said PTDDC.

13. A serial advanced technology attachment (SATA) disk drive identification method for individually identifying a daisy-chained data storage architecture extension system comprising a pass-thru disk drive controller (PTDDC), said PTDDC further comprising:
   (a) pass-thru input (PTI) port;
   (b) disk drive interface (DDI) port; and
   (c) pass-thru output (PTO) port;
   wherein
   said PTI port, said DDI port, and said PTO port are SATA interfaces;
   said PTDDC is configured to connect a plurality of PTDDCs to form a serial daisy-chain by only interconnecting the PTO port of one PTDDC to the PTI port of another PTDDC in said daisy-chain;
   said PTDDC is configured to present a continuous logical block address space via said PTI port comprising disk drives electrically connected to PTDDCs in said daisy-chain;
   said PTDDC is configured to receive disk drive data access command (DDDAC) input via said PTI port;
   said PTDDC is configured to translate said DDDAC and electrically transmit said translation via said DDI port in a form suitable for use by any attached and logically addressed disk drive electrically connected to said DDI port;
   said PTDDC determines when said DDDAC falls within the logical block address (LBA) range of said attached disk drive, and if so, passes said DDDAC to said attached disk drive after modifying said DDDAC to account for said LBA range mapped by said attached disk drive;
   said PTDDC determines when said DDDAC falls within said LBA range of said attached disk drive, and if not, said DDDAC is passed via said PTO port to the PTI port of any daisy-chained PTDDC attached to said PTDDC PTO port; and
   said PTDDC logically connects said DDI port from said attached disk drive with said PTI port to pass-thru data transfers requested by said DDDAC to/from said attached disk drive and said PTI port;

wherein said method further comprises the steps of:

(1) issuing a DRIVE RESET command via a host bus adapter (HBA) to the first PTDDC in said PTDDC serial daisy-chain;

(2) propagating said DRIVE RESET command through all PTDDCs in said PTDDC daisy-chain;

(3) setting a local PTDDC_ADR variable only within said PTDDC configured to increment that is maintained within each PTDDC in said serial daisy-chain to a value of zero in response to said DRIVE RESET command;

(4) issuing an IDENTIFY DEVICE command to said PTDDC daisy-chain;

(5) determining when a PTDDC within said PTDDC serial daisy chain receiving said IDENTIFY DEVICE command has a PTDDC_ADR variable that is equal to a value of zero, and if so, proceeding to step (8);

(6) sending said IDENTIFY DEVICE command to the current PTDDC in said PTDDC daisy-chain;

(7) returning data from the current PTDDC in said PTDDC daisy-chain and incrementing the value of said PTDDC_ADR variable within said current PTDDC;

(8) determining when the first PTDDC receiving said IDENTIFY DEVICE command indicates the value of said PTDDC_ADR is zero, then issuing said IDENTIFY DEVICE command to any disk drive attached to said first PTDDC, and incrementing said PTDDC_ADR variable;

(9) passing control to said step (4) until PTDDCs searching is completed.

14. The SATA disk drive identification method of claim 13 wherein the response to said IDENTIFY DEVICE command comprises drive model number information on said SATA disk.

15. The SATA disk drive identification method of claim 13 wherein the response to said IDENTIFY DEVICE command response comprises drive serial number information on said SATA disk.

16. The SATA disk drive identification method of claim 13 wherein the response to said IDENTIFY DEVICE command is configured to uniquely identify said SATA disk drive.

17. A serial advanced technology attachment (SATA) disk drive identification method for individually identifying a daisy-chained data storage architecture extension system comprising a pass-thru disk drive controller (PTDDC), said PTDDC further comprising:

(a) pass-thru input (PTI) port;

(b) disk drive interface (DDI) port; and (c) pass-thru output (PTO) port;

wherein said PTI port, said DDI port, and said PTO port are SATA interfaces;

said PTDDC is configured to connect a plurality of PTDDCs to form a serial daisy-chain by only interconnecting the PTO port of one PTDDC to the PTI port of another PTDDC in said daisy-chain;

said PTDDC is configured to present a continuous logical block address space via said PTI port comprising disk drives electrically connected to PTDDCs in said daisy-chain;

said PTDDC is configured to receive disk drive data access command (DDDAC) input via said PTI port;

said PTDDC is configured to translate said DDDAC and electrically transmit said translation via said DDI port in a form suitable for use by any attached and logically addressed disk drive electrically connected to said DDI port;

said PTDDC determines when said DDDAC falls within the logical block address (LBA) range of said attached disk drive, and if so, passes said DDDAC to said attached disk drive after modifying said DDDAC to account for said LBA range mapped by said attached disk drive;

said PTDDC determines when said DDDAC falls within said LBA range of said attached disk drive, and if not, said DDDAC is passed via said PTO port to the PTI port of any daisy-chained PTDDC attached to said PTDDC PTO port; and said PTDDC logically connects said DDI port from said attached disk drive with said PTI port to pass-thru data transfers requested by said DDDAC to/from said attached disk drive and said PTI port;

wherein said method further comprises the steps of:

(1) issuing a DRIVE RESET command to the first PTDDC in said PTDDC serial daisy-chain;

(2) issuing a MATCH DEVICE command to said PTDDC daisy-chain;

(3) sending a MATCH ID data block through all chained PTDDCs in said PTDDC serial daisy-chain;

(4) receive said MATCH ID data block by all PTDDCs within said PTDDC serial daisy-chain;

(5) send an IDENTIFY DEVICE command to all PTDDC attached disk drives within said PTDDC serial daisy-chain;

(6) comparing said MATCH ID block to a previously incremented PTDDC_ADR variable within said PTDDC;

(7) determining when said MATCH ID block does not match said previously incremented PTDDC_ADR variable, and if so, setting a local variable PTDDC_CMD within said PTDDC to a value of 0, otherwise setting said local variable PTDDC_CMD within said PTDD to a value of 1;

(8) sending a disk drive command to the PTDDC serial daisy-chain via a host bus adapter (HBA);

(9) determining when said local PTDDC_CMD variable within a PTDDC is not equal to a value of 1, and if so, proceeding to step (11);

(10) passing said disk drive command to a PTDDC locally attached disk drive and proceeding to step (12);

(11) passing said disk drive command to the next PTDDC in said daisy-chain;

(12) terminating the SATA disk drive identification method.

18. The SATA disk drive identification method of claim 17 wherein said MATCH ID block is the concatenation of a DISK DRIVE MODEL NUMBER and a DISK DRIVE SERIAL NUMBER.

19. The SATA disk drive identification method of claim 17 wherein said MATCH ID is configured to uniquely identify said SATA disk drive.

20. The SATA disk drive identification method of claim 17 wherein step (5) uses an internal copy of said MATCH ID information from a previously executed IDENTIFY DEVICE command.

* * * * *